US012639402B2

(12) United States Patent
Mystetskyi et al.

(10) Patent No.: US 12,639,402 B2
(45) Date of Patent: May 26, 2026

(54) AI-DRIVEN INTEGRATION SYSTEM FOR ENHANCED SAAS PLATFORM MANAGEMENT AND CROSS-PLATFORM SYNCHRONIZATION

(71) Applicant: MONDAY.COM LTD., Tel Aviv (IL)

(72) Inventors: Vlad Mystetskyi, Ashdod (IL); Or Fridman, Tel Aviv (IL); Amir Bardugo, Lapid (IL)

(73) Assignee: MONDAY.COM LTD., Tel Aviv (IL)

( * ) Notice: Subject to any disclaimer, the term of this patent is extended or adjusted under 35 U.S.C. 154(b) by 0 days.

(21) Appl. No.: 19/368,625

(22) Filed: Oct. 24, 2025

(65) Prior Publication Data

US 2026/0050457 A1 Feb. 19, 2026

Related U.S. Application Data

(63) Continuation of application No. PCT/IL2024/050821, filed on Aug. 14, 2024.

(Continued)

(51) Int. Cl.
*G06F 9/451* (2018.01)
*G06F 3/04842* (2022.01)
*H04L 67/75* (2022.01)

(52) U.S. Cl.
CPC .......... *G06F 9/451* (2018.02); *G06F 3/04842* (2013.01); *H04L 67/75* (2022.05)

(58) Field of Classification Search
CPC ...................................................... G06F 9/451

(Continued)

(56) References Cited

U.S. PATENT DOCUMENTS 4,972,314 A 11/1990 Getzinger et al.
5,220,657 A 6/1993 Bly et al.
(Continued)

FOREIGN PATENT DOCUMENTS

CA 2828011 A1 9/2012
CN 103064833 A 4/2013
(Continued)

OTHER PUBLICATIONS

Zhang et al. "Artificial intelligence in recommender systems." Complex & intelligent systems 7.1 (2021): 439-457.
(Continued)

*Primary Examiner* — Reza Nabi
(74) *Attorney, Agent, or Firm* — Finnegan, Henderson, Farabow, Garrett & Dunner LLP

(57) ABSTRACT

An innovative system for integrating generative artificial intelligence (AI) capabilities within Software as a Service (SaaS) platforms. By leveraging advanced AI techniques, seamless data synchronization, intelligent task management, and predictive workflow optimization across multiple SaaS platforms are described. Key components include an AI-driven data synchronization system, an intelligent cross-platform task manager, and an adaptive user interface. The system also features a cross-departmental health monitoring and notification mechanism, alongside an intent-based inter-action system. This solution enhances organizational efficiency, improves decision-making, and provides unprecedented levels of automation and insight in managing complex SaaS ecosystems.

16 Claims, 7 Drawing Sheets

Related U.S. Application Data

(60) Provisional application No. 63/645,998, filed on May 13, 2024, provisional application No. 63/548,339, filed on Nov. 13, 2023, provisional application No. 63/519,519, filed on Aug. 14, 2023.

(58) Field of Classification Search
USPC ........................................................ 715/762
See application file for complete search history.

(56) References Cited

U.S. PATENT DOCUMENTS

| | | | |
|---|---|---|---|
| 5,479,602 | A | 12/1995 | Baecker et al. |
| 5,517,663 | A | 5/1996 | Kahn |
| 5,632,009 | A | 5/1997 | Rao et al. |
| 5,657,437 | A | 8/1997 | Bishop et al. |
| 5,682,469 | A | 10/1997 | Linnett et al. |
| 5,696,702 | A | 12/1997 | Skinner et al. |
| 5,726,701 | A | 3/1998 | Needham |
| 5,734,837 | A | 3/1998 | Flores et al. |
| 5,787,411 | A | 7/1998 | Groff et al. |
| 5,844,555 | A | 12/1998 | Menaker et al. |
| 5,880,742 | A | 3/1999 | Rao et al. |
| 5,933,145 | A | 8/1999 | Meek |
| 5,987,469 | A | 11/1999 | Lewis et al. |
| 5,999,911 | A | 12/1999 | Berg et al. |
| 6,016,438 | A | 1/2000 | Wakayama |
| 6,016,553 | A | 1/2000 | Schneider et al. |
| 6,023,695 | A | 2/2000 | Osborn et al. |
| 6,034,681 | A | 3/2000 | Miller et al. |
| 6,049,622 | A | 4/2000 | Robb et al. |
| 6,088,707 | A | 7/2000 | Bates et al. |
| 6,108,573 | A | 8/2000 | Debbins et al. |
| 6,111,573 | A | 8/2000 | McComb et al. |
| 6,157,381 | A | 12/2000 | Bates et al. |
| 6,167,405 | A | 12/2000 | Rosensteel et al. |
| 6,169,534 | B1 | 1/2001 | Raffel et al. |
| 6,182,127 | B1 | 1/2001 | Cronin, III et al. |
| 6,185,582 | B1 | 2/2001 | Zellweger et al. |
| 6,195,794 | B1 | 2/2001 | Buxton |
| 6,222,541 | B1 | 4/2001 | Bates et al. |
| 6,252,594 | B1 | 6/2001 | Xia et al. |
| 6,266,067 | B1 | 7/2001 | Owen et al. |
| 6,275,809 | B1 | 8/2001 | Tamaki et al. |
| 6,330,022 | B1 | 12/2001 | Seligmann |
| 6,377,965 | B1 | 4/2002 | Fries et al. |
| 6,385,617 | B1 | 5/2002 | Malik |
| 6,460,043 | B1 | 10/2002 | Tabbara et al. |
| 6,496,832 | B2 | 12/2002 | Chi et al. |
| 6,509,912 | B1 | 1/2003 | Moran et al. |
| 6,510,459 | B2 | 1/2003 | Cronin et al. |
| 6,522,347 | B1 | 2/2003 | Tsuji et al. |
| 6,527,556 | B1 | 3/2003 | Koskinen |
| 6,567,830 | B1 | 5/2003 | Madduri |
| 6,606,740 | B1 | 8/2003 | Lynn et al. |
| 6,626,959 | B1 | 9/2003 | Moise et al. |
| 6,636,242 | B2 | 10/2003 | Bowman-Amuah |
| 6,647,370 | B1 | 11/2003 | Fu et al. |
| 6,661,431 | B1 | 12/2003 | Stuart et al. |
| 6,874,010 | B1 | 3/2005 | Sargent |
| 6,988,248 | B1 | 1/2006 | Tang et al. |
| 7,027,052 | B1 | 4/2006 | Thorn et al. |
| 7,027,997 | B1 | 4/2006 | Robinson et al. |
| 7,034,860 | B2 | 4/2006 | Lia et al. |
| 7,043,529 | B1 | 5/2006 | Simonoff |
| 7,054,891 | B2 | 5/2006 | Cole |
| 7,086,007 | B1 * | 8/2006 | Bushey ..................... G06F 8/38 |
| | | | 715/744 |
| 7,228,492 | B1 | 6/2007 | Graham |
| 7,237,188 | B1 | 6/2007 | Leung |
| 7,249,042 | B1 | 7/2007 | Doerr et al. |
| 7,272,637 | B1 | 9/2007 | Himmelstein |
| 7,274,375 | B1 | 9/2007 | David |
| 7,379,934 | B1 | 5/2008 | Forman et al. |
| 7,380,202 | B1 | 5/2008 | Lindhorst et al. |
| 7,383,320 | B1 | 6/2008 | Silberstein et al. |
| 7,389,473 | B1 | 6/2008 | Sawicki et al. |
| 7,415,664 | B2 | 8/2008 | Aureglia et al. |
| 7,417,644 | B2 | 8/2008 | Cooper et al. |
| 7,461,077 | B1 | 12/2008 | Greenwood |
| 7,464,366 | B2 | 12/2008 | Shukla et al. |
| 7,489,976 | B2 | 2/2009 | Adra |
| 7,565,270 | B2 | 7/2009 | Bramwell et al. |
| 7,617,443 | B2 | 11/2009 | Mills et al. |
| 7,685,152 | B2 | 3/2010 | Chivukula et al. |
| 7,707,514 | B2 | 4/2010 | Forstall et al. |
| 7,710,290 | B2 | 5/2010 | Johnson |
| 7,747,782 | B2 | 6/2010 | Hunt et al. |
| 7,770,100 | B2 | 8/2010 | Chamberlain et al. |
| 7,827,476 | B1 | 11/2010 | Roberts et al. |
| 7,827,615 | B1 | 11/2010 | Allababidi et al. |
| 7,836,408 | B1 | 11/2010 | Ollmann et al. |
| 7,885,847 | B2 | 2/2011 | Wodtke et al. |
| 7,916,157 | B1 | 3/2011 | Kelley et al. |
| 7,921,360 | B1 | 4/2011 | Sundermeyer et al. |
| 7,933,952 | B2 | 4/2011 | Parker et al. |
| 7,945,622 | B1 | 5/2011 | Pegg |
| 7,954,043 | B2 | 5/2011 | Bera |
| 7,954,064 | B2 | 5/2011 | Forstall et al. |
| 8,046,703 | B2 | 10/2011 | Busch et al. |
| 8,060,518 | B2 | 11/2011 | Timmons |
| 8,078,955 | B1 | 12/2011 | Gupta |
| 8,082,274 | B2 | 12/2011 | Steinglass et al. |
| 8,108,241 | B2 | 1/2012 | Shukoor |
| 8,136,031 | B2 | 3/2012 | Massand |
| 8,151,213 | B2 | 4/2012 | Weitzman et al. |
| 8,223,172 | B1 | 7/2012 | Miller et al. |
| 8,286,072 | B2 | 10/2012 | Chamberlain et al. |
| 8,365,095 | B2 | 1/2013 | Bansal et al. |
| 8,375,327 | B2 | 2/2013 | Lorch et al. |
| 8,386,960 | B1 | 2/2013 | Eismann et al. |
| 8,407,217 | B1 | 3/2013 | Zhang |
| 8,413,261 | B2 | 4/2013 | Nemoy et al. |
| 8,423,909 | B2 | 4/2013 | Zabielski |
| 8,543,566 | B2 | 9/2013 | Weissman et al. |
| 8,548,997 | B1 | 10/2013 | Wu |
| 8,560,942 | B2 | 10/2013 | Fortes et al. |
| 8,566,732 | B2 | 10/2013 | Louch et al. |
| 8,572,173 | B2 | 10/2013 | Briere et al. |
| 8,578,399 | B2 | 11/2013 | Khen et al. |
| 8,601,383 | B2 | 12/2013 | Folting et al. |
| 8,620,703 | B1 | 12/2013 | Kapoor et al. |
| 8,621,652 | B2 | 12/2013 | Slater |
| 8,635,520 | B2 | 1/2014 | Christiansen et al. |
| 8,660,881 | B2 | 2/2014 | Wood et al. |
| 8,677,448 | B1 | 3/2014 | Kauffman et al. |
| 8,689,131 | B2 | 4/2014 | Ali et al. |
| 8,694,981 | B2 | 4/2014 | Federighi et al. |
| 8,719,071 | B2 | 5/2014 | MacIntyre et al. |
| 8,738,414 | B1 | 5/2014 | Nagar et al. |
| 8,812,471 | B2 | 8/2014 | Akita |
| 8,819,042 | B2 | 8/2014 | Samudrala et al. |
| 8,825,758 | B2 | 9/2014 | Bailor et al. |
| 8,838,533 | B2 | 9/2014 | Kwiatkowski et al. |
| 8,862,979 | B2 | 10/2014 | Hawking |
| 8,863,022 | B2 | 10/2014 | Rhodes et al. |
| 8,869,027 | B2 | 10/2014 | Louch et al. |
| 8,910,062 | B2 * | 12/2014 | Bangor ................... G06F 8/458 |
| | | | 715/204 |
| 8,937,627 | B1 | 1/2015 | Otero et al. |
| 8,938,465 | B2 | 1/2015 | Messer |
| 8,954,871 | B2 | 2/2015 | Louch et al. |
| 9,007,405 | B1 | 4/2015 | Eldar et al. |
| 9,015,716 | B2 | 4/2015 | Fletcher et al. |
| 9,021,118 | B2 | 4/2015 | John et al. |
| 9,026,897 | B2 | 5/2015 | Zarras |
| 9,043,362 | B2 | 5/2015 | Weissman et al. |
| 9,063,958 | B2 | 6/2015 | Muller et al. |
| 9,129,234 | B2 | 9/2015 | Campbell et al. |
| 9,159,246 | B2 | 10/2015 | Rodriguez et al. |
| 9,172,738 | B1 | 10/2015 | Dacosta |
| 9,177,238 | B2 | 11/2015 | Windmueller et al. |
| 9,183,303 | B1 | 11/2015 | Goel et al. |
| 9,223,770 | B1 | 12/2015 | Ledet |

(56)  References Cited

U.S. PATENT DOCUMENTS

| | | | |
|---|---|---|---|
| 9,239,719 | B1 | 1/2016 | Feinstein et al. |
| 9,244,917 | B1 | 1/2016 | Sharma et al. |
| 9,253,130 | B2 | 2/2016 | Zaveri |
| 9,268,604 | B1 | 2/2016 | Herzberg et al. |
| 9,286,246 | B2 | 3/2016 | Saito et al. |
| 9,286,475 | B2 | 3/2016 | Li et al. |
| 9,292,587 | B2 | 3/2016 | Kann et al. |
| 9,336,502 | B2 | 5/2016 | Mohammad et al. |
| 9,342,579 | B2 | 5/2016 | Cao et al. |
| 9,361,287 | B1 | 6/2016 | Simon et al. |
| 9,372,592 | B1 | 6/2016 | Goodspeed et al. |
| 9,390,059 | B1 | 7/2016 | Gur et al. |
| 9,395,959 | B2 | 7/2016 | Hatfield et al. |
| 9,424,287 | B2 | 8/2016 | Schroth |
| 9,424,333 | B1 | 8/2016 | Bisignani et al. |
| 9,424,545 | B1 | 8/2016 | Lee |
| 9,430,458 | B2 | 8/2016 | Rhee et al. |
| 9,449,031 | B2 | 9/2016 | Barrus et al. |
| 9,495,386 | B2 | 11/2016 | Tapley et al. |
| 9,519,699 | B1 | 12/2016 | Kulkarni et al. |
| 9,558,172 | B2 | 1/2017 | Rampson et al. |
| 9,569,511 | B2 | 2/2017 | Morin |
| 9,613,086 | B1 | 4/2017 | Sherman |
| 9,635,091 | B1 | 4/2017 | Laukkanen et al. |
| 9,659,284 | B1 | 5/2017 | Wilson et al. |
| 9,679,456 | B2 | 6/2017 | East |
| 9,686,086 | B1 | 6/2017 | Nguyen et al. |
| 9,720,602 | B1 | 8/2017 | Chen et al. |
| 9,727,376 | B1 | 8/2017 | Bills et al. |
| 9,760,271 | B2 | 9/2017 | Persaud |
| 9,779,150 | B1 | 10/2017 | Sherman et al. |
| 9,794,256 | B2 | 10/2017 | Kiang et al. |
| 9,798,829 | B1 | 10/2017 | Baisley |
| 9,811,676 | B1 | 11/2017 | Gauvin |
| 9,866,561 | B2 | 1/2018 | Psenka et al. |
| 9,870,136 | B2 | 1/2018 | Pourshahid |
| 9,911,092 | B2 | 3/2018 | Goja |
| 10,001,908 | B2 | 6/2018 | Grieve et al. |
| 10,043,296 | B2 | 8/2018 | Li |
| 10,057,246 | B1 | 8/2018 | Drozd et al. |
| 10,067,928 | B1 | 9/2018 | Krappe |
| 10,078,668 | B1 | 9/2018 | Woodrow et al. |
| 10,169,306 | B2 | 1/2019 | O'Shaughnessy et al. |
| 10,176,154 | B2 | 1/2019 | Ben-Aharon et al. |
| 10,235,441 | B1 | 3/2019 | Makhlin et al. |
| 10,255,609 | B2 | 4/2019 | Kinkead et al. |
| 10,282,405 | B1 | 5/2019 | Silk et al. |
| 10,282,406 | B2 | 5/2019 | Bissantz |
| 10,311,080 | B2 | 6/2019 | Folting et al. |
| 10,318,624 | B1 | 6/2019 | Rosner et al. |
| 10,327,712 | B2 | 6/2019 | Beymer et al. |
| 10,347,017 | B2 | 7/2019 | Ruble et al. |
| 10,372,706 | B2 | 8/2019 | Chavan et al. |
| 10,380,140 | B2 | 8/2019 | Sherman |
| 10,419,469 | B1 | 9/2019 | Singh et al. |
| 10,423,758 | B2 | 9/2019 | Kido et al. |
| 10,445,702 | B1 | 10/2019 | Hunt |
| 10,452,360 | B1 | 10/2019 | Burman et al. |
| 10,453,118 | B1 | 10/2019 | Smith et al. |
| 10,474,317 | B2 | 11/2019 | Ramanathan et al. |
| 10,489,391 | B1 | 11/2019 | Tomlin |
| 10,489,462 | B1 | 11/2019 | Rogynskyy et al. |
| 10,496,737 | B1 | 12/2019 | Sayre et al. |
| 10,505,825 | B1 | 12/2019 | Bettaiah et al. |
| 10,528,599 | B1 | 1/2020 | Pandis et al. |
| 10,534,507 | B1 | 1/2020 | Laukkanen et al. |
| 10,540,152 | B1 | 1/2020 | Krishnaswamy et al. |
| 10,540,434 | B2 | 1/2020 | Migeon et al. |
| 10,546,001 | B1 | 1/2020 | Nguyen et al. |
| 10,564,622 | B1 | 2/2020 | Dean et al. |
| 10,573,407 | B2 | 2/2020 | Ginsburg |
| 10,579,724 | B2 | 3/2020 | Campbell et al. |
| 10,581,675 | B1 | 3/2020 | Iyer et al. |
| 10,587,714 | B1 | 3/2020 | Kulkarni et al. |
| 10,602,332 | B2 * | 3/2020 | Dong ........................ H04L 67/02 |
| 10,628,002 | B1 | 4/2020 | Kang et al. |
| 10,649,739 | B2 | 5/2020 | Burges et al. |
| 10,698,594 | B2 | 6/2020 | Sanches et al. |
| 10,706,061 | B2 | 7/2020 | Sherman et al. |
| 10,719,220 | B2 | 7/2020 | Ouellet et al. |
| 10,719,311 | B2 | 7/2020 | Foskett et al. |
| 10,733,256 | B2 | 8/2020 | Fickenscher et al. |
| 10,740,117 | B2 | 8/2020 | Ording et al. |
| 10,747,764 | B1 | 8/2020 | Plenderleith |
| 10,747,950 | B2 | 8/2020 | Dang et al. |
| 10,748,312 | B2 | 8/2020 | Ruble et al. |
| 10,754,688 | B2 | 8/2020 | Powell |
| 10,761,691 | B2 | 9/2020 | Anzures et al. |
| 10,762,471 | B1 | 9/2020 | Wang et al. |
| 10,795,555 | B2 | 10/2020 | Burke et al. |
| 10,795,649 | B1 | 10/2020 | Drake et al. |
| 10,809,696 | B1 | 10/2020 | Principato |
| 10,817,660 | B2 | 10/2020 | Rampson et al. |
| D910,077 | S | 2/2021 | Naroshevitch et al. |
| 10,955,992 | B2 | 3/2021 | Hooton et al. |
| 10,963,578 | B2 | 3/2021 | More et al. |
| 10,997,531 | B2 | 5/2021 | Leonelli et al. |
| 11,010,371 | B1 | 5/2021 | Slomka et al. |
| 11,030,259 | B2 | 6/2021 | Mullins et al. |
| 11,042,363 | B1 | 6/2021 | Krishnaswamy et al. |
| 11,042,699 | B1 | 6/2021 | Sayre et al. |
| 11,044,257 | B1 | 6/2021 | Heuts et al. |
| 11,048,499 | B2 | 6/2021 | Foskett et al. |
| 11,048,714 | B2 | 6/2021 | Sherman et al. |
| 11,080,636 | B1 | 8/2021 | Son |
| 11,086,894 | B1 | 8/2021 | Srivastava et al. |
| 11,128,464 | B1 | 9/2021 | Loladia |
| 11,144,854 | B1 | 10/2021 | Mouawad |
| 11,182,218 | B2 | 11/2021 | Sanchez et al. |
| 11,190,516 | B1 | 11/2021 | Loladia |
| 11,222,167 | B2 | 1/2022 | Gehrmann et al. |
| 11,231,862 | B1 | 1/2022 | Vig et al. |
| 11,240,278 | B1 | 2/2022 | Wang et al. |
| 11,243,688 | B1 | 2/2022 | Remy et al. |
| 11,301,623 | B2 | 4/2022 | Helft et al. |
| 11,341,705 | B1 | 5/2022 | Isaacs et al. |
| 11,356,485 | B2 | 6/2022 | Hegde et al. |
| 11,360,765 | B2 | 6/2022 | Miller et al. |
| 11,372,380 | B2 | 6/2022 | Iyer et al. |
| 11,405,504 | B1 | 8/2022 | Tripathy et al. |
| 11,429,384 | B1 | 8/2022 | Navert et al. |
| 11,443,390 | B1 | 9/2022 | Caligaris et al. |
| 11,494,171 | B1 | 11/2022 | Acharya et al. |
| 11,501,255 | B2 | 11/2022 | Mann et al. |
| 11,513,772 | B1 | 11/2022 | Gross |
| 11,570,182 | B1 | 1/2023 | Tran et al. |
| 11,593,096 | B1 | 2/2023 | Chaptini et al. |
| 11,593,477 | B1 | 2/2023 | Thimmegowda et al. |
| 11,620,615 | B2 | 4/2023 | Jiang et al. |
| 11,663,023 | B2 * | 5/2023 | Syed ........................ G06F 9/451 |
| | | | 715/762 |
| 11,681,445 | B2 | 6/2023 | Vohra et al. |
| 11,682,091 | B2 | 6/2023 | Sukman et al. |
| 11,714,612 | B2 * | 8/2023 | Accardo ............. G06F 11/3692 |
| | | | 717/113 |
| 11,720,410 | B2 | 8/2023 | Culp et al. |
| 11,750,475 | B1 | 9/2023 | Gonzalez et al. |
| 11,799,951 | B1 | 10/2023 | Maloo et al. |
| 11,823,269 | B2 | 11/2023 | Aisen et al. |
| 11,882,117 | B1 | 1/2024 | Kumar |
| 11,922,222 | B1 | 3/2024 | Chawla et al. |
| 11,977,858 | B2 | 5/2024 | Kulkarni et al. |
| 12,034,613 | B2 | 7/2024 | Gupta et al. |
| 12,056,664 | B2 | 8/2024 | Zionpour et al. |
| 12,094,018 | B1 | 9/2024 | O'Malley |
| 12,105,939 | B1 | 10/2024 | Rank et al. |
| 12,118,490 | B1 * | 10/2024 | Hooks ................. G06F 11/3447 |
| 2001/0008998 | A1 | 7/2001 | Tamaki et al. |
| 2001/0032248 | A1 | 10/2001 | Krafchin |
| 2001/0039551 | A1 | 11/2001 | Saito et al. |
| 2002/0002459 | A1 | 1/2002 | Lewis et al. |
| 2002/0019827 | A1 | 2/2002 | Shiman et al. |
| 2002/0065848 | A1 | 5/2002 | Walker et al. |
| 2002/0065849 | A1 | 5/2002 | Ferguson et al. |

(56) References Cited

U.S. PATENT DOCUMENTS

| | | |
|---|---|---|
| 2002/0065880 A1 | 5/2002 | Hasegawa et al. |
| 2002/0069207 A1 | 6/2002 | Alexander et al. |
| 2002/0075309 A1 | 6/2002 | Michelman et al. |
| 2002/0082892 A1 | 6/2002 | Raffel et al. |
| 2002/0099777 A1 | 7/2002 | Gupta et al. |
| 2002/0138528 A1 | 9/2002 | Gong et al. |
| 2003/0004771 A1 | 1/2003 | Yaung |
| 2003/0033196 A1 | 2/2003 | Tomlin |
| 2003/0041113 A1 | 2/2003 | Larsen |
| 2003/0051377 A1 | 3/2003 | Chirafesi |
| 2003/0052912 A1 | 3/2003 | Bowman et al. |
| 2003/0058277 A1 | 3/2003 | Bowman-Amuah |
| 2003/0065662 A1 | 4/2003 | Cosic |
| 2003/0093408 A1 | 5/2003 | Brown et al. |
| 2003/0101416 A1 | 5/2003 | McInnes et al. |
| 2003/0135558 A1 | 7/2003 | Bellotti et al. |
| 2003/0137536 A1 | 7/2003 | Hugh |
| 2003/0187864 A1 | 10/2003 | McGoveran |
| 2003/0200215 A1 | 10/2003 | Chen et al. |
| 2003/0204490 A1 | 10/2003 | Kasriel |
| 2003/0233224 A1 | 12/2003 | Marchisio et al. |
| 2004/0010514 A1 | 1/2004 | Agarwal et al. |
| 2004/0032432 A1 | 2/2004 | Baynger |
| 2004/0078105 A1 | 4/2004 | Moon et al. |
| 2004/0078373 A1 | 4/2004 | Ghoneimy et al. |
| 2004/0098284 A1 | 5/2004 | Petito et al. |
| 2004/0111666 A1 | 6/2004 | Hollcraft |
| 2004/0119713 A1 | 6/2004 | Meyringer |
| 2004/0133441 A1 | 7/2004 | Brady et al. |
| 2004/0138939 A1 | 7/2004 | Theiler |
| 2004/0139400 A1 | 7/2004 | Allam et al. |
| 2004/0162833 A1 | 8/2004 | Jones et al. |
| 2004/0168115 A1 | 8/2004 | Bauernschmidt et al. |
| 2004/0172592 A1 | 9/2004 | Collie et al. |
| 2004/0212615 A1 | 10/2004 | Uthe |
| 2004/0215443 A1 | 10/2004 | Hatton |
| 2004/0230940 A1 | 11/2004 | Cooper et al. |
| 2004/0268227 A1 | 12/2004 | Brid |
| 2005/0010454 A1 | 1/2005 | Falk et al. |
| 2005/0034058 A1 | 2/2005 | Mills et al. |
| 2005/0034064 A1 | 2/2005 | Meyers et al. |
| 2005/0039001 A1 | 2/2005 | Hudis et al. |
| 2005/0039033 A1 | 2/2005 | Meyers et al. |
| 2005/0044486 A1 | 2/2005 | Kotler et al. |
| 2005/0060342 A1 | 3/2005 | Farag |
| 2005/0063615 A1 | 3/2005 | Siegel et al. |
| 2005/0066306 A1 | 3/2005 | Diab |
| 2005/0086360 A1 | 4/2005 | Mamou et al. |
| 2005/0091314 A1 | 4/2005 | Blagsvedt et al. |
| 2005/0091596 A1 | 4/2005 | Anthony et al. |
| 2005/0096973 A1 | 5/2005 | Heyse et al. |
| 2005/0114305 A1 | 5/2005 | Haynes et al. |
| 2005/0125395 A1 | 6/2005 | Boettiger |
| 2005/0149908 A1 | 7/2005 | Klianev |
| 2005/0165600 A1 | 7/2005 | Kasravi et al. |
| 2005/0171881 A1 | 8/2005 | Ghassemieh et al. |
| 2005/0210371 A1 | 9/2005 | Pollock et al. |
| 2005/0216830 A1 | 9/2005 | Turner et al. |
| 2005/0228250 A1 | 10/2005 | Bitter et al. |
| 2005/0251021 A1 | 11/2005 | Kaufman et al. |
| 2005/0257204 A1 | 11/2005 | Bryant et al. |
| 2005/0278297 A1 | 12/2005 | Nelson |
| 2005/0289170 A1 | 12/2005 | Brown et al. |
| 2005/0289342 A1 | 12/2005 | Needham et al. |
| 2005/0289453 A1 | 12/2005 | Segal et al. |
| 2006/0009960 A1 | 1/2006 | Valencot et al. |
| 2006/0013462 A1 | 1/2006 | Sadikali |
| 2006/0015499 A1 | 1/2006 | Clissold et al. |
| 2006/0015806 A1 | 1/2006 | Wallace |
| 2006/0031148 A1 | 2/2006 | O'Dell et al. |
| 2006/0031764 A1 | 2/2006 | Keyser et al. |
| 2006/0036568 A1 | 2/2006 | Moore et al. |
| 2006/0044307 A1 | 3/2006 | Song |
| 2006/0047553 A1 | 3/2006 | Fuhrmann et al. |
| 2006/0047811 A1 | 3/2006 | Lau et al. |
| 2006/0053096 A1 | 3/2006 | Subramanian et al. |
| 2006/0053194 A1 | 3/2006 | Schneider et al. |
| 2006/0069604 A1 | 3/2006 | Leukart et al. |
| 2006/0069635 A1 | 3/2006 | Ram et al. |
| 2006/0074735 A1 | 4/2006 | Shukla et al. |
| 2006/0080594 A1 | 4/2006 | Chavoustie et al. |
| 2006/0085744 A1 | 4/2006 | Hays et al. |
| 2006/0090169 A1 | 4/2006 | Daniels et al. |
| 2006/0095276 A1 | 5/2006 | Axelrod et al. |
| 2006/0101324 A1 | 5/2006 | Goldberg et al. |
| 2006/0106642 A1 | 5/2006 | Reicher et al. |
| 2006/0107196 A1 | 5/2006 | Thanu et al. |
| 2006/0111953 A1 | 5/2006 | Setya |
| 2006/0112123 A1 | 5/2006 | Clark et al. |
| 2006/0129415 A1 | 6/2006 | Thukral et al. |
| 2006/0129913 A1 | 6/2006 | Vigesaa et al. |
| 2006/0136828 A1 | 6/2006 | Asano |
| 2006/0150090 A1 | 7/2006 | Swamidass |
| 2006/0173762 A1 | 8/2006 | Clater |
| 2006/0173908 A1 | 8/2006 | Browning et al. |
| 2006/0190313 A1 | 8/2006 | Lu |
| 2006/0212299 A1 | 9/2006 | Law |
| 2006/0224542 A1 | 10/2006 | Yalamanchi |
| 2006/0224568 A1 | 10/2006 | Debrito |
| 2006/0224946 A1 | 10/2006 | Barrett et al. |
| 2006/0236246 A1 | 10/2006 | Bono et al. |
| 2006/0250369 A1 | 11/2006 | Keim |
| 2006/0253205 A1 | 11/2006 | Gardiner |
| 2006/0271574 A1 | 11/2006 | Villaron et al. |
| 2006/0271859 A1 | 11/2006 | Gorzela |
| 2006/0282348 A1 | 12/2006 | Greenfield et al. |
| 2006/0287998 A1 | 12/2006 | Folting et al. |
| 2006/0294451 A1 | 12/2006 | Kelkar et al. |
| 2007/0027932 A1 | 2/2007 | Thibeault |
| 2007/0032993 A1 | 2/2007 | Yamaguchi et al. |
| 2007/0033531 A1 | 2/2007 | Marsh |
| 2007/0050322 A1 | 3/2007 | Vigesaa et al. |
| 2007/0050379 A1 | 3/2007 | Day et al. |
| 2007/0050710 A1 | 3/2007 | Redekop |
| 2007/0067373 A1 | 3/2007 | Higgins et al. |
| 2007/0073899 A1 | 3/2007 | Judge et al. |
| 2007/0092048 A1 | 4/2007 | Chelstrom et al. |
| 2007/0094607 A1 | 4/2007 | Morgan et al. |
| 2007/0101291 A1 | 5/2007 | Forstall et al. |
| 2007/0106754 A1 | 5/2007 | Moore |
| 2007/0118527 A1 | 5/2007 | Winje et al. |
| 2007/0118813 A1 | 5/2007 | Forstall et al. |
| 2007/0143169 A1 | 6/2007 | Grant et al. |
| 2007/0143736 A1 | 6/2007 | Moriarty et al. |
| 2007/0150389 A1 | 6/2007 | Aamodt et al. |
| 2007/0168861 A1 | 7/2007 | Bell et al. |
| 2007/0174228 A1 | 7/2007 | Folting et al. |
| 2007/0174760 A1 | 7/2007 | Chamberlain et al. |
| 2007/0186173 A1 | 8/2007 | Both et al. |
| 2007/0192729 A1 | 8/2007 | Downs |
| 2007/0220119 A1 | 9/2007 | Himmelstein |
| 2007/0233647 A1 | 10/2007 | Rawat et al. |
| 2007/0239746 A1 | 10/2007 | Masselle et al. |
| 2007/0256043 A1 | 11/2007 | Peters et al. |
| 2007/0282522 A1 | 12/2007 | Geelen |
| 2007/0282627 A1 | 12/2007 | Greenstein et al. |
| 2007/0283259 A1 | 12/2007 | Barry et al. |
| 2007/0294235 A1 | 12/2007 | Millett |
| 2007/0299795 A1 | 12/2007 | Macbeth et al. |
| 2007/0300174 A1 | 12/2007 | Macbeth et al. |
| 2007/0300185 A1 | 12/2007 | Macbeth et al. |
| 2008/0004929 A9 | 1/2008 | Raffel et al. |
| 2008/0005235 A1 | 1/2008 | Hegde et al. |
| 2008/0010615 A1 | 1/2008 | Curtis et al. |
| 2008/0033777 A1 | 2/2008 | Shukoor |
| 2008/0034307 A1 | 2/2008 | Cisler et al. |
| 2008/0034314 A1 | 2/2008 | Louch et al. |
| 2008/0040181 A1 | 2/2008 | Freire et al. |
| 2008/0046816 A1 | 2/2008 | Cao et al. |
| 2008/0052291 A1 | 2/2008 | Bender |
| 2008/0059312 A1 | 3/2008 | Gern et al. |
| 2008/0059539 A1 | 3/2008 | Chin et al. |
| 2008/0065460 A1 | 3/2008 | Raynor |
| 2008/0077530 A1 | 3/2008 | Banas et al. |

(56)          References Cited

U.S. PATENT DOCUMENTS

| | | |
|---|---|---|
| 2008/0088628 A1 | 4/2008 | Lu et al. |
| 2008/0097748 A1 | 4/2008 | Haley et al. |
| 2008/0104091 A1 | 5/2008 | Chin |
| 2008/0126389 A1 | 5/2008 | Mush et al. |
| 2008/0126945 A1 | 5/2008 | Munkvold et al. |
| 2008/0127205 A1 | 5/2008 | Barros |
| 2008/0133736 A1 | 6/2008 | Wensley et al. |
| 2008/0148140 A1 | 6/2008 | Nakano |
| 2008/0155547 A1 | 6/2008 | Weber et al. |
| 2008/0163075 A1 | 7/2008 | Beck et al. |
| 2008/0183593 A1 | 7/2008 | Dierks |
| 2008/0195948 A1 | 8/2008 | Bauer |
| 2008/0209318 A1 | 8/2008 | Allsop et al. |
| 2008/0216022 A1 | 9/2008 | Lorch et al. |
| 2008/0221946 A1 | 9/2008 | Balon |
| 2008/0222192 A1 | 9/2008 | Hughes |
| 2008/0256014 A1 | 10/2008 | Gould et al. |
| 2008/0256429 A1 | 10/2008 | Penner et al. |
| 2008/0270597 A1 | 10/2008 | Tenenti |
| 2008/0282189 A1 | 11/2008 | Hofmann et al. |
| 2008/0295038 A1 | 11/2008 | Helfman et al. |
| 2008/0301237 A1 | 12/2008 | Parsons et al. |
| 2009/0006171 A1 | 1/2009 | Blatchley et al. |
| 2009/0006283 A1 | 1/2009 | Labrie et al. |
| 2009/0007157 A1 | 1/2009 | Ward et al. |
| 2009/0013244 A1 | 1/2009 | Cudich et al. |
| 2009/0019383 A1 | 1/2009 | Riley et al. |
| 2009/0024944 A1 | 1/2009 | Louch et al. |
| 2009/0043814 A1 | 2/2009 | Faris et al. |
| 2009/0044090 A1 | 2/2009 | Gur et al. |
| 2009/0048896 A1 | 2/2009 | Anandan |
| 2009/0049372 A1 | 2/2009 | Goldberg |
| 2009/0075694 A1 | 3/2009 | Kim et al. |
| 2009/0077164 A1 | 3/2009 | Phillips et al. |
| 2009/0077217 A1 | 3/2009 | McFarland et al. |
| 2009/0083140 A1 | 3/2009 | Phan |
| 2009/0088875 A1 | 4/2009 | Baier et al. |
| 2009/0094514 A1 | 4/2009 | Dargahi et al. |
| 2009/0113310 A1 | 4/2009 | Appleyard et al. |
| 2009/0129596 A1 | 5/2009 | Chavez et al. |
| 2009/0132331 A1 | 5/2009 | Cartledge et al. |
| 2009/0132470 A1 | 5/2009 | Vignet |
| 2009/0150813 A1 | 6/2009 | Chang et al. |
| 2009/0174680 A1 | 7/2009 | Anzures et al. |
| 2009/0192787 A1 | 7/2009 | Roon |
| 2009/0198715 A1 | 8/2009 | Barbarek |
| 2009/0222760 A1 | 9/2009 | Halverson et al. |
| 2009/0234699 A1 | 9/2009 | Steinglass et al. |
| 2009/0248710 A1 | 10/2009 | Mccormack et al. |
| 2009/0256972 A1 | 10/2009 | Ramaswamy et al. |
| 2009/0262690 A1 | 10/2009 | Breuer et al. |
| 2009/0271696 A1 | 10/2009 | Bailor et al. |
| 2009/0276692 A1 | 11/2009 | Rosner |
| 2009/0292690 A1 | 11/2009 | Culbert |
| 2009/0313201 A1 | 12/2009 | Huelsman et al. |
| 2009/0313537 A1 | 12/2009 | Fu et al. |
| 2009/0313570 A1 | 12/2009 | Po |
| 2009/0319542 A1 | 12/2009 | Le Brazidec et al. |
| 2009/0319623 A1 | 12/2009 | Srinivasan et al. |
| 2009/0319882 A1 | 12/2009 | Morrison et al. |
| 2009/0327240 A1 | 12/2009 | Meehan et al. |
| 2009/0327301 A1 | 12/2009 | Lees et al. |
| 2009/0327851 A1 | 12/2009 | Raposo |
| 2009/0327875 A1 | 12/2009 | Kinkoh |
| 2010/0017699 A1 | 1/2010 | Farrell et al. |
| 2010/0031135 A1 | 2/2010 | Naghshin et al. |
| 2010/0070845 A1 | 3/2010 | Facemire et al. |
| 2010/0070895 A1 | 3/2010 | Messer |
| 2010/0077260 A1 | 3/2010 | Pillai et al. |
| 2010/0082705 A1 | 4/2010 | Ramesh et al. |
| 2010/0083164 A1 | 4/2010 | Martin et al. |
| 2010/0088636 A1 | 4/2010 | Yerkes et al. |
| 2010/0095219 A1 | 4/2010 | Stachowiak et al. |
| 2010/0095298 A1 | 4/2010 | Seshadrinathan et al. |
| 2010/0100427 A1 | 4/2010 | Mckeown et al. |
| 2010/0100463 A1 | 4/2010 | Molotsi et al. |
| 2010/0114926 A1 | 5/2010 | Agrawal et al. |
| 2010/0149005 A1 | 6/2010 | Yoon et al. |
| 2010/0169853 A1 | 7/2010 | Jain et al. |
| 2010/0174678 A1 | 7/2010 | Massand |
| 2010/0205521 A1 | 8/2010 | Folting |
| 2010/0228752 A1 | 9/2010 | Folting et al. |
| 2010/0241477 A1 | 9/2010 | Nylander et al. |
| 2010/0241948 A1 | 9/2010 | Andeen et al. |
| 2010/0241968 A1 | 9/2010 | Tarara et al. |
| 2010/0241972 A1 | 9/2010 | Spataro et al. |
| 2010/0241990 A1 | 9/2010 | Gabriel et al. |
| 2010/0251090 A1 | 9/2010 | Chamberlain et al. |
| 2010/0251386 A1 | 9/2010 | Gilzean et al. |
| 2010/0257015 A1 | 10/2010 | Molander |
| 2010/0262625 A1 | 10/2010 | Pittenger |
| 2010/0268705 A1 | 10/2010 | Douglas et al. |
| 2010/0268773 A1 | 10/2010 | Hunt et al. |
| 2010/0281462 A1 | 11/2010 | Festa |
| 2010/0287163 A1 | 11/2010 | Sridhar et al. |
| 2010/0287221 A1 | 11/2010 | Battepati et al. |
| 2010/0313119 A1 | 12/2010 | Baldwin et al. |
| 2010/0324964 A1 | 12/2010 | Callanan et al. |
| 2010/0332973 A1 | 12/2010 | Kloiber et al. |
| 2011/0010340 A1 | 1/2011 | Hung et al. |
| 2011/0016432 A1 | 1/2011 | Helfman |
| 2011/0028138 A1 | 2/2011 | Davies-Moore et al. |
| 2011/0041140 A1 | 2/2011 | Harm et al. |
| 2011/0047484 A1 | 2/2011 | Mount et al. |
| 2011/0055177 A1 | 3/2011 | Chakra et al. |
| 2011/0066933 A1 | 3/2011 | Ludwig |
| 2011/0071869 A1 | 3/2011 | O'Brien et al. |
| 2011/0106636 A1 | 5/2011 | Spear et al. |
| 2011/0119352 A1 | 5/2011 | Perov et al. |
| 2011/0154192 A1 | 6/2011 | Yang et al. |
| 2011/0179371 A1 | 7/2011 | Kopycinski et al. |
| 2011/0205231 A1 | 8/2011 | Hartley et al. |
| 2011/0208324 A1 | 8/2011 | Fukatsu |
| 2011/0208732 A1 | 8/2011 | Melton et al. |
| 2011/0209150 A1 | 8/2011 | Hammond et al. |
| 2011/0219321 A1 | 9/2011 | Gonzalez Veron et al. |
| 2011/0225500 A1 | 9/2011 | Casalaina et al. |
| 2011/0225525 A1 | 9/2011 | Chasman et al. |
| 2011/0231273 A1 | 9/2011 | Buchheit |
| 2011/0238716 A1 | 9/2011 | Amir et al. |
| 2011/0258040 A1 | 10/2011 | Gnanasambandam |
| 2011/0269424 A1 | 11/2011 | Multer |
| 2011/0288900 A1 | 11/2011 | Mcqueen et al. |
| 2011/0289397 A1 | 11/2011 | Eastmond et al. |
| 2011/0289439 A1 | 11/2011 | Jugel |
| 2011/0292046 A1 | 12/2011 | Gotz |
| 2011/0298618 A1 | 12/2011 | Stahl et al. |
| 2011/0302003 A1 | 12/2011 | Shirish et al. |
| 2012/0018953 A1 | 1/2012 | Frey |
| 2012/0029962 A1 | 2/2012 | Podgurny et al. |
| 2012/0035974 A1 | 2/2012 | Seybold |
| 2012/0036423 A1 | 2/2012 | Haynes et al. |
| 2012/0036462 A1 | 2/2012 | Schwartz et al. |
| 2012/0050802 A1 | 3/2012 | Masuda |
| 2012/0066587 A1 | 3/2012 | Zhou et al. |
| 2012/0072821 A1 | 3/2012 | Bowling |
| 2012/0079408 A1 | 3/2012 | Rohwer |
| 2012/0081762 A1 | 4/2012 | Yamada |
| 2012/0084798 A1 | 4/2012 | Reeves et al. |
| 2012/0086716 A1 | 4/2012 | Reeves et al. |
| 2012/0086717 A1 | 4/2012 | Liu |
| 2012/0089610 A1 | 4/2012 | Agrawal et al. |
| 2012/0089914 A1 | 4/2012 | Holt et al. |
| 2012/0089992 A1 | 4/2012 | Reeves et al. |
| 2012/0096389 A1 | 4/2012 | Flam et al. |
| 2012/0096392 A1 | 4/2012 | Ording et al. |
| 2012/0102432 A1 | 4/2012 | Breedvelt-Schouten et al. |
| 2012/0102543 A1 | 4/2012 | Kohli et al. |
| 2012/0110515 A1 | 5/2012 | Abramoff et al. |
| 2012/0116834 A1 | 5/2012 | Pope et al. |
| 2012/0116835 A1 | 5/2012 | Pope et al. |
| 2012/0120086 A1 | 5/2012 | Dang et al. |
| 2012/0124749 A1 | 5/2012 | Lewman |
| 2012/0130907 A1 | 5/2012 | Thompson et al. |

(56)  References Cited

U.S. PATENT DOCUMENTS

| | | |
|---|---|---|
| 2012/0131445 A1 | 5/2012 | Oyarzabal et al. |
| 2012/0137238 A1 | 5/2012 | Abeln |
| 2012/0151173 A1 | 6/2012 | Shirley et al. |
| 2012/0158744 A1 | 6/2012 | Tseng et al. |
| 2012/0166980 A1* | 6/2012 | Yosef ..................... G06F 9/451 |
| | | 715/762 |
| 2012/0192050 A1 | 7/2012 | Campbell et al. |
| 2012/0198322 A1 | 8/2012 | Gulwani et al. |
| 2012/0210252 A1 | 8/2012 | Fedoseyeva et al. |
| 2012/0215574 A1 | 8/2012 | Driessnack et al. |
| 2012/0215578 A1 | 8/2012 | Swierz et al. |
| 2012/0229867 A1 | 9/2012 | Takagi |
| 2012/0233150 A1 | 9/2012 | Naim et al. |
| 2012/0233533 A1 | 9/2012 | Yucel et al. |
| 2012/0234907 A1 | 9/2012 | Clark et al. |
| 2012/0236368 A1 | 9/2012 | Uchida et al. |
| 2012/0239454 A1 | 9/2012 | Taix et al. |
| 2012/0244891 A1 | 9/2012 | Appleton |
| 2012/0246170 A1 | 9/2012 | Iantorno |
| 2012/0254252 A1 | 10/2012 | Jin et al. |
| 2012/0254770 A1 | 10/2012 | Ophir |
| 2012/0260190 A1 | 10/2012 | Berger et al. |
| 2012/0278117 A1 | 11/2012 | Nguyen et al. |
| 2012/0284197 A1 | 11/2012 | Sitrick et al. |
| 2012/0284643 A1 | 11/2012 | Sitrick et al. |
| 2012/0297307 A1 | 11/2012 | Rider et al. |
| 2012/0300931 A1 | 11/2012 | Ollikainen et al. |
| 2012/0303262 A1 | 11/2012 | Alam et al. |
| 2012/0304098 A1 | 11/2012 | Kuulusa |
| 2012/0311496 A1 | 12/2012 | Cao et al. |
| 2012/0311672 A1 | 12/2012 | Connor et al. |
| 2012/0324348 A1 | 12/2012 | Rounthwaite |
| 2013/0015954 A1 | 1/2013 | Thorne et al. |
| 2013/0018952 A1 | 1/2013 | Mcconnell et al. |
| 2013/0018953 A1 | 1/2013 | Mcconnell et al. |
| 2013/0018960 A1 | 1/2013 | Knysz et al. |
| 2013/0024418 A1 | 1/2013 | Sitrick et al. |
| 2013/0024760 A1 | 1/2013 | Vogel et al. |
| 2013/0036369 A1 | 2/2013 | Mitchell et al. |
| 2013/0041958 A1 | 2/2013 | Post et al. |
| 2013/0054514 A1 | 2/2013 | Barrett-Kahn et al. |
| 2013/0055113 A1 | 2/2013 | Chazin et al. |
| 2013/0059598 A1 | 3/2013 | Miyagi et al. |
| 2013/0063490 A1 | 3/2013 | Zaman et al. |
| 2013/0086460 A1 | 4/2013 | Folting et al. |
| 2013/0090969 A1 | 4/2013 | Rivere |
| 2013/0097490 A1 | 4/2013 | Kotler et al. |
| 2013/0103417 A1 | 4/2013 | Seto et al. |
| 2013/0104035 A1 | 4/2013 | Wagner et al. |
| 2013/0111320 A1 | 5/2013 | Campbell et al. |
| 2013/0117268 A1 | 5/2013 | Smith et al. |
| 2013/0158964 A1 | 6/2013 | Hall et al. |
| 2013/0159832 A1 | 6/2013 | Ingargiola et al. |
| 2013/0159907 A1 | 6/2013 | Brosche et al. |
| 2013/0179209 A1 | 7/2013 | Milosevich |
| 2013/0211866 A1 | 8/2013 | Gordon et al. |
| 2013/0212197 A1 | 8/2013 | Karlson |
| 2013/0212234 A1 | 8/2013 | Bartlett et al. |
| 2013/0215475 A1 | 8/2013 | Noguchi |
| 2013/0238363 A1 | 9/2013 | Ohta et al. |
| 2013/0238968 A1 | 9/2013 | Barrus |
| 2013/0246384 A1 | 9/2013 | Victor |
| 2013/0262527 A1 | 10/2013 | Hunter et al. |
| 2013/0268331 A1 | 10/2013 | Bitz et al. |
| 2013/0297468 A1 | 11/2013 | Hirsch et al. |
| 2013/0307997 A1 | 11/2013 | O'Keefe et al. |
| 2013/0318424 A1 | 11/2013 | Boyd |
| 2013/0339051 A1 | 12/2013 | Dobrean |
| 2014/0002863 A1 | 1/2014 | Hasegawa et al. |
| 2014/0006326 A1 | 1/2014 | Bazanov |
| 2014/0012616 A1 | 1/2014 | Moshenek |
| 2014/0019842 A1 | 1/2014 | Montagna et al. |
| 2014/0033307 A1 | 1/2014 | Schmidtler |
| 2014/0043331 A1 | 2/2014 | Makinen et al. |
| 2014/0046638 A1 | 2/2014 | Peloski |
| 2014/0052749 A1 | 2/2014 | Rissanen |
| 2014/0058801 A1 | 2/2014 | Deodhar et al. |
| 2014/0059017 A1 | 2/2014 | Chaney et al. |
| 2014/0068403 A1 | 3/2014 | Bhargav et al. |
| 2014/0074545 A1 | 3/2014 | Minder et al. |
| 2014/0075301 A1 | 3/2014 | Mihara |
| 2014/0078557 A1 | 3/2014 | Hasegawa et al. |
| 2014/0082525 A1 | 3/2014 | Kass et al. |
| 2014/0095237 A1 | 4/2014 | Ehrler et al. |
| 2014/0100884 A1 | 4/2014 | Hamilton et al. |
| 2014/0101527 A1 | 4/2014 | Suciu |
| 2014/0108985 A1 | 4/2014 | Scott et al. |
| 2014/0109012 A1 | 4/2014 | Choudhary et al. |
| 2014/0111516 A1 | 4/2014 | Hall et al. |
| 2014/0115515 A1 | 4/2014 | Adams et al. |
| 2014/0115518 A1 | 4/2014 | Abdukalykov et al. |
| 2014/0129960 A1 | 5/2014 | Wang et al. |
| 2014/0136972 A1 | 5/2014 | Rodgers et al. |
| 2014/0137003 A1 | 5/2014 | Peters et al. |
| 2014/0137144 A1 | 5/2014 | Jarvenpaa et al. |
| 2014/0143252 A1 | 5/2014 | Silverstein et al. |
| 2014/0172475 A1 | 6/2014 | Olliphant et al. |
| 2014/0173401 A1 | 6/2014 | Oshlag et al. |
| 2014/0181155 A1 | 6/2014 | Homsany |
| 2014/0188546 A1 | 7/2014 | Goja |
| 2014/0188748 A1 | 7/2014 | Cavoue et al. |
| 2014/0195933 A1 | 7/2014 | Rao Dv |
| 2014/0214404 A1 | 7/2014 | Kalia et al. |
| 2014/0215303 A1 | 7/2014 | Grigorovitch et al. |
| 2014/0229816 A1 | 8/2014 | Yakub |
| 2014/0240735 A1 | 8/2014 | Salgado |
| 2014/0249877 A1 | 9/2014 | Hull et al. |
| 2014/0257568 A1 | 9/2014 | Czaja et al. |
| 2014/0278638 A1 | 9/2014 | Kreuzkamp et al. |
| 2014/0278720 A1 | 9/2014 | Taguchi |
| 2014/0280287 A1 | 9/2014 | Ganti et al. |
| 2014/0280377 A1 | 9/2014 | Frew |
| 2014/0281868 A1 | 9/2014 | Vogel et al. |
| 2014/0281869 A1 | 9/2014 | Yob |
| 2014/0282417 A1 | 9/2014 | Paveza et al. |
| 2014/0289223 A1 | 9/2014 | Colwell et al. |
| 2014/0297828 A1 | 10/2014 | Voltmer et al. |
| 2014/0304174 A1 | 10/2014 | Scott et al. |
| 2014/0306837 A1 | 10/2014 | Hauck |
| 2014/0310345 A1 | 10/2014 | Megiddo et al. |
| 2014/0324497 A1 | 10/2014 | Verma et al. |
| 2014/0324501 A1 | 10/2014 | Davidow et al. |
| 2014/0325552 A1 | 10/2014 | Evans et al. |
| 2014/0337085 A1 | 11/2014 | Li et al. |
| 2014/0359580 A1 | 12/2014 | Boissy et al. |
| 2014/0365938 A1 | 12/2014 | Black et al. |
| 2014/0372856 A1 | 12/2014 | Radakovitz et al. |
| 2014/0372932 A1 | 12/2014 | Rutherford et al. |
| 2015/0032686 A1 | 1/2015 | Kuchoor |
| 2015/0033131 A1 | 1/2015 | Peev et al. |
| 2015/0033149 A1 | 1/2015 | Kuchoor |
| 2015/0035918 A1 | 2/2015 | Matsumoto et al. |
| 2015/0039387 A1 | 2/2015 | Akahoshi et al. |
| 2015/0046209 A1 | 2/2015 | Choe |
| 2015/0046900 A1 | 2/2015 | Eldridge et al. |
| 2015/0058619 A1 | 2/2015 | Sweet et al. |
| 2015/0067556 A1 | 3/2015 | Tibrewal et al. |
| 2015/0074721 A1 | 3/2015 | Fishman et al. |
| 2015/0074728 A1 | 3/2015 | Chai et al. |
| 2015/0088822 A1 | 3/2015 | Raja et al. |
| 2015/0095752 A1 | 4/2015 | Studer et al. |
| 2015/0100336 A1 | 4/2015 | Ford et al. |
| 2015/0106736 A1 | 4/2015 | Torman et al. |
| 2015/0125834 A1 | 5/2015 | Mendoza Tascon |
| 2015/0142676 A1 | 5/2015 | Mcginnis et al. |
| 2015/0142829 A1 | 5/2015 | Lee et al. |
| 2015/0153943 A1 | 6/2015 | Wang |
| 2015/0154660 A1 | 6/2015 | Weald et al. |
| 2015/0169514 A1 | 6/2015 | Sah et al. |
| 2015/0169531 A1 | 6/2015 | Campbell et al. |
| 2015/0178657 A1 | 6/2015 | Kleehammer et al. |
| 2015/0188964 A1 | 7/2015 | Sharma et al. |
| 2015/0205830 A1 | 7/2015 | Bastide et al. |
| 2015/0212717 A1 | 7/2015 | Nair et al. |

(56) References Cited

U.S. PATENT DOCUMENTS

| | | |
|---|---|---|
| 2015/0213397 A1 | 7/2015 | Arena |
| 2015/0220491 A1 | 8/2015 | Cochrane et al. |
| 2015/0234887 A1 | 8/2015 | Greene et al. |
| 2015/0242091 A1 | 8/2015 | Lu et al. |
| 2015/0248214 A1 | 9/2015 | Gilger et al. |
| 2015/0249864 A1 | 9/2015 | Tang et al. |
| 2015/0261796 A1 | 9/2015 | Gould et al. |
| 2015/0262121 A1 | 9/2015 | Riel-Dalpe et al. |
| 2015/0278699 A1 | 10/2015 | Danielsson |
| 2015/0281292 A1 | 10/2015 | Kim et al. |
| 2015/0295877 A1 | 10/2015 | Roman et al. |
| 2015/0310126 A1 | 10/2015 | Steiner et al. |
| 2015/0317590 A1 | 11/2015 | Karlson |
| 2015/0324453 A1 | 11/2015 | Werner |
| 2015/0331846 A1 | 11/2015 | Guggilla et al. |
| 2015/0363478 A1 | 12/2015 | Haynes |
| 2015/0370540 A1 | 12/2015 | Coslovi et al. |
| 2015/0370776 A1 | 12/2015 | New |
| 2015/0370904 A1 | 12/2015 | Joshi et al. |
| 2015/0378542 A1 | 12/2015 | Saito et al. |
| 2015/0378556 A1 | 12/2015 | Ramanathan et al. |
| 2015/0378711 A1 | 12/2015 | Cameron et al. |
| 2015/0378979 A1 | 12/2015 | Hirzel et al. |
| 2015/0379472 A1 | 12/2015 | Gilmour et al. |
| 2016/0012111 A1 | 1/2016 | Pattabhiraman et al. |
| 2016/0018962 A1 | 1/2016 | Low et al. |
| 2016/0026939 A1 | 1/2016 | Schiffer et al. |
| 2016/0027076 A1 | 1/2016 | Jackson et al. |
| 2016/0035546 A1 | 2/2016 | Platt et al. |
| 2016/0041736 A1 | 2/2016 | Schulz |
| 2016/0055134 A1 | 2/2016 | Sathish et al. |
| 2016/0055374 A1 | 2/2016 | Zhang et al. |
| 2016/0057163 A1 | 2/2016 | Boffa et al. |
| 2016/0063435 A1 | 3/2016 | Shah et al. |
| 2016/0068960 A1 | 3/2016 | Jung et al. |
| 2016/0078368 A1 | 3/2016 | Kakhandiki et al. |
| 2016/0088480 A1 | 3/2016 | Chen et al. |
| 2016/0092557 A1 | 3/2016 | Stojanovic et al. |
| 2016/0098574 A1 | 4/2016 | Bargagni |
| 2016/0117308 A1 | 4/2016 | Haider et al. |
| 2016/0170586 A1 | 6/2016 | Gallo |
| 2016/0173122 A1 | 6/2016 | Akitomi et al. |
| 2016/0196310 A1 | 7/2016 | Dutta |
| 2016/0210572 A1 | 7/2016 | Shaaban et al. |
| 2016/0216948 A1 | 7/2016 | Mcpherson et al. |
| 2016/0224532 A1 | 8/2016 | Miller et al. |
| 2016/0224676 A1 | 8/2016 | Miller et al. |
| 2016/0224939 A1 | 8/2016 | Chen et al. |
| 2016/0231915 A1 | 8/2016 | Nhan et al. |
| 2016/0232489 A1 | 8/2016 | Skaaksrud |
| 2016/0246490 A1 | 8/2016 | Cabral |
| 2016/0253061 A1* | 9/2016 | Nitsan .................. G06F 3/0484 |
| | | 715/762 |
| 2016/0253982 A1 | 9/2016 | Cheung et al. |
| 2016/0259856 A1 | 9/2016 | Ananthapur Bache et al. |
| 2016/0275150 A1 | 9/2016 | Bourbonnais et al. |
| 2016/0292206 A1 | 10/2016 | Ruiz Velazquez et al. |
| 2016/0299655 A1 | 10/2016 | Migos et al. |
| 2016/0308963 A1 | 10/2016 | Kung |
| 2016/0321235 A1 | 11/2016 | He et al. |
| 2016/0321604 A1 | 11/2016 | Imaeda et al. |
| 2016/0335302 A1 | 11/2016 | Wright et al. |
| 2016/0335303 A1 | 11/2016 | Madhalam et al. |
| 2016/0335604 A1 | 11/2016 | Reminick et al. |
| 2016/0335731 A1 | 11/2016 | Hall |
| 2016/0335903 A1 | 11/2016 | Mendoza Tascon |
| 2016/0344828 A1 | 11/2016 | Hausler et al. |
| 2016/0350950 A1 | 12/2016 | Ritchie et al. |
| 2016/0381099 A1 | 12/2016 | Keslin et al. |
| 2017/0017779 A1 | 1/2017 | Huang et al. |
| 2017/0031967 A1 | 2/2017 | Chavan et al. |
| 2017/0038919 A1 | 2/2017 | Moss et al. |
| 2017/0041296 A1 | 2/2017 | Ford et al. |
| 2017/0052937 A1 | 2/2017 | Sirven et al. |
| 2017/0061342 A1 | 3/2017 | Lore et al. |
| 2017/0061360 A1 | 3/2017 | Rucker et al. |
| 2017/0061820 A1 | 3/2017 | Firoozbakhsh |
| 2017/0063722 A1 | 3/2017 | Cropper et al. |
| 2017/0075557 A1 | 3/2017 | Noble et al. |
| 2017/0076101 A1 | 3/2017 | Kochhar et al. |
| 2017/0090734 A1 | 3/2017 | Fitzpatrick |
| 2017/0090736 A1 | 3/2017 | King et al. |
| 2017/0091337 A1 | 3/2017 | Patterson |
| 2017/0093876 A1 | 3/2017 | Feng et al. |
| 2017/0109499 A1 | 4/2017 | Doshi et al. |
| 2017/0111327 A1 | 4/2017 | Wu |
| 2017/0116552 A1 | 4/2017 | Deodhar et al. |
| 2017/0124042 A1 | 5/2017 | Campbell et al. |
| 2017/0124048 A1 | 5/2017 | Campbell et al. |
| 2017/0124055 A1 | 5/2017 | Radakovitz et al. |
| 2017/0124740 A1 | 5/2017 | Campbell et al. |
| 2017/0126772 A1 | 5/2017 | Campbell et al. |
| 2017/0132296 A1 | 5/2017 | Ding |
| 2017/0132652 A1 | 5/2017 | Kedzlie et al. |
| 2017/0139874 A1 | 5/2017 | Chin |
| 2017/0139884 A1 | 5/2017 | Bendig et al. |
| 2017/0139891 A1 | 5/2017 | Ah-Soon et al. |
| 2017/0139992 A1 | 5/2017 | Morin |
| 2017/0140047 A1 | 5/2017 | Bendig et al. |
| 2017/0140219 A1 | 5/2017 | King et al. |
| 2017/0153771 A1 | 6/2017 | Chu |
| 2017/0161246 A1 | 6/2017 | Klima |
| 2017/0177556 A1 | 6/2017 | Fay et al. |
| 2017/0177888 A1 | 6/2017 | Arora et al. |
| 2017/0185575 A1 | 6/2017 | Sood et al. |
| 2017/0185592 A1 | 6/2017 | Frei et al. |
| 2017/0185668 A1 | 6/2017 | Convertino et al. |
| 2017/0200122 A1 | 7/2017 | Edson et al. |
| 2017/0201428 A1 | 7/2017 | Normandin |
| 2017/0206366 A1 | 7/2017 | Fay et al. |
| 2017/0212924 A1 | 7/2017 | Semlani et al. |
| 2017/0220813 A1 | 8/2017 | Mullins et al. |
| 2017/0221072 A1 | 8/2017 | Athulurutlrumala et al. |
| 2017/0221238 A1 | 8/2017 | Limberger |
| 2017/0228421 A1 | 8/2017 | Sharma et al. |
| 2017/0228445 A1 | 8/2017 | Chiu et al. |
| 2017/0228460 A1 | 8/2017 | Amel et al. |
| 2017/0229152 A1 | 8/2017 | Loganathan et al. |
| 2017/0236081 A1 | 8/2017 | Grady Smith et al. |
| 2017/0242921 A1 | 8/2017 | Rota |
| 2017/0257517 A1 | 9/2017 | Panda |
| 2017/0262786 A1 | 9/2017 | Khasis |
| 2017/0269805 A1 | 9/2017 | Demaris et al. |
| 2017/0270970 A1 | 9/2017 | Ho et al. |
| 2017/0272316 A1 | 9/2017 | Johnson et al. |
| 2017/0272331 A1 | 9/2017 | Lissack |
| 2017/0277620 A1 | 9/2017 | Kadioglu |
| 2017/0277669 A1 | 9/2017 | Sekharan |
| 2017/0285879 A1 | 10/2017 | Pilkington et al. |
| 2017/0285890 A1 | 10/2017 | Dolman |
| 2017/0289619 A1 | 10/2017 | Xu et al. |
| 2017/0301039 A1 | 10/2017 | Dyer et al. |
| 2017/0315683 A1 | 11/2017 | Boucher et al. |
| 2017/0315714 A1 | 11/2017 | Shyamsundar et al. |
| 2017/0315974 A1 | 11/2017 | Kong et al. |
| 2017/0315979 A1 | 11/2017 | Boucher et al. |
| 2017/0316355 A1 | 11/2017 | Shrestha et al. |
| 2017/0322963 A1 | 11/2017 | Ramamurthi et al. |
| 2017/0324692 A1 | 11/2017 | Zhou |
| 2017/0329479 A1 | 11/2017 | Rauschenbach et al. |
| 2017/0344895 A1* | 11/2017 | Roy ..................... G06F 3/0484 |
| 2017/0351252 A1 | 12/2017 | Kleifges et al. |
| 2017/0351974 A1 | 12/2017 | Rose et al. |
| 2017/0372442 A1 | 12/2017 | Mejias |
| 2017/0374205 A1 | 12/2017 | Panda |
| 2018/0001127 A1 | 1/2018 | Caouette |
| 2018/0011827 A1 | 1/2018 | Avery et al. |
| 2018/0025084 A1 | 1/2018 | Conlan et al. |
| 2018/0026954 A1 | 1/2018 | Toepke et al. |
| 2018/0032492 A1 | 2/2018 | Altshuller et al. |
| 2018/0032570 A1 | 2/2018 | Miller et al. |
| 2018/0039651 A1 | 2/2018 | Tobin et al. |
| 2018/0055434 A1 | 3/2018 | Cheung et al. |
| 2018/0068470 A1 | 3/2018 | Croft |

(56) References Cited

U.S. PATENT DOCUMENTS

| | | |
|---|---|---|
| 2018/0075104 A1 | 3/2018 | Oberbreckling et al. |
| 2018/0075115 A1 | 3/2018 | Murray et al. |
| 2018/0075413 A1 | 3/2018 | Culver et al. |
| 2018/0075560 A1 | 3/2018 | Thukral et al. |
| 2018/0081505 A1 | 3/2018 | Ron et al. |
| 2018/0081863 A1 | 3/2018 | Bathla |
| 2018/0081868 A1 | 3/2018 | Willcock et al. |
| 2018/0082072 A1 | 3/2018 | Hosie et al. |
| 2018/0088753 A1 | 3/2018 | Viegas et al. |
| 2018/0088989 A1 | 3/2018 | Nield et al. |
| 2018/0089299 A1 | 3/2018 | Collins et al. |
| 2018/0095938 A1 | 4/2018 | Monte |
| 2018/0096417 A1 | 4/2018 | Cook et al. |
| 2018/0109760 A1 | 4/2018 | Metter et al. |
| 2018/0121028 A1 | 5/2018 | Kuscher et al. |
| 2018/0121994 A1 | 5/2018 | Matsunaga et al. |
| 2018/0128636 A1 | 5/2018 | Zhou |
| 2018/0129651 A1 | 5/2018 | Latvala et al. |
| 2018/0143967 A1 | 5/2018 | Anbazhagan et al. |
| 2018/0157455 A1 | 6/2018 | Troy et al. |
| 2018/0157467 A1 | 6/2018 | Stachura |
| 2018/0157468 A1 | 6/2018 | Stachura |
| 2018/0157633 A1 | 6/2018 | He et al. |
| 2018/0173715 A1 | 6/2018 | Dunne |
| 2018/0174104 A1 | 6/2018 | Schikora et al. |
| 2018/0181650 A1 | 6/2018 | Komatsuda et al. |
| 2018/0181716 A1 | 6/2018 | Mander et al. |
| 2018/0189734 A1 | 7/2018 | Newhouse et al. |
| 2018/0210936 A1 | 7/2018 | Reynolds et al. |
| 2018/0213286 A1 | 7/2018 | Roman et al. |
| 2018/0225270 A1 | 8/2018 | Bhide et al. |
| 2018/0232422 A1 | 8/2018 | Park et al. |
| 2018/0260371 A1 | 9/2018 | Theodore et al. |
| 2018/0260435 A1 | 9/2018 | Xu |
| 2018/0262705 A1 | 9/2018 | Park et al. |
| 2018/0276417 A1 | 9/2018 | Cerezo Sanchez |
| 2018/0285149 A1 | 10/2018 | Bhandari et al. |
| 2018/0285918 A1 | 10/2018 | Staggs |
| 2018/0293217 A1 | 10/2018 | Callaghan |
| 2018/0293587 A1 | 10/2018 | Oda |
| 2018/0293669 A1 | 10/2018 | Jackson et al. |
| 2018/0329930 A1 | 11/2018 | Eberlein et al. |
| 2018/0330320 A1 | 11/2018 | Kohli |
| 2018/0357047 A1 | 12/2018 | Brown et al. |
| 2018/0357305 A1 | 12/2018 | Kinast et al. |
| 2018/0365429 A1 | 12/2018 | Segal |
| 2018/0367484 A1 | 12/2018 | Rodriguez et al. |
| 2018/0373434 A1 | 12/2018 | Switzer et al. |
| 2018/0373757 A1 | 12/2018 | Schukovets et al. |
| 2018/0374479 A1 | 12/2018 | Hall et al. |
| 2019/0004773 A1 | 1/2019 | Hoberman |
| 2019/0005094 A1 | 1/2019 | Yi et al. |
| 2019/0011310 A1 | 1/2019 | Turnbull et al. |
| 2019/0012306 A1 | 1/2019 | Dvorak |
| 2019/0012342 A1 | 1/2019 | Cohn |
| 2019/0028360 A1 | 1/2019 | Douglas et al. |
| 2019/0034395 A1 | 1/2019 | Curry et al. |
| 2019/0036989 A1 | 1/2019 | Eirinberg et al. |
| 2019/0042628 A1 | 2/2019 | Rajpara |
| 2019/0050445 A1 | 2/2019 | Griffith et al. |
| 2019/0050466 A1 | 2/2019 | Kim et al. |
| 2019/0050812 A1 | 2/2019 | Boileau |
| 2019/0056856 A1 | 2/2019 | Simmons et al. |
| 2019/0065545 A1 | 2/2019 | Hazel et al. |
| 2019/0068703 A1 | 2/2019 | Vora et al. |
| 2019/0073350 A1 | 3/2019 | Shiotani |
| 2019/0079751 A1 | 3/2019 | Foskett et al. |
| 2019/0095413 A1 | 3/2019 | Davis et al. |
| 2019/0097909 A1 | 3/2019 | Puri et al. |
| 2019/0102425 A1 | 4/2019 | Obeidat |
| 2019/0108046 A1 | 4/2019 | Spencer-Harper et al. |
| 2019/0113935 A1 | 4/2019 | Kuo et al. |
| 2019/0114308 A1 | 4/2019 | Hancock |
| 2019/0114589 A1 | 4/2019 | Voss et al. |
| 2019/0123924 A1 | 4/2019 | Embiricos et al. |
| 2019/0130413 A1 | 5/2019 | Nelson et al. |
| 2019/0130611 A1 | 5/2019 | Black et al. |
| 2019/0138583 A1 | 5/2019 | Silk et al. |
| 2019/0138588 A1 | 5/2019 | Silk et al. |
| 2019/0138653 A1 | 5/2019 | Roller et al. |
| 2019/0147030 A1 | 5/2019 | Stein et al. |
| 2019/0155821 A1 | 5/2019 | Dirisala |
| 2019/0166110 A1 | 5/2019 | Miu |
| 2019/0179501 A1 | 6/2019 | Seeley et al. |
| 2019/0199823 A1 | 6/2019 | Underwood et al. |
| 2019/0208058 A1 | 7/2019 | Dvorkin et al. |
| 2019/0213557 A1 | 7/2019 | Dotan-Cohen et al. |
| 2019/0220161 A1 | 7/2019 | Loftus et al. |
| 2019/0236188 A1 | 8/2019 | Mckenna |
| 2019/0238636 A1 | 8/2019 | Li et al. |
| 2019/0243879 A1 | 8/2019 | Harley et al. |
| 2019/0251884 A1 | 8/2019 | Burns et al. |
| 2019/0258461 A1 | 8/2019 | Li et al. |
| 2019/0258706 A1 | 8/2019 | Li et al. |
| 2019/0286839 A1 | 9/2019 | Mutha et al. |
| 2019/0306009 A1 | 10/2019 | Makovsky et al. |
| 2019/0312899 A1 | 10/2019 | Shulman et al. |
| 2019/0324840 A1 | 10/2019 | Malamut et al. |
| 2019/0325012 A1 | 10/2019 | Delaney et al. |
| 2019/0327294 A1 | 10/2019 | Subramani Nadar et al. |
| 2019/0340550 A1 | 11/2019 | Denger et al. |
| 2019/0347077 A1 | 11/2019 | Huebra |
| 2019/0349447 A1 | 11/2019 | Adams et al. |
| 2019/0361879 A1 | 11/2019 | Rogynskyy et al. |
| 2019/0361971 A1 | 11/2019 | Zenger et al. |
| 2019/0364009 A1 | 11/2019 | Joseph et al. |
| 2019/0371442 A1 | 12/2019 | Schoenberg |
| 2019/0377791 A1 | 12/2019 | Abou Mahmoud et al. |
| 2019/0391707 A1 | 12/2019 | Ristow et al. |
| 2020/0005248 A1 | 1/2020 | Gerzi et al. |
| 2020/0005295 A1 | 1/2020 | Murphy |
| 2020/0012629 A1 | 1/2020 | Lereya et al. |
| 2020/0019548 A1 | 1/2020 | Agnew et al. |
| 2020/0019595 A1 | 1/2020 | Azua Garcia |
| 2020/0026352 A1 | 1/2020 | Wang et al. |
| 2020/0026397 A1 | 1/2020 | Wohlstadter et al. |
| 2020/0042648 A1 | 2/2020 | Rao |
| 2020/0050696 A1 | 2/2020 | Mowatt et al. |
| 2020/0053176 A1 | 2/2020 | Jimenez Salgado et al. |
| 2020/0100427 A1 | 4/2020 | Beavers et al. |
| 2020/0117908 A1 | 4/2020 | Pavetic et al. |
| 2020/0125574 A1 | 4/2020 | Ghoshal et al. |
| 2020/0134002 A1 | 4/2020 | Tung et al. |
| 2020/0142546 A1 | 5/2020 | Breedvelt-Schouten et al. |
| 2020/0151630 A1 | 5/2020 | Shakhnovich |
| 2020/0159558 A1 | 5/2020 | Bak et al. |
| 2020/0175094 A1 | 6/2020 | Palmer |
| 2020/0176089 A1 | 6/2020 | Jones et al. |
| 2020/0192646 A1 | 6/2020 | Yerramreddy et al. |
| 2020/0192785 A1 | 6/2020 | Chen |
| 2020/0193388 A1 | 6/2020 | Tran-Kiem et al. |
| 2020/0236110 A1 | 7/2020 | Metzler et al. |
| 2020/0247661 A1 | 8/2020 | Rao et al. |
| 2020/0265112 A1 | 8/2020 | Fox et al. |
| 2020/0279315 A1 | 9/2020 | Manggala |
| 2020/0293337 A1 | 9/2020 | Rangasamy et al. |
| 2020/0293616 A1 | 9/2020 | Nelson et al. |
| 2020/0301678 A1 | 9/2020 | Burman et al. |
| 2020/0301902 A1 | 9/2020 | Maloy et al. |
| 2020/0310835 A1 | 10/2020 | Momchilov |
| 2020/0310888 A1 | 10/2020 | Gopalan et al. |
| 2020/0326824 A1 | 10/2020 | Magahern et al. |
| 2020/0327244 A1 | 10/2020 | Blass et al. |
| 2020/0334019 A1 | 10/2020 | Bosworth et al. |
| 2020/0341947 A1 | 10/2020 | Aziz et al. |
| 2020/0348809 A1 | 11/2020 | Drescher |
| 2020/0349320 A1 | 11/2020 | Owens |
| 2020/0356740 A1 | 11/2020 | Principato |
| 2020/0356873 A1 | 11/2020 | Nawrocke et al. |
| 2020/0372055 A1 | 11/2020 | Joko et al. |
| 2020/0374146 A1 | 11/2020 | Chhabra et al. |
| 2020/0380212 A1 | 12/2020 | Butler et al. |
| 2020/0380449 A1 | 12/2020 | Choi |
| 2020/0387664 A1 | 12/2020 | Kusumura et al. |

(56) References Cited

U.S. PATENT DOCUMENTS

| | | |
|---|---|---|
| 2020/0401581 A1 | 12/2020 | Eubank et al. |
| 2020/0401583 A1 | 12/2020 | Church et al. |
| 2020/0409949 A1 | 12/2020 | Saxena et al. |
| 2020/0410395 A1 | 12/2020 | Ray et al. |
| 2021/0014136 A1 | 1/2021 | Rath |
| 2021/0019287 A1 | 1/2021 | Prasad et al. |
| 2021/0021603 A1 | 1/2021 | Gibbons |
| 2021/0026598 A1 | 1/2021 | Zinsmeyer et al. |
| 2021/0034058 A1 | 2/2021 | Subramanian et al. |
| 2021/0034443 A1 | 2/2021 | Lowin et al. |
| 2021/0035069 A1 | 2/2021 | Parikh |
| 2021/0042796 A1 | 2/2021 | Khoury et al. |
| 2021/0049524 A1 | 2/2021 | Nachum et al. |
| 2021/0049555 A1 | 2/2021 | Shor |
| 2021/0055955 A1 | 2/2021 | Yankelevich et al. |
| 2021/0056509 A1 | 2/2021 | Lindy |
| 2021/0065203 A1 | 3/2021 | Billigmeier et al. |
| 2021/0072883 A1 | 3/2021 | Migunova et al. |
| 2021/0073526 A1 | 3/2021 | Zeng et al. |
| 2021/0075870 A1 | 3/2021 | Kempf et al. |
| 2021/0081404 A1 | 3/2021 | Kempf et al. |
| 2021/0084120 A1 | 3/2021 | Fisher et al. |
| 2021/0096852 A1 | 4/2021 | Stump et al. |
| 2021/0117864 A1 | 4/2021 | Weast et al. |
| 2021/0117893 A1 | 4/2021 | Sohum et al. |
| 2021/0124749 A1 | 4/2021 | Suzuki et al. |
| 2021/0124872 A1 | 4/2021 | Lereya |
| 2021/0136027 A1 | 5/2021 | Barbitta et al. |
| 2021/0141923 A1 | 5/2021 | Wu et al. |
| 2021/0149553 A1 | 5/2021 | Lereya et al. |
| 2021/0149688 A1 | 5/2021 | Newell et al. |
| 2021/0149925 A1 | 5/2021 | Mann et al. |
| 2021/0150489 A1 | 5/2021 | Haramati et al. |
| 2021/0157978 A1 | 5/2021 | Haramati et al. |
| 2021/0158214 A1 | 5/2021 | Witt et al. |
| 2021/0165782 A1 | 6/2021 | Deshpande et al. |
| 2021/0166196 A1 | 6/2021 | Lereya et al. |
| 2021/0166339 A1 | 6/2021 | Mann et al. |
| 2021/0173682 A1 | 6/2021 | Chakraborti et al. |
| 2021/0174006 A1 | 6/2021 | Stokes |
| 2021/0192126 A1 | 6/2021 | Gehrmann et al. |
| 2021/0203549 A1 | 7/2021 | Snehashis et al. |
| 2021/0232484 A1 | 7/2021 | Keneally et al. |
| 2021/0248311 A1 | 8/2021 | Helft et al. |
| 2021/0257065 A1 | 8/2021 | Mander et al. |
| 2021/0264220 A1 | 8/2021 | Wei et al. |
| 2021/0271726 A1 | 9/2021 | Trainor |
| 2021/0273957 A1 | 9/2021 | Boyer et al. |
| 2021/0281428 A1 | 9/2021 | Kempf et al. |
| 2021/0304020 A1 | 9/2021 | Kaplan |
| 2021/0326519 A1 | 10/2021 | Lin et al. |
| 2021/0328888 A1 | 10/2021 | Rath |
| 2021/0342145 A1 | 11/2021 | Miller et al. |
| 2021/0342785 A1 | 11/2021 | Mann et al. |
| 2021/0357579 A1 | 11/2021 | Lereya et al. |
| 2021/0365446 A1 | 11/2021 | Srivastava et al. |
| 2021/0374197 A1 | 12/2021 | Chauhan |
| 2021/0382611 A1 | 12/2021 | Gan |
| 2021/0397585 A1 | 12/2021 | Seward |
| 2022/0011732 A1 | 1/2022 | Hall |
| 2022/0066847 A1 | 3/2022 | Liu et al. |
| 2022/0099454 A1 | 3/2022 | Decrop et al. |
| 2022/0103589 A1 | 3/2022 | Shen et al. |
| 2022/0114044 A1* | 4/2022 | Singh .................... G06F 9/453 |
| 2022/0121325 A1 | 4/2022 | Roberts et al. |
| 2022/0121478 A1 | 4/2022 | Chivukula et al. |
| 2022/0122183 A1* | 4/2022 | Jacob .................. G06F 11/323 |
| 2022/0129283 A1 | 4/2022 | Sharma et al. |
| 2022/0138004 A1 | 5/2022 | Nandakumar et al. |
| 2022/0147934 A1 | 5/2022 | Chandrashekar et al. |
| 2022/0191251 A1 | 6/2022 | Gavish et al. |
| 2022/0206864 A1 | 6/2022 | Nadathur et al. |
| 2022/0221591 A1 | 7/2022 | Smith et al. |
| 2022/0222427 A1 | 7/2022 | Mann et al. |
| 2022/0229928 A1 | 7/2022 | Shachar et al. |
| 2022/0237550 A1 | 7/2022 | Jennings et al. |
| 2022/0245328 A1 | 8/2022 | Tsabba |
| 2022/0261288 A1 | 8/2022 | Viswanathan et al. |
| 2022/0291666 A1 | 9/2022 | Cella et al. |
| 2022/0292180 A1 | 9/2022 | Chauhan |
| 2022/0300850 A1 | 9/2022 | Mendez et al. |
| 2022/0308918 A1 | 9/2022 | Pandey et al. |
| 2022/0335362 A1 | 10/2022 | Nikain et al. |
| 2022/0343258 A1 | 10/2022 | Wilde et al. |
| 2022/0351564 A1 | 11/2022 | Sahani et al. |
| 2022/0357905 A1 | 11/2022 | Dohmae |
| 2022/0358190 A1 | 11/2022 | Baghani et al. |
| 2022/0375145 A1 | 11/2022 | Herath et al. |
| 2022/0382522 A1 | 12/2022 | Heynemann Nascentes Da Silva et al. |
| 2022/0413846 A1 | 12/2022 | Clarke et al. |
| 2023/0004832 A1 | 1/2023 | Sahasi et al. |
| 2023/0004900 A1 | 1/2023 | Gleave |
| 2023/0014233 A1 | 1/2023 | Xiang et al. |
| 2023/0016946 A1 | 1/2023 | Wouhaybi et al. |
| 2023/0035600 A1 | 2/2023 | Holzman et al. |
| 2023/0075183 A1 | 3/2023 | Copty et al. |
| 2023/0081880 A1 | 3/2023 | Mathur et al. |
| 2023/0083891 A1* | 3/2023 | Achin ................... G06F 3/0484 |
| | | 715/762 |
| 2023/0093470 A1 | 3/2023 | Dvornik et al. |
| 2023/0107316 A1 | 4/2023 | Ripa et al. |
| 2023/0108808 A1 | 4/2023 | Lerman |
| 2023/0113369 A1 | 4/2023 | Wang et al. |
| 2023/0142774 A1 | 5/2023 | Hashemi et al. |
| 2023/0153651 A1 | 5/2023 | Bi et al. |
| 2023/0153724 A1 | 5/2023 | Thampy et al. |
| 2023/0171241 A1 | 6/2023 | Amichay et al. |
| 2023/0188516 A1 | 6/2023 | Danilov et al. |
| 2023/0230006 A1 | 7/2023 | Bosch et al. |
| 2023/0259390 A1 | 8/2023 | Howley et al. |
| 2023/0259839 A1 | 8/2023 | Manalo et al. |
| 2023/0281023 A1* | 9/2023 | Bienfait ................... G06F 8/65 |
| | | 715/704 |
| 2023/0281040 A1 | 9/2023 | Cao |
| 2023/0316382 A1 | 10/2023 | Faricy et al. |
| 2023/0385085 A1 | 11/2023 | Singh |
| 2023/0393832 A1 | 12/2023 | Touati et al. |
| 2023/0396641 A1 | 12/2023 | Hebbagodi et al. |
| 2023/0419161 A1 | 12/2023 | Dines |
| 2024/0046142 A1 | 2/2024 | Marks et al. |
| 2024/0053727 A1 | 2/2024 | Timisescu et al. |
| 2024/0054035 A1* | 2/2024 | Bhargav ................. G06N 3/006 |
| 2024/0054526 A1 | 2/2024 | Horwitz et al. |
| 2024/0078724 A1 | 3/2024 | Brehmer et al. |
| 2024/0169519 A1 | 5/2024 | Tjon |
| 2024/0250977 A1 | 7/2024 | Shulman et al. |
| 2024/0283759 A1 | 8/2024 | Adams |
| 2024/0345807 A1 | 10/2024 | Duggal et al. |
| 2024/0361995 A1 | 10/2024 | Somasundaram et al. |
| 2024/0370708 A1* | 11/2024 | Raghavan .............. G06N 3/044 |
| 2024/0403328 A1 | 12/2024 | Hecht et al. |
| 2025/0028743 A1 | 1/2025 | Massoudian et al. |
| 2025/0063083 A1* | 2/2025 | Grinberg .......... G06Q 10/06393 |
| 2025/0130705 A1 | 4/2025 | Kimhi et al. |
| 2025/0245030 A1* | 7/2025 | Cyjon ................. G06F 3/04842 |
| 2025/0251847 A1* | 8/2025 | Pham ........................ G06F 8/38 |

FOREIGN PATENT DOCUMENTS

| | | |
|---|---|---|
| CN | 107123424 A | 9/2017 |
| CN | 107422666 A | 12/2017 |
| CN | 107623596 A | 1/2018 |
| CN | 107885656 A | 4/2018 |
| CN | 108717428 A | 10/2018 |
| CN | 112929172 A | 6/2021 |
| DE | 102013104892 A1 | 11/2014 |
| EP | 3443466 B1 | 12/2021 |
| JP | H0756821 A | 3/1995 |
| KR | 1020150100760 A | 9/2015 |
| KR | 1020220016276 A | 2/2022 |
| WO | 2004100015 A2 | 11/2004 |
| WO | 2006116580 A2 | 11/2006 |
| WO | 2008109541 A1 | 9/2008 |

(56) References Cited

FOREIGN PATENT DOCUMENTS

| WO | 2014088393 A1 | 6/2014 |
| WO | 2017202159 A1 | 11/2017 |
| WO | 2018023798 A1 | 2/2018 |
| WO | 2018042424 A1 | 3/2018 |
| WO | 2020139865 A1 | 7/2020 |
| WO | 2020187408 A1 | 9/2020 |
| WO | 2020215123 A1 | 10/2020 |
| WO | 2021096944 A1 | 5/2021 |
| WO | 2021144656 A1 | 7/2021 |
| WO | 2021161104 A1 | 8/2021 |
| WO | 2021183312 A1 | 9/2021 |
| WO | 2021220058 A1 | 11/2021 |
| WO | 2022153122 A1 | 7/2022 |
| WO | 2023186048 A1 | 10/2023 |

OTHER PUBLICATIONS

Zhang et al., "Integrating semantic NLP and logic reasoning into a unified system for fully-automated code checking," Automation in Construction, 2017, vol. 73, 2017, pp. 45-57.
Abor Jr. C., "Low-Code and No-Code AI: New AI Development—What is code anymore?!?!" Linkedin, Published Jul. 15, 2023, Retrieved from <https://www.linkedin.com/pulse/ low-code-no-code-ai-new-development-what-code-anymore-c-l-abor-jr>, 15 pages.
Anupam et al., "Personalizing the Web Using Site Descriptions," In: Proceedings of the Tenth International Workshop on Database and Expert Systems Applications, Sep. 1999, 7 pages.
Aylward, Grant, "Drag-and-Drop AI Enables Digital Workforce Deployment at Scale Share," Blue Prism, Mar. 19, 2020, Retrieved from <https://www.blueprism.com/resources/ blog/drag-and-drop-ai-enables-digital-workforce-deployment-at-scale/>, 10 pages.
Baarslag et al., "Negotiation as an Interaction Mechanism for Deciding App Permissions," In: Proceedings of the 2016 CHI Conference Extended Abstracts on Human Factors in Computing Systems, 2016, pp. 2012-2019.
Bahrebar et al., "A Novel Type-2 Fuzzy Logic for Improved Risk Analysis of Proton Exchange Membrane Fuel Cells in Marine Power Systems Application," Energies, Mar. 22, 2018, vol. 11, No. 721, pp. 1-16.
Barai et al., "Image Annotation System Using Visual and Textual Features," In: Proceedings of the 16th International Conference on Distributed Multi-media Systems, 2010, 8 pages.
Basic Walkthrough, Aug. 9, 2019, Retrieved from <https://www.youtube.com/watch?v=VpbgWyPf74g>, 16 pages.
Breitgand et al., "Serverless Data Analytics Platform: D3.1 Intital specs of the Serverless Compute and Execution Engine," CloudButton, Jul. 22, 2019, Retrieved from <https://cloudbutton.eu/docs/deliverables/CloudButton_D3.1_Public.pdf>, 56 pages.
Chen et al., "Artificial Intelligence in Education: A Review," IEEEAccess, Apr. 2020, vol. 8, pp. 75264-75278.
Demonstracion en espanol de Monday.com, Published Feb. 20, 2019, Retrieved from <https://www.youtube.com/watch?v=zOqydTgofl A>, 53 pages.
Desmedt et al., "Function-Based Access Control (FBAC) From Access Control Matrix to Access Control Tensor," In: Proceedings of the 8th ACM CCS International Workshop on Managing Insider Security Threats, 2016, 12 pages.
Donath, Judith, "Interfaces Make Meaning," Chapter 3 from The Social Machine: Designs for Living Online, 2014, pp. 41-76.
Dorn et al., "Efficient Full-Field Vibration Measurements and Operational Modal Analysis Using Neuromorphic Event-Based Imaging," Journal of Engineering Mechanics, Jul. 1, 2018, vol. 144, No. 7, 25 pages.
Features, daPulse, Nov. 2021, Retrieved from <web.archive.org/web/2014091818421/https://dapulse.com/features>, 22 pages.
Freund, Karl, "SiMa.ai Creates Drag-and-Drop Platform for Building AI Workflows," Forbes, Sep. 12, 2023, Retrieved from <https:// www.forbes.com/sites/karlfreund/2023/09/12/simaai-creates-drag-and-drop-platform-for-building-ai-workflows/?sh=789de8466046>, 6 pages.
Gutwin et al., "Supporting Informal Collaboration in Shared-Workspace Groupware," Journal of Universal Computer Science, 2008, vol. 14, No. 9, pp. 1411-1434.
High Level Overview, daPulse, 2016, Retrieved from <https://web.archive.org/web/20161104170936/https://dapulse.com>, 12 pages.
Hupfer et al., "Introducing collaboration into an application development environment," In: Proceedings of the 2004 ACM Conference on Computer Supported Cooperative Work, Nov. 2004, vol. 6, No. 3, pp. 21-24.
International Search Report and Written Opinion in PCT/IB2020/000024, mailed Jun. 9, 2020, 10 pages.
International Search Report and Written Opinion in PCT/IB2020/000658, mailed Nov. 11, 2020, 8 pages.
International Search Report and Written Opinion in PCT/IB2020/000974, mailed May 3, 2021, 15 pages.
International Search Report and Written Opinion in PCT/IB2021/000090, mailed Jul. 27, 2021, 12 pages.
International Search Report and Written Opinion in PCT/IB2021/000297, mailed Oct. 12, 2021, 17 pages.
International Search Report and Written Opinion in PCT/IB2023/061991, mailed Feb. 26, 2024, 6 pages.
International Search Report and Written Opinion in PCT/IB2023/061992, mailed Mar. 19, 2024, 7 pages.
International Search Report and Written Opinion in PCT/IB2023/061994, mailed Apr. 25, 2024, 11 pages.
International Search Report and Written Opinion in PCT/IB2024/055803, mailed 2024-09-30, 13 pages.
Ionescu et al., "A chat-centric collaborative environment for web-based real-time collaboration," 2015 IEEE 10th Jubilee International Symposium on Applied Computational Intelligence and Informatics, May 21-23, 2015, pp. 105-110.
Kantorovitz, Isaiah, "Lexical Analysis Tool," May 2004, Retrieved from <https://dl.acm.org/doi/pdf/10.1145/997140.997147>, vol. 39, No. 5, pp. 66-74.
Kollmann, Franz, "Realizing Fine-Granular Read and Write Rights on Tree Structured Documents," in: The Second International Conference on Availability, Reliability and Security, 2007, 7 pages.
Larson, Stephen, "Introducing Data Mining Concepts Using Microsoft Excel's Table Analysis Tools," Oct. 2015, Retrieved from <https://dl.acm.org/doi/pdf/10.5555/2831373.2831394>, pp. 127-129.
Lins et al., "Artificial Intelligence as a Service," Business & Information Systems Engineering, vol. 63, 2021, pp. 441-456.
List et al., "An Evaluation of Conceptual Business Process Modelling Languages," In: Proceedings of the 2006 ACM symposium on Applied Computing, Apr. 2006, pp. 1532-1539.
Monday.com Walkthrough 2018/All Features, Platforms & Thoughts, Transcription Provided, Mar. 1, 2018, pp. 1-55.
Ni et al., "Asynchronous Event-Based Visual Shape Tracking for Stable Haptic Feedback in Microrobotics," IEEE Transactions on Robotics, vol. 28, No. 5, Oct. 1, 2012, pp. 1081-1089.
Oey et al. "Developing integrated performance dashboards with Power BI—a case study in a medium-size Manufacturer." 2021 International Conference on Information Management and Technology (ICIMTech). vol. 1. IEEE, (2021): 265-270.
Pedersen et al., "Tivoli: an electronic whiteboard for informal workgroup meetings," Conference on Human Factors in Computing Systems: Proceedings of the INTERACT '93 and CHI '93 conference on Human factors in computing systems, Apr. 24-29, 1993, pp. 391-398.
Peltier, J., "Clustered and Stacked Column and Bar Charts," Peltier Technical Services, Inc., Aug. 2011, 128 pages.
Pivot table, Wikipedia, Jul. 2021, Retrieved from <https://en.wikipedia .org/w/index.php?title=Pivottable&oldid=857163289>, 5 pages.
Rodrigo, A., "Project Management with Monday.com: A 101 Introduction," Envato Tuts+, Jul. 22, 2019, Retrieved from <https://business.tutsplus.com/tutorials/project-management-with-mondaycom--cms-33586>, 11 pages.

(56) References Cited

OTHER PUBLICATIONS

Singh et al., "A Theoretical Framework of a BIM-based Multi-Disciplinary Collaboration Platform," Automation in Construction, Nov. 2011, vol. 20, pp. 134-144.

Sreenath et al., "Agent-based service selection," Journal of Web Semantics 1.3, Oct. 2003, 29 pages.

Stancu et al., "SecCollab-Improving Confidentiality for Existing Cloud-Based Collaborative Editors," In: 2017 21st International Conferences on Control Systems and Computer Science, 2017, pp. 324-331.

Stohr, E., "Workflow Automation: Overview and Research Issues," Information Systems Frontiers, 2001, pp. 281-296.

Sun et al., "Geoweaver: Advanced Cyberinfrastructure for Managing Hybrid Geoscientific AI Workflows," International Journal of Geo-Information, Feb. 2020, vol. 9, 20 pages.

Switch Presenter While Using ShowMyPC, ShowMyPC, Aug. 2016, Retrieved from <The Wayback Machine>, 1 page.

Using Filters in Overview, Published Mar. 7, 2017, Retrieved from <https://www.youtube.com/watch?v=hycANhz7gww> 1 page.

Veenendaal, A. "How to Use Generative AI For Document Extraction & Processing." SS&C Blue Prism. (2023): 1-8.

Wilson et al., "Beyond Social Graphs: User Interactions in Online Social Networks and their Implications," ACM Transactions on the Web, Nov. 2012, vol. 6, No. 4, 31 pages.

Yamada et al., "A Software Tag Generation System to Realize Software Traceability," 2010 Asia Pacific Software Engineering Conference, pp. 423-432.

* cited by examiner

AI-DRIVEN INTEGRATION SYSTEM FOR ENHANCED SAAS PLATFORM MANAGEMENT AND CROSS-PLATFORM SYNCHRONIZATION

RELATED APPLICATIONS

This application is a continuation of Patent Cooperation Treaty Application No. PCT/IL2024/050821, which claims the benefit of priority of U.S. Provisional Patent Application Nos. 63/519,519 filed on Aug. 14, 2023; 63/548,339 filed on Nov. 13, 2023 and 63/645,998 filed on May 13, 2024, the contents of which are incorporated herein by reference in their entirety.

FIELD AND BACKGROUND OF THE INVENTION

The present invention relates to the field of software as a service (SaaS) platforms and project management systems. More specifically, it pertains to methods and systems for integrating generative artificial intelligence (AI) capabilities within SaaS platforms to enhance data management, project coordination, and cross-platform synchronization.

In recent years, the adoption of SaaS platforms for various business operations has grown exponentially. These cloud-based solutions offer numerous advantages, including scalability, cost-effectiveness, and accessibility. As used herein, a cloud-based solution or a cloud-based service or a software service may be any service made available to users on demand via the Internet from a cloud computing provider's server, as opposed to being provided from a company's own on-premises servers.

SUMMARY OF THE INVENTION

The present invention provides systems and methods for integrating generative artificial intelligence (AI) capabilities within Software as a Service (SaaS) platforms, addressing the challenges of data fragmentation, manual synchronization, limited cross-platform visibility, and inefficient workflow management in modern business environments.

In one aspect, embodiments of the present invention comprise a system and a method for managing data updates across multiple SaaS platforms. This system includes processors configured to maintain an object data source containing data objects linked to project boards, receive data messages from various software services, analyze these messages to identify deviations between task statuses and process statuses, and automatically update the boards to reflect the current project state.

Another aspect of embodiments of the present invention involve a system and a method for managing software services and coordinating actions across multiple platforms. This system analyzes data from various software services, identifies deviations between task statuses and process statuses, calculates instructions for software processes based on these deviations, and transmits these instructions to the relevant software services.

Embodiments of the present invention may also encompass a system and a method for managing communication between services and a project management software platform using AI agents. This method involves maintaining a project management software platform AI agent, establishing question-and-answer sessions between this agent and multiple software service AI agents, and using the data from these sessions to calculate update instructions for project management boards and action instructions for software processes.

Furthermore, the embodiments of the present invention include a system and a method for using generative AI for intent-based interaction within a SaaS platform. This system maintains an AI model trained on user interactions, analyzes logical relations between items in a target board, and performs actions to optimize the board's structure and efficiency without requiring specific user instructions.

Lastly, embodiments of the present invention comprise a system and a method for AI-driven cross-departmental account health monitoring and notification within a SaaS platform. This system uses an AI model to analyze work management platform data across different departments, identify deviations from regular workflows, determine underlying causes, and automatically route notifications to the most appropriate departments for addressing these issues.

These aspects of the invention work in concert to provide a comprehensive solution for enhancing data synchronization, workflow optimization, and cross-platform integration in complex SaaS ecosystems. By leveraging advanced AI techniques, the invention aims to significantly improve organizational efficiency, decision-making processes, and overall productivity in modern, digitally-driven business environments.

In some embodiments of the present invention, a system for managing data updates is provided, comprising one or more processors configured to execute code to: maintain an object data source containing multiple data objects linked to one or more boards, wherein the boards indicate a plurality of task statuses for multiple tasks assigned to multiple users assigned with credentials to access the one or more boards documenting data of a project; receive multiple data messages from a plurality of software services connected to a network, wherein the plurality of software services manage multiple software processes which are executed independently from the one or more boards and related to the project, and at least some of the data messages indicate a plurality of process statuses of at least some of the multiple software processes; analyze data from the data messages and data objects to identify one or more deviations between the plurality of task statuses and the plurality of process statuses; calculate instructions to update the one or more boards based on the identified one or more deviations; and execute the instructions to update the one or more boards based on the identified deviation.

Optionally, the one or more processors are configured to execute code to analyze the data from the data messages and the data objects using a machine learning model.

Optionally, the machine learning model is trained based on: (1) multiple historical data objects linked to historical boards indicating the plurality of task statuses for multiple historical tasks assigned to multiple historical users assigned with credentials to access a plurality of historical boards and related to historical projects, and (2) historical multiple data messages from the plurality of software services when managed multiple historical software processes which are executed independently from the one or more historical boards but in relation to the historical projects.

Optionally, the one or more processors are further configured for executing the code to display on a graphical user interface a notification indicative of the deviation and a selectable graphical element adapted to receive a user selection indicative of a user intent to execute the instructions.

Optionally, the instructions to update the one or more boards are based on outputs of the machine learning model.

Optionally, the plurality of software services are cloud-based services and the multiple data messages are received using Application Programming Interface (API).

Optionally, the multiple data messages are received from one or more generative AI agents executed on the plurality of software services as one or more users of the plurality of software services.

Optionally, the data messages are received from one or more generative AI agents by another generative AI agent executed as a user having credentials to access the one or more boards documenting data of the project.

Optionally, the one or more processors are further configured to: analyze historical patterns of deviations and updates; predict future deviations based on current project data and historical patterns; proactively suggest preventive actions to mitigate predicted deviations.

Optionally, the system further comprises a natural language processing module configured to: interpret unstructured data from the data messages; extract relevant information for updating the one or more boards; generate human-readable summaries of the identified deviations and updates.

Optionally, the one or more processors are further configured to: analyze update patterns and user behavior; automatically adjust the frequency and timing of updates based on user activity patterns to minimize disruptions.

Optionally, the system further comprises a permission management module configured to: dynamically adjust user permissions across the one or more boards based on their activities in the connected third-party applications; ensure data privacy and security when propagating updates from one platform to another.

Optionally, the one or more processors are further configured to: generate and maintain a dependency graph of tasks across multiple platforms; use the dependency graph to prioritize updates and identify critical path changes.

Optionally, the system further comprises an anomaly detection module configured to: identify unusual patterns or outliers in the data messages or update patterns; flag potential data quality issues or security concerns for review.

Optionally, the one or more processors are further configured to: analyze the efficiency of different third-party tools based on the frequency and nature of updates; generate reports on tool usage and effectiveness to inform IT strategy and tool selection.

In some embodiments of the present invention, a system for managing software services is provided, comprising one or more processors configured to execute code to: maintain an object data source containing multiple data objects linked to one or more boards assigned to a project, wherein the boards indicate a plurality of task statuses for multiple tasks assigned to multiple users assigned with credentials to access the one or more boards; receive multiple data messages from a plurality of software services connected to a network, wherein the plurality of software services manage multiple software processes which are executed independently from the one or more boards with regard to the project, and at least some of the data messages indicate a plurality of process statuses of at least some of the multiple software processes; analyze data from the data messages and data objects to identify one or more deviations between the plurality of task statuses and the plurality of process statuses; calculate instructions for at least some of the multiple software processes based on the identified one or more deviations; and transmit the instructions to at least some of the plurality of software services.

Optionally, calculate instructions comprises calculate instructions to execute a sub process of one of the at least some software processes based on one or more task statuses of one or more other of the at least some software processes.

Optionally, the analysis of data from the data messages and data objects is performed using a machine learning model.

Optionally, the machine learning model is trained based on: (1) multiple historical data objects linked to historical boards indicating the plurality of task statuses for multiple historical tasks assigned to multiple historical users assigned with credentials to access a plurality of historical boards and related to historical projects, and (2) historical multiple data messages from the plurality of software services when managing multiple historical software processes which were executed independently from the one or more historical boards but in relation to the historical projects.

Optionally, the instructions are transmitted to the at least some of the plurality of software services using a generative AI agent having credentials to access the one or more boards.

Optionally, the plurality of software services includes one or more of collaborative platforms, project management tools, communication systems, and productivity applications.

Optionally, the plurality of software services receives the data using generative AI agents registered as users in these software services.

Optionally, the generative AI agents registered as users in the software services have specific credentials and permissions within those services.

Optionally, the generative AI agent is configured to formulate instructions in a format compatible with a receiving software service.

Optionally, the machine learning model is periodically updated based on the outcomes of previously calculated instructions.

Optionally, the one or more processors are further configured to: maintain a log of the identified deviations and the calculated instructions for auditing purposes.

Optionally, the system is configured to adapt its communication protocols based on the specific requirements of each software service platform.

In some embodiments of the present invention, a method for managing communication between services and a project management software platform is provided, comprising: execute on one or more processors a code for: maintaining a project management software platform AI agent that interacts with alphanumeric data stored in multiple data objects, establishing question-and-answer sessions on text-based communication channels between the project management software platform AI agent and one or more of multiple software service AI agents where: some or all software service AI agents interact with software services managing multiple software processes and run independently from project management boards, based on data from the question-and-answer sessions, calculating update instructions for the project management boards, and/or action instructions for the software processes, and executing the update instructions and/or transmitting the action instructions over a network.

Optionally, the project management software platform AI agent utilizes a machine learning model to interact with the alphanumeric data and conduct the question-and-answer sessions.

Optionally, the machine learning model is trained based on: (1) historical data objects linked to historical boards indicating task statuses for historical tasks assigned to historical users with credentials to access historical boards related to historical projects, and (2) historical question-and-answer session data between the project management software platform AI agent and the software service AI agents related to historical software processes.

Optionally, the software services include various types of collaborative platforms, project management tools, communication systems, and productivity applications commonly used in professional environments.

Optionally, the software service AI agents are registered as users with specific credentials and permissions within their respective software services.

Optionally, calculating update instructions and/or action instructions is performed using a machine learning model that analyses patterns and discrepancies between project management board data and software process data.

Optionally, the method further comprises: maintaining a log of the question-and-answer sessions, calculated instructions, and outcomes for auditing and model improvement purposes.

Optionally, the project management software platform AI agent and the software service AI agents use natural language processing to conduct the question-and-answer sessions.

Optionally, the action instructions transmitted to the software services are formulated by the project management software platform AI agent in a format compatible with the receiving software service.

Optionally, the method further comprises: periodically updating the project management software platform AI agent based on the outcomes of previously calculated instructions and executed actions.

Optionally, the question-and-answer sessions are initiated automatically based on predefined triggers in either the project management boards or the software processes.

In some embodiments of the present invention, a system for using generative artificial intelligence for intent-based interaction is provided, comprising: one or more processors configured to: maintain a generative artificial intelligence (AI) model trained on multiple interactions of multiple users with alphanumeric data stored in a plurality of items representing the alphanumeric data in a plurality of different boards, wherein the interactions include types of actions performed on the data without including the content itself; perform an analysis of a plurality of logical relations between a plurality of items in a target board using the generative AI model to calculate, based on the analysis, one or more actions to be performed on the target board, wherein the actions include modifications to the board structure or metadata; and perform the identified one or more actions without requiring specific instructions on how to perform the one or more actions from a user.

Optionally, the analysis includes an analysis of user inputs provided to edit or update data within the target board.

Optionally, the one or more actions includes executing an AI agent for autonomously reaching out to users to receive missing information necessary to perform the one or more actions.

Optionally, the AI agent deduces which user is responsible for at least one of a bottleneck and a mismatch in a workflow and approaches the one or more relevant users for a solution.

Optionally, the system further comprises an interface for chatting about outputs provided by the AI agent and receiving platform context based on which the reasoning for an output was generated.

Optionally, the one or more processors are further configured to analyze user interaction logs to identify patterns of repetitive tasks that can be automated.

Optionally, the one or more processors are further configured to generate and present to the user automated workflow suggestions based on the identified patterns of repetitive tasks.

Optionally, the one or more processors are further configured to detect instances of suboptimal use of platform elements within the target board.

Optionally, the one or more processors are further configured to generate and present to the user recommendations for more efficient use of platform elements.

Optionally, the generative AI model is further trained to identify best practices for board organization and data management across the multiple boards.

Optionally, the one or more processors are further configured to monitor user interactions with the target board in real-time and provide proactive suggestions for improving board utilization.

Optionally, the analysis of logical relations includes identifying dependencies between items and optimizing workflows based on these dependencies.

Optionally, the one or more processors are further configured to generate a natural language explanation of the performed actions and their expected impact on board efficiency.

Optionally, the generative AI model is periodically updated based on new user interactions and feedback to improve its recommendations and automated actions.

Optionally, the one or more processors are further configured to track the effectiveness of performed actions over time and adjust future recommendations based on observed outcomes.

In some embodiments of the present invention, a system for AI-driven cross-departmental account health monitoring and notification within a SaaS platform is provided, comprising: one or more processors configured to: maintain a generative artificial intelligence (AI) model trained on organizational structures, departmental interactions, and work management platform data from multiple accounts; access an account and analyze SaaS platform data to determine different departments within the account; analyze work management platform data of each of the different departments to interpret actions in the context of their respective divisions and find a deviation from a regular workflow within a first department from the different departments; use the AI model to identify at least one work pattern or underlying cause for the deviation; select one or more of the other departments best positioned to address the identified issue based on the AI model's analysis; and automatically route a notification detailing at least one of the identified deviation, a potential impact of the deviation, at least one recommended action to handle the deviation to the selected department(s).

Optionally, the one or more processors are further configured to: track the resolution progress of the identified issue; analyze the effectiveness of the selected department in addressing the issue; update the AI model based on the resolution progress and effectiveness analysis to improve future department selection and notification routing.

Optionally, the one or more processors are further configured to: analyze task completion patterns across multiple sprints; identify recurring postponements or delays in task completion; use the AI model to deduce potential staffing issues in specific departments; generate and route notifications to relevant departments with recommendations for addressing the identified staffing issues.

Optionally, the generated notification includes AI-driven recommendations for remedying the identified deviation, tailored to the capabilities and resources of the selected department.

Optionally, the AI model is continuously updated based on the outcomes of previous notifications and remedial actions across multiple accounts, improving its ability to identify deviations, select appropriate departments, and suggest effective solutions.

Optionally, the one or more processors are further configured to: analyze interdepartmental dependencies and workflows; identify potential bottlenecks or inefficiencies in cross-departmental processes; generate recommendations for optimizing interdepartmental collaborations based on the AI model's analysis.

Optionally, the AI model is capable of prioritizing identified deviations based on their potential impact on overall account health and business objectives.

Optionally, the system provides a user interface for authorized personnel to review, modify, and approve AI-generated notifications before they are routed to the selected department(s).

Optionally, the AI model is capable of predicting future deviations based on historical data and current trends, enabling proactive notification and prevention of potential issues.

Optionally, the system is configured to integrate with existing communication channels and work management tools used by the account to seamlessly deliver notifications and track resolution progress.

Optionally, the one or more processors are further configured to: analyze, using a generative AI model, the utilization of resources before and during the identified deviation; determine, based on the analysis, a probable cause of the deviation, wherein the probable cause is categorized as one of: (a) over-utilization of resources, indicating overworked employees, employee churn, or insufficient staffing; (b) under-utilization of resources, indicating ineffective work processes or missing tools; incorporate the determined probable cause into the notification routed to the selected department(s); and generate, using the generative AI model, specific recommendations to address the probable cause of the deviation.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 5:
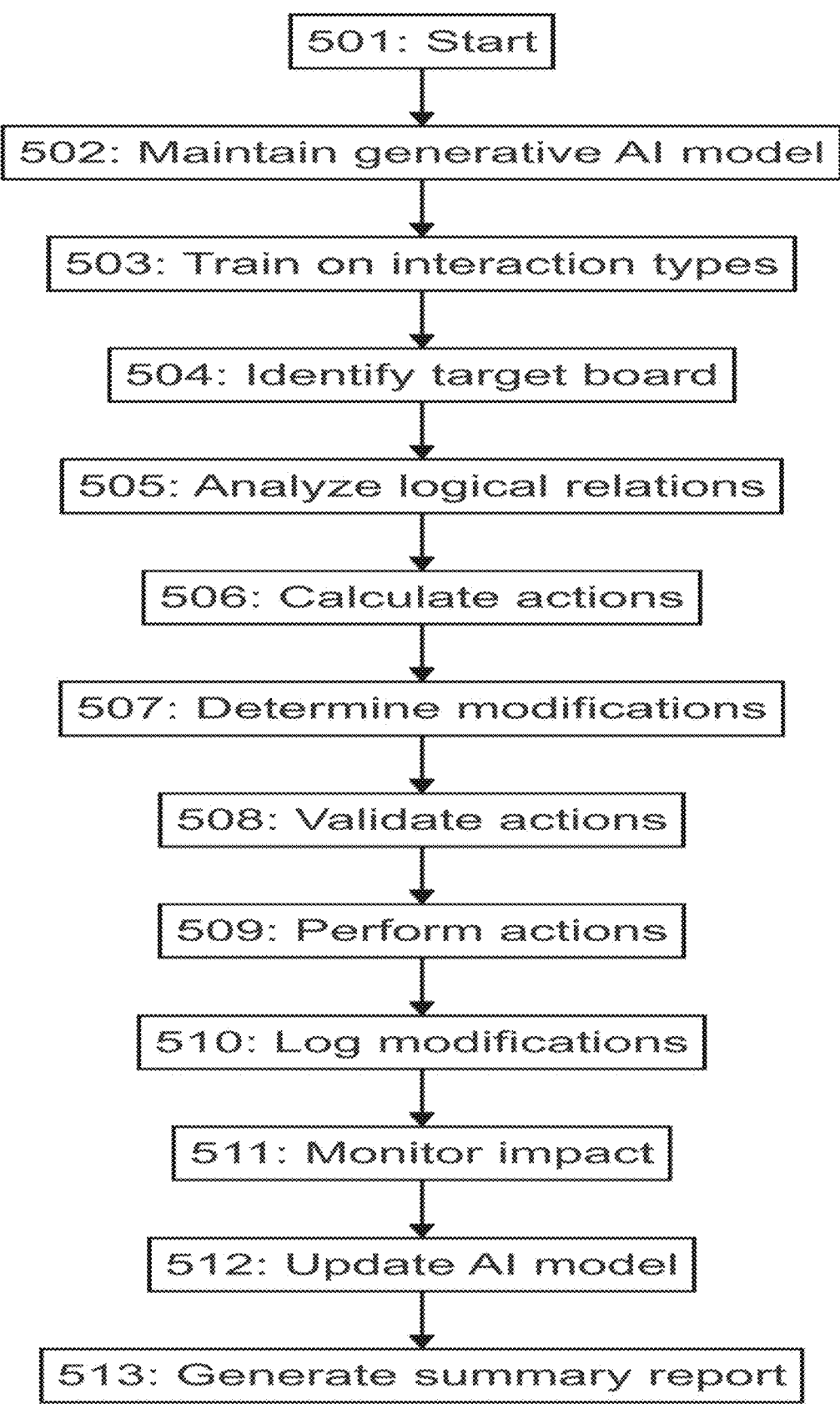
Figure 6:
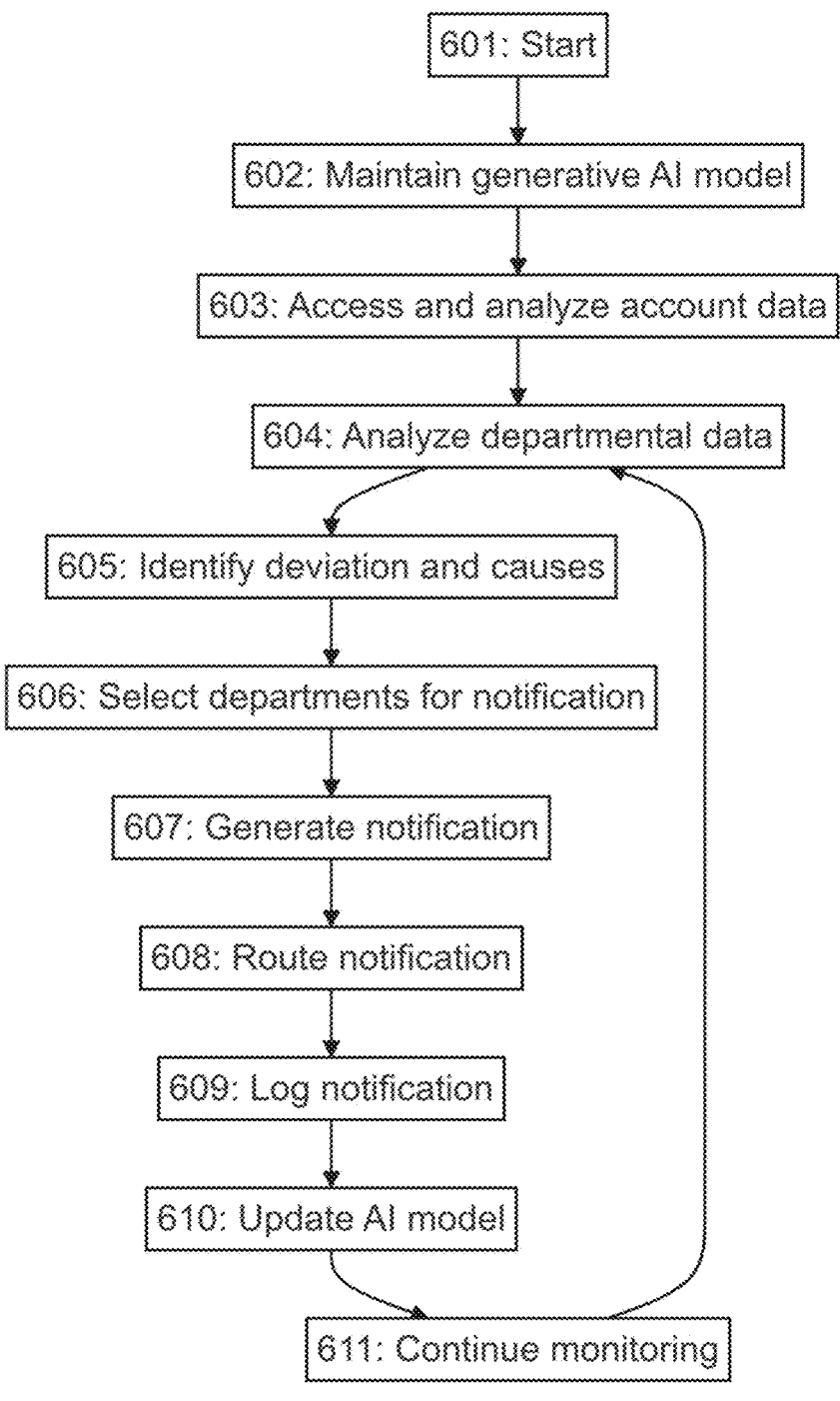

FIG. 5 is a flowchart depicting a process for using generative artificial intelligence for intent-based interaction within a project management system, consistent with some embodiments of the present disclosure; and FIG. 6 is a flowchart depicting a process for AI-driven cross-departmental account health monitoring and notification within a SaaS platform, consistent with some embodiments of the present disclosure.

DESCRIPTION OF SPECIFIC EMBODIMENTS OF THE INVENTION

The present invention, in some embodiments thereof, relates to methods for implementing artificial intelligence capabilities in software applications and, more particularly, but not exclusively, to systems and methods for integrating generative artificial intelligence within SaaS platforms.

As organizations increasingly rely on multiple SaaS tools for different aspects of their operations, several challenges have emerged:

1. Data Fragmentation: Information often becomes siloed across different platforms, leading to inconsistencies and inefficiencies.
2. Manual Synchronization: Keeping data updated across multiple systems often requires time-consuming manual efforts, prone to human error.
3. Limited Cross-Platform Visibility: Decision-makers struggle to gain a holistic view of projects and processes spanning multiple tools.
4. Inefficient Workflow Management: The lack of seamless integration between platforms can result in workflow bottlenecks and reduced productivity.
5. Inconsistent User Experiences: Different interfaces and functionalities across various tools can lead to user confusion and decreased adoption rates.
6. Scalability Issues: As organizations grow, manually managing data across an increasing number of platforms becomes increasingly challenging.

While some integration solutions exist, they often rely on static, pre-defined rules that lack the flexibility to adapt to evolving business needs. Additionally, these solutions typically focus on data transfer rather than intelligent analysis and decision-making. The rapid adoption of multiple SaaS platforms and project management tools in modern businesses has led to a fragmented digital ecosystem. While these tools offer specialized functionalities, their lack of seamless integration creates significant challenges:

1. Data Inconsistency: Information often becomes outdated or contradictory across different platforms, leading to confusion and inefficient decision-making.
2. Manual Synchronization Burden: Employees spend considerable time manually updating information across various systems, reducing productivity and introducing human error.
3. Limited Cross-Platform Visibility: Managers struggle to gain a comprehensive view of projects and processes that span multiple tools, hindering effective oversight and strategic planning.
4. Workflow Inefficiencies: The lack of intelligent, automated coordination between platforms results in process bottlenecks and reduced operational efficiency.
5. Siloed Departmental Operations: Different departments using separate tools often leads to communication gaps and reduced collaboration.
6. Scalability Constraints: As organizations grow and adopt more tools, the complexity of managing and integrating these systems increases exponentially.
7. Inability to Leverage AI Potential: Current integration solutions lack the sophisticated AI capabilities needed to provide predictive insights and adaptive automation across platforms.

Embodiments of the present invention addresses these challenges by providing a novel system and method for seamlessly integrating generative AI capabilities into SaaS platforms. By doing so, it aims to enhance data synchronization, automate cross-platform workflows, provide intelligent insights, and ultimately improve organizational efficiency and decision-making in the increasingly complex landscape of cloud-based business tools.

Some embodiments of the present invention teach how to continuously monitor and analyze data across multiple SaaS platforms, automatically identifying and reconciling discrepancies to maintain data consistency without manual intervention.

Some embodiments of the present invention teach how to use AI to coordinate tasks and processes across different software services, ensuring that actions in one platform trigger appropriate updates or workflows in others.

Some embodiments of the present invention teach how to establish an AI-driven communication channel between different SaaS platforms, enabling them to exchange information and coordinate actions autonomously.

Some embodiments of the present invention teach analysing patterns across platforms to predict potential issues and bottlenecks, proactively suggesting or implementing optimizations to improve overall efficiency.

Some embodiments of the present invention teach how to provide a unified, AI-driven interface that adapts to user roles and preferences, offering seamless access and control across multiple integrated platforms.

Some embodiments of the present invention teach how to monitor account health across departments, automatically identifying issues and routing notifications to the most appropriate teams for resolution.

Some embodiments of the present invention teach how to use generative AI to understand user intents across platforms, automating complex multi-step processes based on simple, natural language instructions.

Each of these embodiments leverages advanced AI capabilities to create a more cohesive, efficient, and intelligent SaaS ecosystem, addressing the core challenges faced by organizations in managing their diverse digital toolsets.

Disclosed embodiments provide new and improved techniques for implementing generative AI solutions enabling enhanced data representation and management, for instance solutions involving deep learning algorithms, such as Generative AI models, for example large language models (LLM) based algorithms that can perform a variety of NLP tasks. The used generative AI models may learn the patterns and structure of input training data from systems such as described in FIG. 1A and then generate new data that has similar characteristics.

Disclosed embodiments relate to methods and systems for integrating generative AI capabilities into SaaS platforms. The disclosed innovations address the growing need for intelligent, adaptive, and efficient software solutions in cloud-based environments.

Central to at least some of the disclosed embodiments is a system for utilizing generative AI within a SaaS platform. This system displays a table structure containing items and their characteristics, incorporates an AI agent as a platform user, and provides it with contextual information about data types and structural relationships. The AI agent then generates and executes actions based on this information, enhancing the platform's functionality and user experience. As used herein, a generative AI agent may be a generative AI agent as described in co filed application titled methods for implementing artificial intelligence capabilities in software applications which is incorporated herein by reference.

At least some of the disclosed embodiments introduce a method for intent-based interactions using AI agents with varying credentials within a SaaS platform. This approach allows for selective access and actions based on specific credential sets, ensuring appropriate use of AI capabilities across different aspects of the platform.

As used herein, the term "intent" as used here refers to the user's desired end goal or outcome, rather than the specific steps needed to achieve that goal. An intent-based interaction allows users to express what they want to accomplish at a high level, without needing to specify the exact sequence of actions or processes required. For example, an intent-based interaction might involve a user stating "I want to set up a new project for the marketing team to launch our upcoming product." This expresses the user's intent or end goal. The AI system would then interpret this intent and automatically take care of the underlying steps needed, such as creating a new project workspace, setting appropriate permissions for marketing team members, creating initial task lists and timelines, setting up integrations with relevant marketing tools, and generating a basic project structure based on best practices for product launches. No indication for these steps may be provided by the user or presented to him explicitly. The AI system, with its varying levels of credentials, may perform the necessary actions across different aspects of the platform to fulfill the user's expressed intent. This allows reducing the cognitive load on users and leveraging the AI's capabilities to handle complex, multistep processes automatically.

Furthermore, the at least some of the disclosed embodiments present a system for implementing hierarchical access control for AI agents within a SaaS platform. This system grants inherited edit privileges based on departmental structures, allowing for fine-grained control over AI agent activities while maintaining organizational hierarchies.

For clarity, teaching of any method described herein, provides teaching for a system implementing this method and the teaching of any system described herein, provides teaching for a method implemented using this system.

The integration of generative AI capabilities into SaaS platforms, as described herein, offers numerous significant benefits to users and organizations alike. One primary advantage is the substantial increase in productivity and efficiency. By automating complex tasks and providing intelligent assistance, AI agents can significantly reduce the time and effort required for data analysis, decision-making, and routine operations. This allows human users to focus on higher-value activities that require creativity and strategic thinking. For example, proactive information gathering capability of the AI agents addresses a common challenge in project management and team collaboration. In another example, by autonomously identifying and collecting missing information, the AI agents minimize delays and reduce the likelihood of oversights, leading to smoother project execution and improved outcomes. The hierarchical access control system for AI agents ensures that organizations can maintain their existing security protocols and data governance policies while benefiting from AI capabilities. This feature allows for the seamless integration of AI into established workflows without compromising sensitive information or disrupting existing organizational structures. The interactive analysis of AI outputs provides a layer of transparency that is crucial for building trust in AI-driven systems. By allowing users to query and understand the reasoning behind AI-generated results, the invention promotes informed decision-making and helps mitigate concerns about the "black box" nature of AI algorithms. The management of AI resources as limited assets enables organizations to optimize their use of AI capabilities. This approach ensures that AI resources are allocated efficiently, preventing overuse or underutilization, and potentially reducing costs associated with AI implementation. The contextual data analysis feature significantly enhances the depth and accuracy of insights that can be derived from structured data. By understanding the nuances of different data types and their relationships, the AI agent can provide more meaningful and actionable insights, leading to better-informed business strategies. Furthermore, the intent-based interaction system, which uses AI agents with different credential sets, allows for a more personalized and secure user experience. Users can interact with AI agents that are appropriately scoped to their needs and permissions, enhancing both the relevance of AI assistance and the overall security of the platform.

As used herein a generative AI model is a function trained for example by using machine learning technical to receive inputs such as text, image, audio, video, and code and generate new content into any of defined modalities. For example, it can turn text inputs into an image, turn an image into a song, or turn video into text. One example of a language-based generative model is a large language model (LLM). Another example is a model adapted for creation of 3D images, avatars, videos, graphs, and other illustrations. Generative AI models can create graphs, realistic images, produce 3D models, logos, enhance or edit existing images, and the like. Another example is a model adapted for generating synthetic data to train AI models when data doesn't exist.

As used herein, a generative AI agent is a software application or an interface that is designed to mimic human conversation through text or voice interactions based on usage of generative AI models. For example, the generative AI agent is capable of maintaining a conversation with a user in natural language and simulating the way a human would behave as a conversational user of the described SaaS platform. Such agents may use deep learning and natural language processing.

All aspects of the entertainment industry, from video games to film, animation, world building, and virtual reality, are able to leverage generative AI models to help streamline their content creation process. Creators are using generative models as a tool to help supplement their creativity and work.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, it is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems via cloud-based platforms. Such systems may involve software that enables multiple users to work collaboratively using different endpoints. By way of one example, workflow management software may enable various members of a team to cooperate via a common online platform. It is intended that one or more aspects of any mechanism may be combined with one or more aspects of any other mechanisms, and such combinations are within the scope of this disclosure.

This disclosure is constructed to provide a basic understanding of a few exemplary embodiments with the understanding that features of the exemplary embodiments may be combined with other disclosed features or may be incorporated into platforms or embodiments not described herein while still remaining within the scope of this disclosure. For convenience and form the word "embodiment" as used herein is intended to refer to a single embodiment or multiple embodiments of the disclosure.

Certain embodiments disclosed herein include devices, systems, and methods for collaborative work systems that may allow one or more users to interact with information in real time. To avoid repetition, the functionality of some embodiments is described herein solely in connection with a processor or at least one processor. It is to be understood that such exemplary descriptions of functionality apply equally to methods and computer-readable media and constitute a written description of systems, methods, and computer-readable media. The underlying platform may allow a user to structure systems, methods, or computer-readable media in many ways using common building blocks, thereby permitting flexibility in constructing a product that suits desired needs. This may be accomplished through the use of boards. A board may be a table configured to contain items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond what is displayed in a table. For example, a board may further contain cell comments, hidden rows and columns, formulas, data validation rules, filters, specific formatting, audits logs, version history, cross-referencing with different boards, external linking with data sources, permissions of access or a combination thereof (i.e., board metadata). Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining one or more associated data types and may further include metadata (e.g., definitions, validation rules, ranges, hyperlinks, macros . . . ). When used herein in combination with a column, a row may be presented horizontally and a column vertically. However, in the broader generic sense as used herein, the term "row" may refer to one or more of a horizontal and/or a vertical presentation. A table or table structure as used herein, refers to data presented in horizontal and vertical rows, (e.g., horizontal rows and vertical columns) defining cells in which data is presented. A table structure may refer to any structure for presenting data in an organized manner, as previously discussed, such as cells presented in horizontal rows and vertical columns, vertical rows and horizontal columns, a tree data structure, a web chart, or any other structured representation, as explained throughout this disclosure. A cell may refer to a unit of information contained in the table structure defined by the structure of the table. For example, a cell may be defined as an intersection between a horizontal row with a vertical column in a table structure having rows and columns. A cell may also be defined as an intersection between a horizontal and a vertical row, or as an intersection between a horizontal and a vertical column. As a further example, a cell may be defined as a node on a web chart or a node on a tree data structure. As would be appreciated by a skilled artisan, however, the disclosed embodiments are not limited to any specific structure but rather may be practiced in conjunction with any desired organizational arrangement. In addition, table structure may include any type of information, depending on intended use. As an example, when used in conjunction with a project/task management application, the table structure may include any information associated with one or more tasks, such as one or more status values, projects, time-frames/deadlines, countries, persons, teams, progress statuses, a combination thereof, or any other information related to a task. In some cases, a hierarchy may be established between different items/cells in a same row. For example, a unique identifier (UID) may be assigned to an item and the other cell of the same row may then be associated with the item or the assigned UID.

While a table view may be one way to present and manage the data contained on a board, a tables or board's data may be presented in different ways. For example, in some embodiments, dashboards may be utilized to present or summarize data derived from one or more boards. A dashboard may be a non-table form of presenting data, using, for example, static or dynamic graphical representations. A dashboard may also include multiple non-table forms of presenting data. As discussed later in greater detail, such representations may include various forms of graphs or graphics (which may also be referred to more generically as "widgets"). In some instances, dashboards may also include table structure. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. In alternative scenarios, permission may not only be provided at the board level, but also at a more granular level such as rows, columns, and even individual cells, allowing for fine-grained control over who may access, view, edit, or interact with the data included in the board, particularly useful when dealing with collaborative boards. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Boards and widgets may be part of a platform that may enable users to interact with information in real-time in collaborative work systems involving electronic collaborative word-processing documents. Electronic collaborative word processing documents (and other variations of the term) as used herein are not limited to only digital files for word processing but may include any other processing document such as presentation slides, tables, databases, graphics, sound files, video files or any other digital document or file. Electronic collaborative word processing documents may include any digital file that may provide for input, editing, formatting, display, and/or output of text, graphics, widgets, objects, tables, links, animations, dynamically updated elements, or any other data object that may be used in conjunction with the digital file. Any information stored on or displayed from an electronic collaborative word processing document may be organized into blocks. A block may include any organizational unit of information in a digital file, such as a single text character, word, sentence, paragraph, page, graphic, or any combination thereof. Blocks may include static or dynamic information and may be linked to other sources of data for dynamic updates. Blocks may be automatically organized by the system or may be manually selected by a user according to preference. In one embodiment, a user may select a segment of any information in an electronic word-processing document and assign it as a particular block for input, editing, formatting, or any other further configuration.

An electronic collaborative word-processing document may be stored in one or more repositories connected to a network accessible by one or more users through their computing devices. In one embodiment, one or more users may simultaneously edit an electronic collaborative word-processing document. The one or more users may access the electronic collaborative word-processing document through one or more user devices connected to a network. User access to an electronic collaborative word processing document may be managed through permission settings set by an author of the electronic collaborative word processing document. Alternatively, permissions to specific portions of the electronic collaborative word-processing document may be provided in order to control access, facilitate collaboration, and ensure that different users have appropriate levels of involvement and authority over different parts of the content. An electronic collaborative word-processing document may include graphical user interface elements enabled to support the input, display, and management of multiple edits made by multiple users operating simultaneously within the same document.

Various embodiments are described herein with reference to a system, method, device, or computer readable medium. It is intended that the disclosure of one is a disclosure of all. For example, it is to be understood that disclosure of a computer-readable medium described herein also constitutes a disclosure of methods implemented by the computer-readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer-readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

As used herein, a non-transitory computer-readable storage medium refers to any type of physical memory on which information or data readable by at least one processor can be stored. Examples of memory include Random Access Memory (RAM), Read-Only Memory (ROM), volatile memory, nonvolatile memory, hard drives, CD ROMs, DVDs, flash drives, disks, any other optical data storage medium, any physical medium with patterns of holes, markers, or other readable elements, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within an input unit or at a remote location. Additionally, one or more computer-readable storage mediums can be utilized in implementing a computer-implemented method. The memory may include one or more separate storage devices collocated or disbursed, capable of storing data structures, instructions, or any other data. The memory may further include a memory portion containing instructions for the processor to execute. The memory may also be used as a working scratch pad for the processors or as temporary storage. Accordingly, the term computer-readable storage medium should be understood to include tangible items and exclude carrier waves and transient signals.

Some embodiments may involve at least one processor. Consistent with disclosed embodiments, "at least one processor" may constitute any physical device or group of devices having electric circuitry that performs a logic operation on an input or inputs. For example, the at least one processor may include one or more integrated circuits (IC), including application-specific integrated circuits (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random-Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction, or the processors may be of differing constructions that are electrically connected or disconnected from each other. For example, the processors may be separate circuits or integrated into a single circuit. When more than one processor is used, the processors may be configured to operate independently or collaboratively and may be co-located or located remotely from each other. The processors may be coupled electrically, magnetically, optically, acoustically, mechanically, or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, a combination of one or more of the foregoing, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or an unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near-field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column-oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), or virtual reality (VR) display.

Disclosed embodiments may include and/or access a data structure. A data structure consistent with the present disclosure may include any collection of data values and relationships among them. The data may be stored linearly, horizontally, hierarchically, relationally, non-relationally, uni-dimensionally, multi-dimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database, or NoSQL alternatives for data storage/search such as MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

Certain embodiments disclosed herein may include a processor configured to perform methods that may include triggering an action in response to an input. The input may be from a user action or from a change of information contained in a user's table or board, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data with different levels of granularity (e.g., a specific board, a plurality of boards . . . ) or across an entirety of an account or entity (e.g., multiple boards, workspaces, or projects within the account). An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more automations, logical rules, logical sentence structures, and logical (sentence structure) templates. While these terms are described herein in differing contexts, in the broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that responds to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below.

Used herein a machine learning model is an algorithm or statistical model that computer systems use to perform a specific task without using explicit instructions, relying on patterns and inference instead. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, NLP algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may include an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes, and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyperparameters, where the hyperparameters are set manually by a person or automatically by a process external to the machine learning algorithm (such as a hyperparameter search algorithm), and the parameters of the machine learning algorithm are set by the machine learning algorithm according to the training examples. In some implementations, the hyperparameters are set according to the training examples and the validation examples, and the parameters are set according to the training examples and the selected hyper-parameters.

Project management platforms are digital tools or software designed to streamline and automate various processes within an organization. They help to coordinate and manage tasks, activities, and information flow among several team members or different departments, ensuring efficient collaboration and productivity. These platforms typically provide features such as task assignment, progress tracking, notifications, and document management. In some cases, these platforms may correspond to a Software-as-a-Service (SaaS) platform. Within the context of this disclosure, a SaaS platform may refer to any kind of cloud-based software delivery model where service providers host software applications and make them accessible to users over the Internet. Instead of installing, managing, and maintaining the software locally, users access and utilize it through a web browser or thin client interface.

SaaS platforms offer a wide range of applications and services to meet various business needs such as customer relationship management (CRM), human resources management (HRM), project management, accounting, marketing automation, and more. In most scenarios, these platforms operate on a subscription basis, with customers paying recurring fees for software access and usage. SaaS platforms may provide several advantages including:

Accessibility: Users may conveniently and securely access software and data from any device with an internet connection.

Scalability: SaaS platforms may easily scale up or down to accommodate changing business requirements, providing flexibility and cost-effectiveness.

Cost-effectiveness: By eliminating upfront investments in hardware and software, SaaS may reduce initial costs. Customers may pay subscription fees based on their usage.

Maintenance and Updates: Service providers handle software maintenance, updates, and security patches, relieving customers of these responsibilities.

Collaboration: SaaS platforms often offer collaboration features, enabling multiple users to work together, share data, and communicate within the platform.

Customization: SaaS platforms can offer a high level of customization, allowing businesses to tailor the software to their specific needs. These applications can be seamlessly integrated with other business applications, particularly those offered by the same software provider. This integration enables smooth data flow and collaboration between different software systems, enhancing overall productivity and efficiency.

Some examples of SaaS platforms include Monday-.com™ for project management, Salesforce™ for CRM, Slack™ for team collaboration, Dropbox™ for file hosting and sharing, Microsoft 365™ for productivity tools, Google Workspace™ apps for productivity and collaboration tools, Zendesk™ for customer support, HubSpot™ for marketing, and Shopify™ for e-commerce.

SaaS platforms may include a plurality of SaaS platform elements which may correspond to components or building blocks of the platform that work together to deliver software applications and services over the Internet. Examples of such elements may include application software, infrastructure, or user interface. For example, a platform may offer project management capabilities to its users via dashboards, tables, text documents, a workflow manager, diverse applications offered on a marketplace, all of which constitute building blocks and therefore elements of the platform. Application offered on the marketplace may be provided by developers external to the SaaS platform, accordingly, they may utilize a user interface different from a generic user interface provided by the SaaS platform. In addition, each SaaS platform element may include a plurality of SaaS platform sub-elements which may refer to smaller components or features that are part of a larger element within a SaaS platform. These sub-elements may be designed to perform specific tasks or provide specialized functionality. The collaboration of multiple sub-elements aims to create a comprehensive and integrated SaaS solution. Examples of SaaS platform sub-element may include a widget associated with a dashboard, a column or a cell associated with a table, a workflow block associated with a workflow manager, or management tools.

Figure 1A:
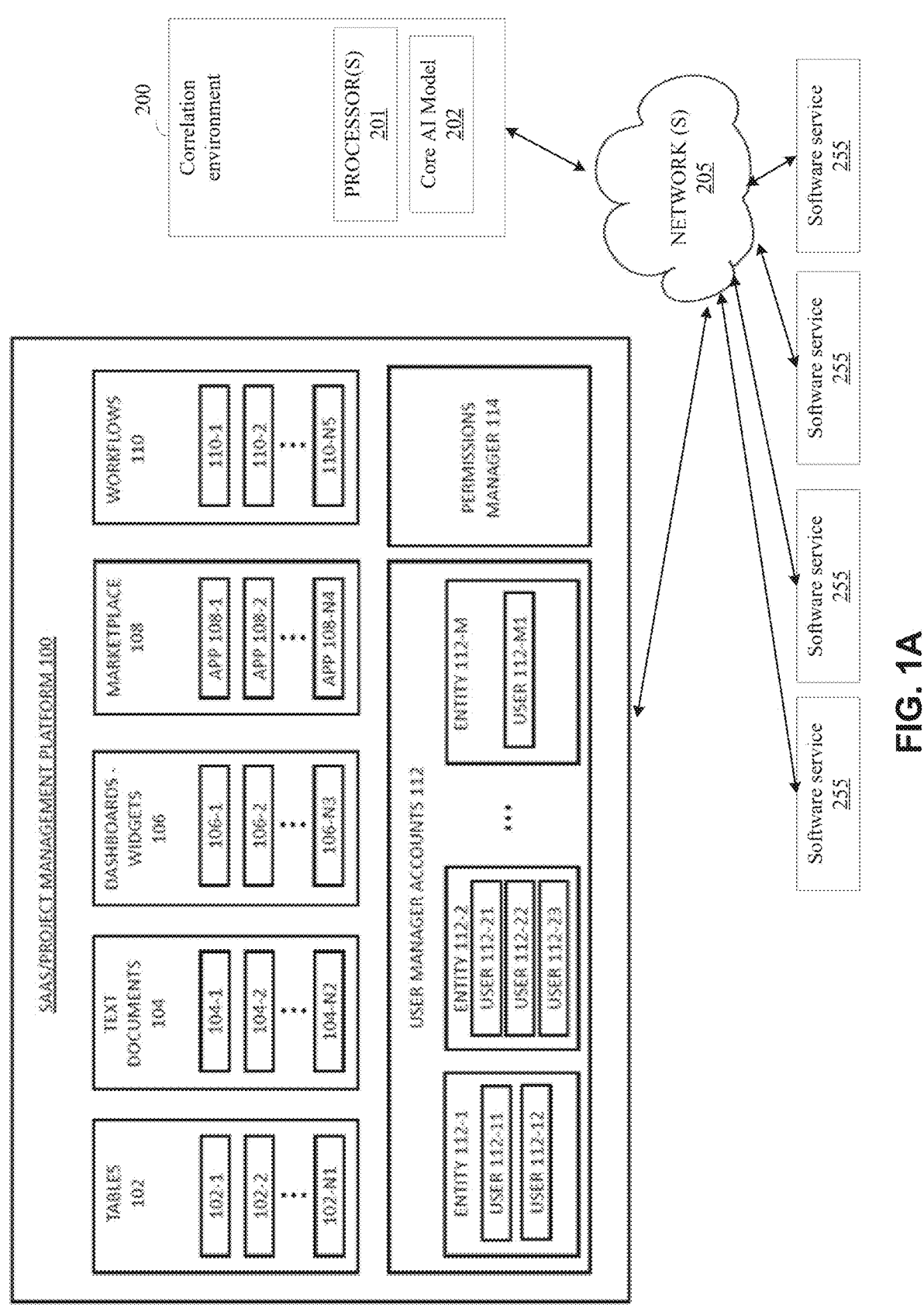
FIG. 1A is a block diagram illustrating an exemplary SaaS platform and correlation environment, consistent with some embodiments of the present disclosure.

FIG. 1A is a block diagram of an exemplary SaaS platform 100 and correlation environment 200, according to some embodiments of the present invention. Although the correlation environment 200 is depicted as a separate environment it can be part of the SaaS platform 100 itself. The correlation environment 200 may be in communication with the SaaS platform 100 as described in any of the embodiments below, for instance via network 205 or directly based on any common software component communication protocols or in the common process of executing software components.

As illustrated, SaaS platform 100 includes a plurality of SaaS platform elements, namely Tables 102, Text documents 104, Dashboards 106, Marketplace 108, and Workflows 110. Each of these SaaS platform elements includes a plurality of SaaS platform sub-elements respectively 102-1 through 102-N1 for Tables 102, 104-1 through 104-N2 for Text documents 104, 106-1 through 106-N3 for Dashboards 106, APP 20 through APP 108-N4 for Marketplace 108 and 110-1 through 101-N5 for Workflows 110, wherein N1, N2, N3, N4 and N5 represent natural numbers.

It is to be appreciated that these SaaS platform elements may collaborate seamlessly. For instance, a text document (e.g., 104-1) might incorporate data from a table (e.g., 102-1), and a dashboard/widget (e.g., 106-1) might display data originating from a table (e.g., 102-1). This integration may ensure a cohesive and flexible user experience, allowing different components of the platform to work together effectively and dynamically share data. Additionally, it is to be appreciated that the utilizations of data originating from a first SaaS platform element (e.g., a table), by a second SaaS platform (e.g., a widget included a plurality of graphical representations) may not necessarily lead to additional memory allocation on a SaaS platform server. This efficiency may be achieved because the data is not duplicated for each view (a table view or a dashboard/widget view). Instead, the data may be dynamically imported from the first SaaS platform element, often using pointers to their specific locations in memory. This approach ensures that the original data remains intact and avoids the overhead associated with creating multiple copies, thereby optimizing memory usage and improving the overall performance of the server. For example, when a user of the SaaS platform requests a graphical representation (widget view) of data from a table, the platform may retrieve the necessary data by referencing the memory locations where the data is stored, rather than creating new instances of the data. These references, or pointers, serve as links to the original data, enabling the server to efficiently handle multiple requests without incurring significant memory costs. By leveraging this method, the SaaS platform may support numerous simultaneous views and graphical representations without a proportional increase in memory usage. Furthermore, this approach allows for real-time data updates to be reflected instantly across all views. Since all views point to the same data source, any changes to the data are immediately visible, ensuring consistency and accuracy. This method may be advantageous in environments where data is frequently updated, such as in financial systems, real-time analytics, and monitoring applications.

Several entity or organization accounts (user management accounts) 112 (112-1 to 112-M, M being a natural number) may be affiliated with SaaS platform 100 and managed via a user manager. Each of these entity accounts may include at least one user account. For example, entity account 112-1 includes two user accounts 112-11, 112-12, entity account 112-2 three user accounts 112-21, 112-22, and 112-23, and entity account 112-M one user account 112-M1. Within the context of the disclosed embodiments, an entity account may refer to the central account managing the overall SaaS platform subscription, billing, and settings. Within this entity account, multiple user accounts may be created for different individuals within the entity/organization. User accounts may have their own login credentials, access privileges, and settings. The entity account owner or administrators may have control over access, permissions, and data segregation. User accounts may collaborate and share resources within the entity account while maintaining a personalized experience. Each of the user accounts 112 may include different permutations of SaaS platform elements such as a plurality of tables, text documents, dashboards, marketplace applications (e.g., 108) in association with the above-mentioned SaaS platform elements 102, 104, 106, 108, and 110. Accordingly, various SaaS platform elements or sub-elements may include metadata associated with users. Metadata associated with users may provide additional information and context about the users themselves, their profiles, roles, preferences, and interactions within the SaaS platform. Examples of metadata may include user profiles, roles and permissions, activity logs, usage indications, preferences and settings, user associations/relationships, user history or a combination thereof.

The correlation environment 200 may be a computerized system having processors and storage adapted to execute a machine learning model trained for correlating between states of statues in external software services 255 including third-party applications (e.g., JIRA, Slack, SAP, Salesforce) and data documenting the progress in tasks or related statues in one or more collaborative boards or any other table structure managed by the platform 100.

The machine learning model may be a generative AI model implemented in the correlation environment 200 using a Core AI Model 202 that incorporates Natural Language Understanding (NLU) and Natural Language Generation (NLG) capabilities. This Core AI Model can be a transformer-based model (e.g., GPT-3.5, GPT-4, or open-source alternatives like BERT or T5) executed in a framework such as PyTorch or TensorFlow and deployed on the correlation environment 200 (e.g., part of platform 100 or a separate system communicating with the platform 100) such as an NVIDIA Triton Inference Server or TensorFlow Serving.

When the correlation environment 200 is executed separately from the platform it may communicate therewith via digital data communication (e.g., a communication network 205). Examples of communication networks include a local area network ("LAN"), a wide area network ("WAN"), and the Internet.

The core model provides the foundation for both NLU and NLG functionalities. It receives processed input from the NLU component and sends raw output to the NLG component for refinement.

The NLU processes incoming messages, extracting intents and entities. It feeds processed information to the Core AI Model and updates Context Management. The NLG receives raw output from the Core AI Model, refines it based on context, and produces human-readable responses.

The NLU may be implemented using libraries such as spaCy or NLTK for text processing and intent/entity extraction. The NLG may be implemented using template-based systems like Jinja2 or neural-based approaches such as GPT-3 Application Programming Interface (API) or fine-tuned GPT-2, which receive raw output from the Core AI Model, refine it based on context from Context Management, and produce human-readable responses. As used herein API (Application Programming Interface) is a set of protocols, routines, and tools for building software applications that specifies how software components should interact.

Optionally, the generative AI model can be executed as in the correlation environment 200 or as part of the platform 100 by one or more processors 201. When executed in a separate environment, an API Integration Layer may be implemented to facilitate communication between the AI and the SaaS platform. This layer may include a RESTful API client (e.g., Python requests library), GraphQL client (e.g., gql for Python), and/or OAuth 2.0 for authentication (e.g., authlib library—an open standard for access delegation, commonly used as a way for internet users to grant websites or applications access to their information on other websites but without giving them the passwords). It sends platform responses to the Core AI Model and Context Management and receives actions to execute from a decision engine. The decision engine processes information from the Core AI Model, consults a memory and knowledge base, and determines actions. It then either initiates tasks via the Task Planning Module or generates responses through NLG.

Optionally, the correlation environment 200 includes a context management module, task planning module, and a decision engine to provide contextual information to the Core AI Model. The task planning module receives high-level objectives from the decision engine, breaks them down into steps, and coordinates with the API integration layer for execution. The Memory and Knowledge Base component interacts with the Core AI Model, Decision Engine, and Context Management, providing long-term storage and retrieval of information. It's queried by the Core AI Model and Decision Engine and updated based on new interactions and learning.

All or some of the components collect data from other components for performance tracking, error detection, and system optimization. In operation, the Decision Engine orchestrates overall behavior, the Task Planning Module manages multi-step processes, and the Context Management ensures coherence across interactions. This interconnected architecture allows for flexible, context-aware interactions while maintaining security and a capability handle a growing amount of work, or its potential to be enlarged to accommodate that growth (scalability).

In addition, each of these user accounts may include one or more private apps, that have been specifically designed and tailored to suit the needs of a user and that employ functionalities offered by or in association with SaaS platform 100 (via SaaS platform elements 102, 104, 106, 108, and 110 or their associated sub-elements). Private apps are exclusively accessible to users who are affiliated with an entity owning or implementing that app. These applications may not be publicly available (i.e., not on the market/publicly offered on the marketplace 108) and may only be accessed by individuals who have specific authorization or are part of the designated user group. The privacy settings associated with these apps restrict access to ensure that only authorized users can use and interact with them. This level of privacy and restricted access helps maintain confidentiality, control, and security over the app's functionalities and data, limiting usage to approved individuals within the user account. Centralization of user access and authorization management is performed by a permission manager 114 enabling administrators to control and regulate user privileges, ensuring that users have appropriate levels of access to data, features, and resources based on their roles and responsibilities. Permissions Manager 114 may offer granular control, and role-based access, facilitating efficient user management, collaboration, and compliance monitoring. Its objective is to enhance data security, streamline user administration, and maintain proper governance within the SaaS platform.

Still referring to FIG. 1A, SaaS platform 100 may include one or more management tools that may involve a combination of one or more SaaS platform element or sub-element. For example, a solution may leverage data stored in one or more tables and offer comprehensive data visualization through prebuilt dashboards and widgets, furnishing users with deep and meaningful insights into their operations. In some embodiments, these tools may enable visualization of alphanumeric data in a non-alphanumeric manner. For instance, instead of conventional tables or charts, these tools may employ immersive graphical interfaces or interactive simulations to depict complex datasets. These visualizations may encompass versatile views such as Kanban boards, timeline representations, Gannt charts, or other representations, offering users diverse perspectives and facilitating informed decision-making. This approach enables users to interact with the data in a more intuitive and engaging manner, facilitating deeper understanding and analysis. Each of these management tools may be coupled to a one or more user accounts 112 and may operate synergistically within SaaS platform 100, empowering users to streamline and optimize their sales processes, from lead generation to deal closure. These tools leverage the analytical capabilities of the SaaS platform to provide users with actionable insights and facilitate efficient management of their sales.

In order to provide meaningful data visualizations, management tools may access one or more data structures. A data structure refers to any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include a data pool (whether a structured or an unstructured pool), an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. Additionally or alternatively, some or all of the data structure may be organized using the Ruby on Rails web application framework. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures. A data structure may include a plurality of data items and may define the relationship between the items and the operations that may be performed on them. Each item may include one or more characteristics associated with a value (e.g., an alphanumeric value). A data structure may include a plurality of items. Examples of items may include but are not limited to a deal, a transaction, a client account, a prospect, a task, a user record, or an order. A characteristic of an item may include any distinctive feature or quality that helps to identify or define an item. The characteristics of items may include, for example, a deal size, an associated level of risk, one or more associated salespersons, a client name, a phase in the sales funnel, a client type, one or more due dates, a rate of completion, comments, or any additional feature or quality relevant to an item included in a data structure. The characteristics of an item may present relationships and patterns that offer valuable insights into customer behavior, sales trends, and operational efficiencies. For instance, analyzing the relationship between deal size and associated risk levels can help identify high-risk, high-reward opportunities or tracking the performance of salespersons in relation to deal phases and completion rates can highlight strengths and areas for improvement within the sales team.

The plurality of items of a data structure (such as a single table, a plurality of interconnected tables, or the entirety of tables in a predetermined group), may be associated with a common objective. A common objective refers to a shared goal or aim. Examples of common objectives in a business context include increasing revenues, sales, profitability, customer retention, or number of customers; or decreasing waste, expense, or loss of customers. In general, a common objective can refer to increasing a positive measure and/or decreasing a negative measure. In this context, a common objective may guide the arrangement and interaction of the individual elements towards a shared purpose or goal. This objective could span a broad spectrum, ranging from high-level aspirations, such as maximizing profitability or efficiency, to more specific aims, such as streamlining processes or achieving targeted outcomes. Whether the objective is overarching or focused, the association between the items and the common objective underscores the cohesion and purposefulness of the data structure, driving meaningful insights and outcomes. A comprehensive visualization of the data structure may provide valuable insights into the common objective. By presenting the relationships and patterns inherent within the data structure, such a visualization may enable a deeper understanding of how individual items contribute to the overarching goal. This comprehensive view may facilitate the identification of key trends, dependencies, and potential optimizations that can propel progress towards achieving the common objective. Moreover, by offering a holistic perspective, the visualization may empower user (e.g., salesperson, salesperson manager etc.) to make informed decisions and strategic adjustments, leveraging the collective knowledge embedded within the data structure to drive towards the desired common objective.

Some disclosed embodiments may involve stored data such as alphanumeric data which are accessible when a user interacts with graphical elements having a plurality of graphical characteristics. Within the context of this disclosure, alphanumeric data refers to data composed of either or both letters (alphabetic) and numbers. This type of data may include any combination of the 26 letters of the English alphabet (A-Z, a-z) and the 10 numeric digits (0-9). Additionally, alphanumeric data may also encompass ideograms, such as those used in Chinese or Japanese characters, or characters from any other alphabet, such as Cyrillic, Hebrew, Greek, or Arabic. A graphical element is a visual component that conveys information. By way of non-limiting examples, graphical elements can include shapes, lines, colors, textures, images, icons, and symbols. Discrete graphical elements refer to individual visual components that are distinct from one another, enabling visual comparison between them. Each element may adopt a plurality of graphical characteristics such as shape, color, size/dimensions, borderline, texture or position with respect to a screen and/or other presented elements, that may be used to visually encode information. In this disclosure, unless specified otherwise, a graphical element may equally refer to the visual representation/entity as presented on a display and/or to the underlying data model of the visual representation that can be readily understood and manipulated by a processing device and that includes properties defining the graphical characteristics of the visual representation.

Figure 1B:
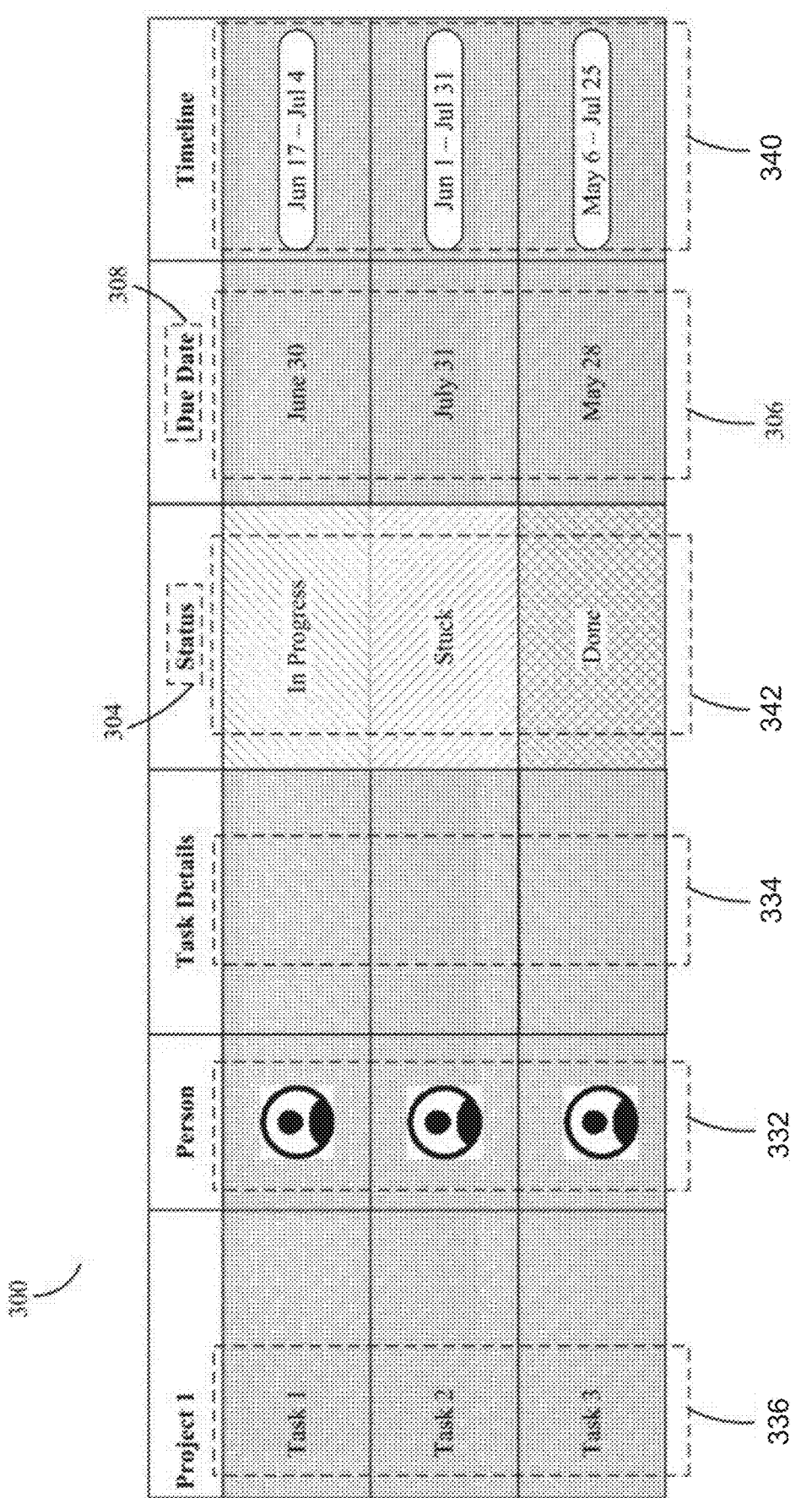
FIG. 1B illustrates an example of a table that includes multiple columns and rows, consistent with some embodiments of the present disclosure.

By way of example with reference to FIG. 1A, a platform 100 may maintain tables 102 by storage, or any combination thereof. FIG. 1B illustrates an exemplary table structure, referred to herein as table 300, that may include multiple columns and rows, consistent with some embodiments of the present disclosure. In some embodiments, the table 300 may be displayed using a computing device (e.g., the computing device or software running thereon). The table 300 may be associated with a project (e.g., "Project 1" in FIG. 1B) and may include, in the multiple rows and columns, tasks (e.g., in rows including "Task 1," Task 2," or "Task 3") and data characteristics for the tasks. Such data characteristics can be persons (e.g., in a column 332), indicating which user entities are associated with the task/are assigned to the tasks, details (e.g., in a column 334) of the tasks, statuses (e.g., in a column 342) of the tasks, due dates (e.g., in a column 336) of the tasks, timelines (e.g., in a column 340) of the tasks, or any other data characteristic of the task. For example, in a project with the common objective of launching a new product, the table might be structured as follows: Task 1 could be "Market Research," assigned to a generative AI Agent. Task 2 might be "Product Design," assigned to John from the R&D department. Task 3 could be "Financial Projections," assigned to Michael from the Finance department. Each task contributes to the common goal of product launch, and people are assigned from the departments most relevant to each task's requirements. This structure enables cooperation across departments to reach the common objective efficiently. The status column might show "In Progress" for Market Research, "Not Started" for Product Design, and "Completed" for Financial Projections, giving a quick overview of the project's progress towards the launch goal. A task may refer to a part or a portion of a project. A task may be performed by an entity (e.g., an individual or a team or a generative AI agent assigned to the task). In some embodiments, a task may be represented by a row of cells in a task table. In some embodiments, a task may be represented by a column of cells of a task table. An entity may refer to an individual, a team, a group, a department, a division, a subsidiary, a company, a contractor, a generative AI agent, or any independent, distinct organization (e.g., a business or a government unit) that has an identity separate from those of its members, or a combination thereof.

As illustrated in FIG. 1B, the at least one processor may maintain a plurality of tables (e.g., including the tables 300) and other information (e.g., metadata) associated with the plurality of tables. Each table (e.g., one of the tables 300) of the plurality of tables may include a plurality of rows (e.g., the rows of "Task 1," Task 2," and "Task 3" in the table 300) and columns (e.g., columns 332, 336, 340, 332, and 334 of the table 300).

Consistent with some disclosed embodiments, at least one processor may be configured to maintain a second table with rows and columns defining second cells. A second table may include a sub-table of the first table, a sub-table of another table, a separate table associated with the same project as the first table, a separate table associated with a different project from the project of the first table, a table associated with a same project of a same entity, a table associated with a different project of the same entity, a table associated with a same project of different entity (e.g., a second user or a teammate or a generative AI agent), or any other combinations and permutations thereof. A second table may include tables as previously described above, including horizontal and vertical rows for presenting, displaying, or enabling access to information stored therein.

A relationship between the first and the second table may be hierarchical. A hierarchical relationship, as used in the context of this disclosure, may refer to a relationship based on degrees or levels of superordination and subordination. For example, in some embodiments, the first table may be a table associated with a task or a project and the second table may be a sub-table of the first table associated with the same project or a different project. In such a scenario, the first table may be considered a superordinate table and the second table may be considered a subordinate table.

Other examples of hierarchical relationships between a first and a second table are described herein. In some embodiments, an entity may be associated with one or more projects, and the first table may be a table associated with a first project of the entity, and the second table may be a table associated with a second project of the entity. In such a case, the first table may be the superordinate table and the second table may be the subordinate table. Alternatively, the first table may be the subordinate table and the second table may be the superordinate table. In some embodiments, the first table and the second table may be tables or sub-tables associated with different entities, different projects of a same entity, different projects of different entities, or other combinations thereof.

In some disclosed embodiments, the first and the second tables may be associated with or may be a part of a workflow. A workflow may refer to a series of operations or tasks performed sequentially or in parallel to achieve an outcome. A workflow process may involve managing information stored in tables associated with one or more entities, one or more projects within an entity, or projects across multiple entities. In an exemplary workflow process, a freelancer may create an invoice and send it to a client, the client may forward the invoice to the finance department, the finance department may approve the invoice and process the payment, the customer relations department may pay the freelancer. Similarly, the workflow process may involve sending a notification from the freelancer to the client in response to a status of the invoice being "Done," mirroring the received invoice to the finance department, updating a status (e.g., not yet paid, in process, approved, and so on) of the invoice processing, and updating a status in response to payment transmitted to the freelancer.

In the context of this disclosure, it is important to note that the assignment of a generative AI agent to a cell of a table such as 300 by a user can be configured to trigger the assignment of that AI agent to the respective task and its associated information, characteristics, or entities of the project as documented in the respective row or column to which the agent is added. This assignment process is designed to be automatic and seamless when the user adds the agent to the respective cell, table, or sub-table. For instance, if a user assigns a generative AI agent to a cell in the "Person" column (332) of a specific task row, the generative AI agent is automatically granted access and assigned to all relevant information pertaining to that task, including its details, status, due date, and/or timeline. This automatic assignment may extend to any sub-tables or linked data sources associated with that task. Furthermore, the system may automatically provision appropriate credentials to the generative AI agent, allowing it to perform actions and access information within the scope of its assigned task. These credentials are dynamically adjusted based on the context of the assignment, ensuring that the AI agent has the necessary permissions to fulfill its role while maintaining data security and access control protocols. This streamlined approach to AI agent assignment and credential management enables efficient integration of AI capabilities into project workflows, enhancing productivity and decision-making processes. As used herein, any assignment of the generative AI agent as a user to task or action may be performed by the addition of the agent by a human user who uses an interactive graphical user interface presenting the respective table to a cell in the respective table, for instance by adding or selecting an avatar of the agent to the cell.

As described herein, when indicating that the generative AI agent is assigned with a role, for instance in a team assigned to a project documented in one or more table structures, the role may be given as an outcome of adding the generative AI agent to a table such as 300, by a user. In use, post adding the agent to a cell, the environment 200 automatically creates a role for that agent based on the context of its assignment. In some cases, this role definition process is dynamic and contextual, taking into account the specific characteristics of the table, the task, and/or the project as a whole. For example, when an AI agent is assigned to a row having a marketing campaign task indicated in the "Task Details" column (334), the system might automatically define its role as a "Content Strategy Assistant." In this role, the AI agent would be granted permissions to analyze past campaign data, suggest content ideas, and even draft preliminary marketing copy. Similarly, if an AI agent is added to a row having a software development task indicated in the "Task Details" column (334), it might be assigned the role of "Project Progress Monitor." In this capacity, the AI could be authorized to track task completions, identify potential bottlenecks, and send automated status updates to team members. These automatically generated roles are not static; they can evolve based on the AI agent's interactions and performance within the project ecosystem and/or changes in the values of the cells of the table. This dynamic role creation and evolution allow for a flexible and adaptive integration of AI capabilities into diverse project environments, enhancing the overall efficiency and intelligence of the project management process. In other cases, the role definition process is rigid, and the AI agent is preconfigured with a specific role to perform, and the dynamic nature thereof comes into play by utilizing the same predetermined row on a varying structure of tables with different column structure.

Figure 2:
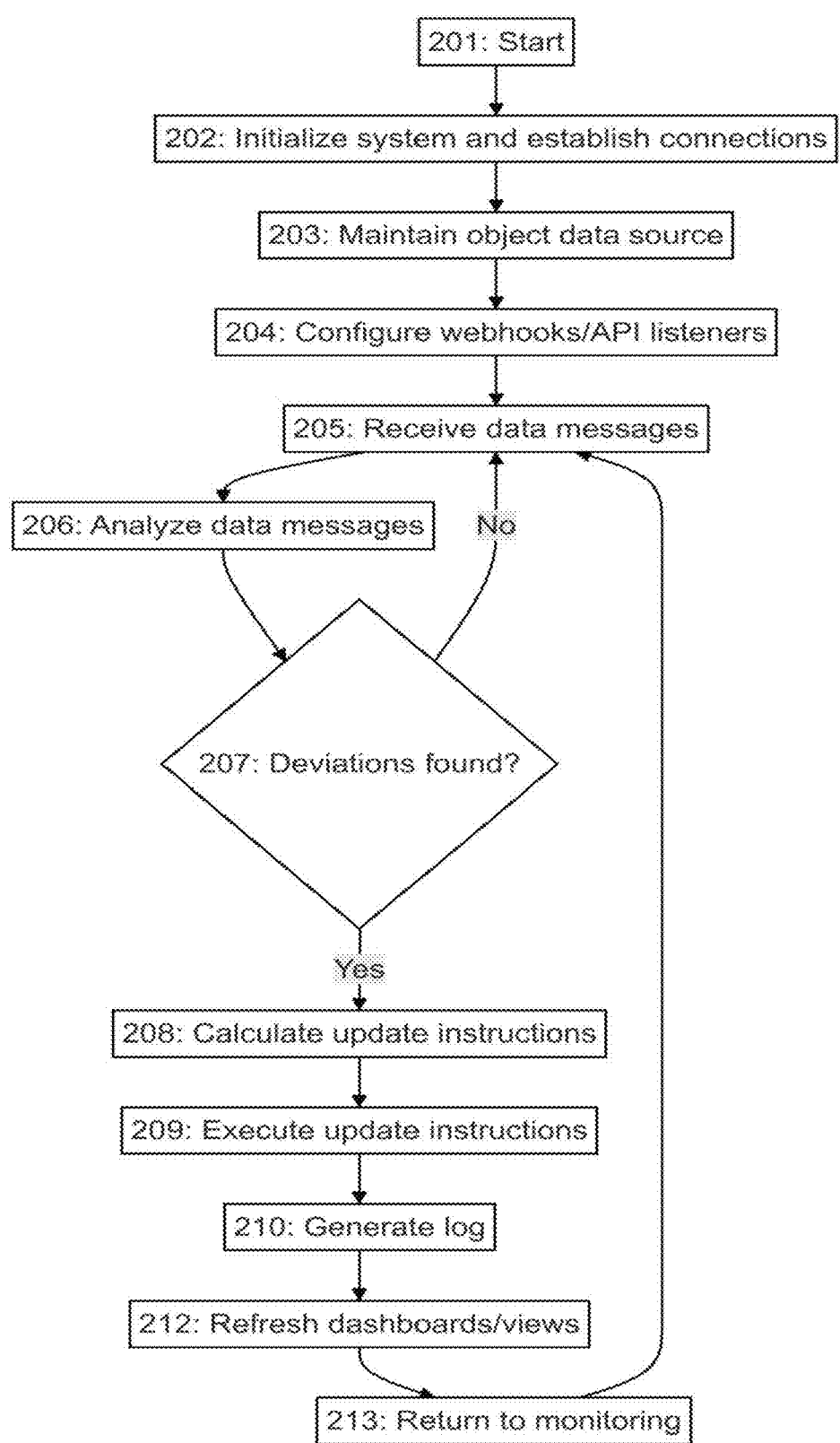
FIG. 2 is a flowchart depicting a process for managing data updates in a collaborative work management platform, consistent with some embodiments of the present disclosure.

While the third-party applications are described herein as external to the collaborative work management platform, the platform described herein may function as a multiproduct hub, encompassing the third-party applications as distinct applications that utilize a common framework but potentially operate with different data clusters. This multiproduct approach enhances the platform's versatility and integration capabilities. For instance, the platform may include a project management application and a customer relationship management (CRM) application, both built on the same underlying SaaS infrastructure. In this multiproduct ecosystem, actions in one product can trigger reactions or updates in another, demonstrating the interconnected nature of the platform. The AI-driven features described throughout this document, such as deviation detection, workflow optimization, and predictive analytics, can operate across these multiple products, providing a cohesive and intelligent user experience throughout the entire platform ecosystem. This emphasizes the platform's capability to serve as an integrated, multi-application environment, further highlighting its potential for comprehensive business process management and cross-functional optimization. FIG. 2 is a flowchart of a process for managing data updates in a collaborative work management platform, ensuring that the data presented in the system accurately reflects the reality documented in third-party applications used by a team of users, according to some embodiments of the present invention. This process may optionally utilize a machine learning model trained on historical data from the platform. The flowchart is implemented using a SaaS platform, such as the system depicted in FIG. 1A, according to some embodiments of the present invention, for instance using correlation environment 200. The machine learning model may be a supervised machine learning model (e.g., gradient boosting or neural network) that was trained on historical data. The training data optionally includes historical data objects linked to past boards, containing task statuses, user assignments, and project details and/or historical data messages from third-party software services 255, representing past process statuses. Such a model is trained to identify patterns and correlations between board data and third-party process data. After training, the model is deployed using a model serving framework (e.g., TensorFlow Serving or MLflow).

As shown at 201, the system and establish connections with third-party applications (e.g., JIRA, Slack, SAP, Salesforce) are initialized, for instance via APIs or webhooks. As used herein a webhook is a method of augmenting or altering the behavior of a web page or web application with custom callbacks.

As indicated above, the system is designed to integrate with various cloud-based software services 255. Optionally, an API gateway (e.g., Kong or AWS API Gateway) is implemented to manage and secure all API interactions. The system supports multiple API protocols, including REST, GraphQL, and gRPC, to accommodate different service requirements. API calls are rate-limited and monitored to ensure fair usage and prevent overload.

For example, when the system may be a component of a SaaS platform. This grants the system access to core services of the platform, including database connections, authentication services, and API gateways. It loads configuration files specifying the third-party applications to connect with. The system can be configured to establish connections such as secure SSL/TLS connections with each third-party application's API endpoints. Oauth 2.0 or similar authentication protocols that can be used to authenticate and authorize access to third-party services.

The correlation environment 200 may continuously monitor and receive multiple data messages from a plurality of software services connected to a network. The correlation environment 200 may implement a flexible integration layer to facilitate communication between the correlation environment 200 and various SaaS platforms. This layer supports multiple protocols to accommodate different platform requirements for platforms supporting REST architecture, the system exposes endpoints following OpenAPI 3.0 specifications. These endpoints handle CRUD operations on resources representing tasks, projects, and user data. Example endpoint structure: GET/api/v1/tasks POST/api/v1/projects PUT/api/v1/users/{user_id}. For more complex data requirements, a GraphQL server is implemented, allowing SaaS platforms to request precisely the data they need. This implementation may be used in all respective embodiments wherein communication between platforms is monitored, for example in FIGS. 2 and 3.

As shown at 202, an object data source containing multiple data objects linked to one or more boards is maintained. These boards indicate task statuses for multiple tasks assigned to users with credentials to access the boards that can be configured, for example, to document project data, for instance at the platform 100. As used herein a data object may be a representation of a real-world entity in programming, containing both data and the methods to manipulate that data. A task status may be a current state of a task in a project management system, such as "Not Started," "In Progress," "Completed," etc.

Optionally, the multiple data objects are stored in a distributed database system (e.g., PostgreSQL with sharding) that manages the data objects. Each data object may be structured as a JSON document, containing metadata about its associated board, tasks, and user assignments. Optionally, an indexing service (e.g., Elasticsearch) is employed to enable fast querying and retrieval of objects. Optionally, a caching layer (e.g., Redis) is implemented to reduce database load for frequently accessed objects.

Optionally, as shown at 203, webhooks or API listeners to monitor relevant activities in connected third-party applications are configured and activated. The system may dynamically generate unique webhook URLs for each connected third-party service. These webhook URLs may be registered with the respective third-party applications through their APIs. For services without webhook support, the system can be configured to set up scheduled jobs to poll their APIs at regular intervals. Optionally, a load balancer (e.g., NGINX) can be configured to distribute incoming webhook requests across multiple server instances.

As shown at 205, data messages from the connected software services 255 are received over the network, optionally continuously. These messages can contain information about process statuses in the third-party applications related to the project that is partially or fully executed independently from the platform's boards. The message monitoring can be achieved using an event-driven architecture (e.g., using Apache Kafka) that is implemented to handle incoming data messages. Each received message may be validated for authenticity using HMAC signatures or similar mechanisms. Valid messages may be parsed and normalized into a standard internal format for further processing. The system may implement rate limiting and backoff strategies to handle potential spikes in incoming data. As shown at 205, this allows analyzing the received data messages in conjunction with the existing data objects in the platform, for instance using the above-described machine learning model. The trained model may be used to enhance the deviation identification process where input features are extracted and normalized from current data messages and board objects. In such embodiments model may process these features to predict potential deviations and their significance. Additionally, or alternatively, for example, a stream processing engine (e.g., Apache Flink) can be used to analyze the incoming data in real-time. The engine joins the streaming data with the existing data objects retrieved from the database. Complex Event Processing (CEP) techniques may be applied to detect patterns and correlations in the data.

As shown at 206, deviations between the task statuses recorded in the platform's boards and the process statuses reported by the third-party applications are identified based on the analysis. Examples of such deviations might include:

1. Task Status Mismatch: A task marked as "Completed" on the SaaS platform's board, but showing as "In Progress" in the third-party project management tool.
2. Deadline Discrepancy: A task deadline recorded as June 15th on the SaaS platform, but updated to June 20th in the integrated calendar application.
3. Resource Allocation Conflict: A team member assigned to two concurrent tasks in the SaaS platform, but shown as on leave in the HR management system.
4. Budget Variance: A project budget recorded as $50,000 in the SaaS platform's financial module, but showing $55,000 in the connected accounting software.
5. Scope Change: A feature marked as "Approved" in the SaaS platform's product backlog, but tagged as "Under Review" in the requirements management tool.

When no deviations are found, the process returns to 205 to continue monitoring. Optionally, a rule engine (e.g., Drools) can be employed to define and evaluate conditions for identifying deviations. Machine learning models can be used to identify subtle or complex deviations. The system may maintain a state machine for each task to track its progression and detect unexpected state changes.

As shown at 207 and 208, when deviations are identified, proceed to step 208, instructions to update the affected boards based on the identified deviations are calculated. This may involve determining which specific fields or attributes are to be modified and how. The results from the deviation identification process are evaluated. Model outputs may be used to refine the update instructions calculated. If deviations are found, their severity and impact are assessed using predefined criteria, for example as described below. A decision engine may determine whether to proceed with updates based on the deviation assessment. A domain-specific language (DSL) may be used to express update instructions in a platform-agnostic manner. The system may generate a dependency graph to determine the optimal order of updates. Conflict resolution algorithms may be applied to handle cases where multiple updates affect the same data object.

The system may employ a multi-faceted approach to assess the impact of identified deviations. A machine learning model, such as a gradient boosting algorithm or a neural network, may be utilized to analyze various impact factors. This model could be trained on historical project data, including past deviations and their consequences.

The impact assessment module may interface with the project management database to extract relevant metrics. For instance, it may use graph traversal algorithms to analyze task dependencies and determine the scope of influence. Time sensitivity could be evaluated using critical path analysis algorithms, which identify tasks that directly affect project timelines. Resource allocation impact may be quantified through optimization algorithms that simulate various resource distribution scenarios. These algorithms could utilize linear programming techniques to maximize efficiency under the new constraints imposed by the deviation.

Financial implications may be calculated using predictive models that consider both direct costs and opportunity costs.

These models could incorporate Monte Carlo simulations to account for uncertainty in financial projections.

To assess quality impact, the system may employ natural language processing (NLP) techniques to analyze project requirements and deliverable specifications, comparing them against the current project state post-deviation.

Stakeholder impact could be evaluated using sentiment analysis algorithms applied to recent communications and feedback. This may involve processing unstructured data from various sources such as emails, chat logs, and survey responses. Compliance assessment may utilize rule-based systems that check the deviated state against a database of regulatory requirements and internal policies. This could be implemented using a forward-chaining inference engine.

The system may use anomaly detection algorithms to identify potential data integrity issues resulting from the deviation. These algorithms could be based on statistical methods or machine learning techniques such as isolation forests.

System performance impact may be assessed through predictive performance modeling, using time series analysis of system metrics and extrapolating the effects of the deviation. The outputs from these various analytical processes may be aggregated using a weighted scoring system, with weights dynamically adjusted based on the specific context of the project and organization. This aggregated score could then be used to categorize the overall impact into predefined levels (e.g., low, medium, high, critical). The impact assessment results may be presented through a dashboard interface, potentially utilizing data visualization libraries to create interactive charts and graphs. This comprehensive, data-driven approach to impact assessment enables informed decision-making regarding deviation response strategies.

As shown at 209, the calculated instructions to update the relevant boards, ensuring that the platform's data accurately reflects the current state of the project as documented in the third-party applications, are executed. Updates may be within a transactional context to ensure data consistency. Optionally, the system proceeds to execute the instructions only when the user approves the update. If the user declines, the system logs the decision and may trigger a review process.

As shown at 210 a log of the updates made may be generated and stored for auditing and machine learning model training purposes. When a machine learning model is being used, the model may be updated with the new data to improve future deviation detection and update calculations.

As shown at 212 any dashboards or views that are affected by the updates may be refreshed in real time to ensure users see the most current and accurate project status. Optionally, a notification about the recent update may be shown for a predetermined time period, or until a user is exposed to said notification.

As shown at 213, the process returns to 205 to continue the monitoring and updating process.

Optionally, a real-time notification service is implemented using WebSocket connections. When a deviation is identified, a notification is generated and sent to relevant users' contact details, for instance dashboards, notification center, and/or as a notification present on to the user. The notification may include a detailed description of the identified deviation, visual indicators of the affected tasks or processes, a selectable graphical element (e.g., a button) to approve the execution of update instructions. User interactions with the notification are captured and logged for auditing purposes.

Optionally, a real-time notification service is implemented using WebSocket connections. When a deviation is identified, a notification is generated and sent to relevant users' contact details, for instance dashboards, email, notification center, or as a banner on the board. The notification may include a detailed description of the identified deviation, visual indicators of the affected tasks or processes, a selectable graphical element (e.g., a button) to approve the execution of update instructions. User interactions with the notification are captured and logged for auditing purposes.

For example, consider a case where a critical bug is identified in a third-party application (e.g., GitHub) that is integrated with the SaaS platform. The system may detect this deviation through its continuous monitoring of the GitHub issue tracker. Upon detection, the following sequence of events may occur:

1. The system automatically generates a notification detailing the critical bug, including its severity level, potential impact, and the affected components.
2. This notification is immediately sent to the development team leads and project managers.
3. Simultaneously, the system may update the status of related tasks on the development board from "In Progress" to "Blocked" or "Needs Attention".
4. Optionally, the notification can include a visual representation of the affected tasks on the development board, highlighting the potential ripple effects on dependent tasks and timelines.
5. A selectable "Initiate Emergency Protocol" button may be included in the notification, which, when clicked, triggers a predefined set of actions such as creating a new high-priority task for bug fixing, reallocating resources, and adjusting project timelines.
6. The system logs all interactions with this notification, including who viewed it, when they viewed it, and any actions taken in response.

This real-time, context-aware notification system ensures that critical issues are promptly communicated and acted upon, maintaining the integrity and efficiency of the development process across integrated platforms.

The analysis of data messages and internal data objects may be performed using a combination of stream processing and batch processing techniques. Apache Kafka can be employed for real-time message ingestion and processing, while Apache Spark can be utilized for more complex, batch-oriented analyses. This hybrid approach allows the environment 200 to identify deviations quickly while still supporting deep, historical analysis when required.

For instance, the stream processing might immediately flag the task status mismatch or deadline discrepancy, while the batch processing could uncover longer-term trends such as recurring resource allocation conflicts or gradual budget variances across multiple projects.

Changes in the boards may be monitored using an event sourcing pattern, where each modification is recorded as an immutable event in an event store. This approach not only provides a complete audit trail but also enables the environment 200 to replay events for analysis or to reconstruct the state of the board at any point in time. A separate service, implemented using a microservices architecture, is responsible for processing these events and identifying changes relevant to external software services. This event sourcing approach would be particularly useful in tracking the evolution of deviations over time. For example, it could reveal how a minor scope change in the product backlog gradually escalated into a significant feature divergence between the SaaS platform and the requirements management tool.

According to some embodiments of the present invention, generative AI agents as defined in co filed application titled "methods for implementing artificial intelligence capabilities in software applications", which the content thereof is incorporated herein by reference, are deployed on the third-party software services 255 and/or platform 100. These agents are granted appropriate user-level access to their respective platforms. On third-party services, AI agents may monitor user activities and system events and/or generate structured data messages summarizing relevant changes or actions and transmit these messages to the main system via APIs. On platform 100, a master AI agent having credentials to access and update the system's boards receives and processes messages from third-party AI agents. Uses natural language processing may be to interpret incoming data and generate appropriate update instructions. All AI agent actions are logged and monitored for security and auditing purposes.

Optionally, the system can be configured with predictive capabilities to analyze historical patterns of deviations and updates. This functionality employs advanced time series analysis techniques, such as ARIMA models or recurrent neural networks, to identify trends and seasonal patterns in project data across multiple platforms. By leveraging these historical insights, the system can predict future deviations based on current project data and historical patterns. This predictive module utilizes ensemble learning methods, combining multiple machine learning algorithms to enhance prediction accuracy. Upon identifying potential future deviations, the system proactively generates suggested preventive actions. These suggestions are formulated using a combination of rule-based systems and case-based reasoning, drawing from a knowledge base of successful past interventions.

A natural language processing module may be incorporated into the system to handle unstructured data from various sources. This module can employ state-of-the-art NLP techniques, including transformer-based models like BERT or GPT, to interpret free-text comments, chat logs, and other unstructured data sources. The module extracts relevant information using named entity recognition and relationship extraction algorithms, mapping this information to the structured data schema of the project management boards. Furthermore, the NLP module can generate human-readable summaries of identified deviations and updates using abstractive summarization techniques, ensuring that complex cross-platform changes are communicated clearly to all stakeholders.

The system may incorporate an intelligent update scheduling mechanism that analyzes update patterns and user behavior. This mechanism can employ unsupervised learning algorithms, such as k-means clustering or hidden Markov models, to identify patterns in user activity across different platforms. By understanding these patterns, the system can automatically adjust the frequency and timing of updates. This adaptive scheduling aims to minimize disruptions to user workflows while ensuring data timeliness. The mechanism may also incorporate reinforcement learning techniques to continuously optimize its scheduling decisions based on user feedback and system performance metrics.

A permission management module may be implemented to handle dynamic access control across multiple platforms. This module can be configured to utilize role-based access control (RBAC) principles, extended with attribute-based access control (ABAC) for finer-grained permissions. The module can be configured to continuously monitor user activities across connected third-party applications, using this information to update a user's effective permissions in real-time. To ensure data privacy and security during cross-platform updates, the module implements data transformation and masking techniques, ensuring that sensitive information is appropriately handled based on the user's permissions in each system.

The system may generate and maintain a comprehensive dependency graph of tasks across multiple platforms. This graph is constructed using graph database technologies, allowing for efficient storage and querying of complex relationships. The dependency graph is dynamically updated as new information is received from various platforms, using graph algorithms to maintain consistency and identify circular dependencies. The system leverages this graph structure to prioritize updates, employing critical path analysis algorithms to identify tasks that have the most significant impact on project timelines. This allows for intelligent update propagation, ensuring that changes to critical tasks are immediately reflected across all relevant platforms.

An advanced anomaly detection module may be incorporated into the system to identify unusual patterns or outliers in data messages and update patterns. This module employs a combination of statistical methods and machine learning techniques, including isolation forests and autoencoders, to detect anomalies in multidimensional data streams. The anomaly detection algorithms are adaptive, continuously learning from new data to refine their understanding of normal behavior. When potential data quality issues or security concerns are identified, the system flags these for review, generating detailed reports that contextualize the anomaly within the broader project data landscape. The anomaly detection may be any identification of rare items, events or observations which raise suspicions by differing significantly from the majority of the data.

The system may include functionality to analyze the efficiency of different third-party tools based on the frequency and nature of updates flowing through the integration. This analysis employs data mining techniques to extract usage patterns and performance metrics for each connected tool. The system utilizes these insights to generate comprehensive reports on tool usage and effectiveness. These reports may include visualizations of data flow between systems, metrics on data quality and timeliness, and recommendations for optimizing the tool ecosystem. By providing this strategic insight, the system supports informed decision-making in IT strategy and tool selection, helping organizations to maximize the value of their software investments and streamline their project management processes.

The above embodiments provide advantages in the field of project management and cross-platform data synchronization. By ensuring real-time data synchronization, the system significantly reduces manual data entry and the risk of human error in updating project statuses. This constant reflection of the most up-to-date information from various third-party tools and services leads to improved decision-making capabilities. Stakeholders benefit from a more accurate and comprehensive view of project status across multiple platforms, enabling faster and more informed decision-making based on real-time, cross-platform data.

The above embodiments also contribute to increased productivity by reducing the time spent on manual status updates and cross-referencing information from different tools. This allows team members to focus on their core tasks rather than administrative updates. Furthermore, the system enhances collaboration by facilitating better communication between team members using different tools and platforms.

By providing a single source of truth for project status, it reduces miscommunication and confusion among team members.

One of the key features of the above embodiments is its capability for proactive issue management. The early detection of deviations between planned tasks and actual progress can enable proactive problem-solving before issues escalate. This preemptive approach to project management can significantly reduce the impact of potential setbacks.

The use of machine learning makes it both customizable and scalable. It can adapt to specific organizational workflows and improve over time, and can be scaled to handle multiple projects and large organizations with complex tool ecosystems. This adaptability ensures that the system remains effective as an organization grows and evolves. By providing a comprehensive project overview without the need to constantly switch between multiple tools, the system reduces the cognitive load on team members. This streamlined approach to information access and management can lead to improved focus and efficiency.

In another exemplary embodiment of the presently disclosed subject matter, the system incorporates an AI module capable of establishing dynamic connections with external components through APIs. This module is designed to handle complex communication scenarios, even with previously unknown external systems.

The AI module can be configured to receive a set of data and rules governing specific communication actions. It can also accept user input that defines the intended type of communication between a first component (within the system) and an external component of a software service such as 255. This communication can be unidirectional or bidirectional, depending on the user's needs.

Upon receiving this information, the AI module can be configured to initiate a self-training session. During this process, the AI module can analyze the provided data and rules, examines relevant web resources, and reviews past usage patterns within the application. The goal is to generate a model that can deduce how to translate the user's intention into a suitable form that aligns with the communication rules and data, while fulfilling the user's requirements.

The self-training session may involve analyzing the user's input to understand the desired type of communication, examining the communication data and rules to determine which rules should be applied and/or creating and storing a conversion index that maps between the communication rules and data of the first component and those of the external component.

Once the index is prepared, the AI module tests may test, makes any necessary corrections, and establishes the connection.

In cases where the volume of communication data and rules exceeds the capacity of a generative AI engine, the AI module employs a novel approach. It converts the communication data and rules into a list of known API query examples (such as in GraphQL). Each example may encapsulate several rules. This converted set serves as a learning dictionary for the AI module.

The process for handling complex API interactions involves retrieving valid API queries associated with the first component, extracting a comprehensive description for each query, converting the query description into a storable format (such as a vector), and storing the description in the storable format along with the associated query as metadata in a repository (the dictionary, such as vectorDB).

When a new connection needs to be established, the AI module analyzes the user input and transforms it into the storable format, optionally searches for similarities in the learning dictionary, and uses the closest results as templates for interacting with the generative AI engine to construct a valid API query.

This approach allows the system to dynamically adapt to new external components and complex API structures, significantly enhancing its interoperability and flexibility.

Optionally, after an API connection is established, a context-aware diagnostic AI Generative AI agent may be executed. This generative AI agent is designed to provide intelligent, context-sensitive diagnostics and problem-solving across the integrated SaaS ecosystem.

The Context-Aware Diagnostic AI Generative AI agent leverages the system's comprehensive understanding of the interconnected platforms to offer nuanced, situational awareness in its diagnostic processes. This generative AI agent may analyze issues across multiple integrated platforms, understanding how problems in one system might affect or be affected by conditions in another. Optionally, by accessing historical data from connected services 255, the generative AI agent can identify recurring issues or potential root causes that might not be apparent when looking at a single platform in isolation.

Optionally, using machine learning algorithms, the generative AI agent can be configured to predict potential issues before they occur, based on patterns and conditions across the integrated ecosystem. When issues are identified, the generative AI agent may automatically route tickets to the most appropriate team or individual, taking into account the cross-platform nature of the problem.

For end-users, the generative AI agent may provide step-by-step guidance for resolving issues, dynamically adjusting its instructions based on the user's actions and the real-time state of the affected systems.

Users may interact with the generative AI agent using natural language, describing their issues in their own words. The generative AI agent can use advanced NLP to understand the context and intent behind user queries.

Optionally, beyond responding to user-reported issues, the generative AI agent can be configured to actively monitor system health across all integrated platforms, alerting administrators to potential problems before they impact end-users.

This Context-Aware Diagnostic AI Generative AI agent represents a significant advancement in IT support and system maintenance for complex, multi-platform environments. By providing intelligent, context-sensitive diagnostics and solutions, it reduces downtime, improves user satisfaction, and allows IT teams to focus on more strategic initiatives rather than routine troubleshooting.

Figure 3:
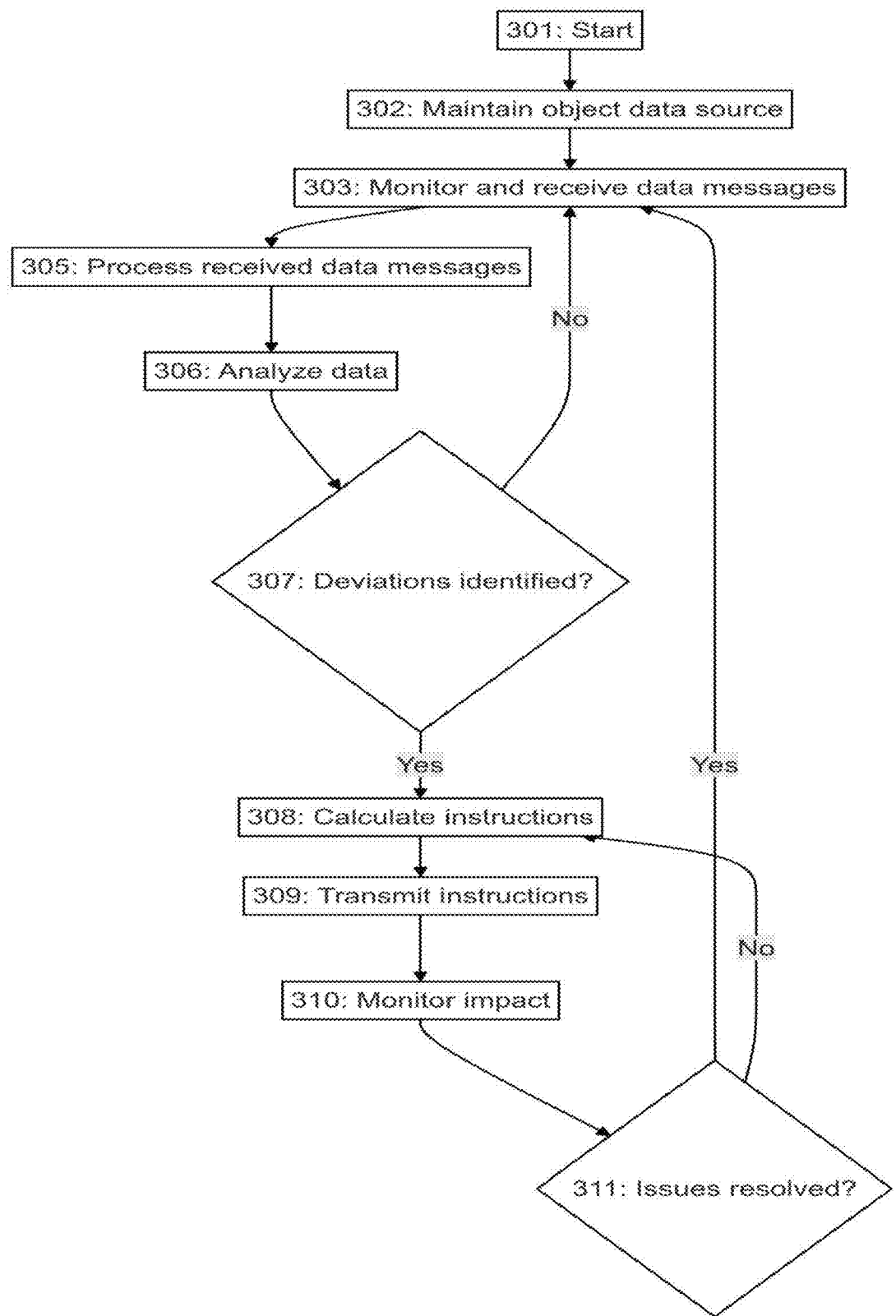
FIG. 3 is a flowchart depicting a process for managing software services and coordinating actions across multiple platforms, consistent with some embodiments of the present disclosure.

Reference is also made to FIG. 3 is a flowchart depicting a process implemented by the claimed system for managing software services 255 and coordinating actions across multiple platforms, according to some embodiments of the present invention. The flowchart is implemented using a SaaS platform, such as the system depicted in FIG. 1A, according to some embodiments of the present invention, for instance using correlation environment 200.

As shown at 301, the process is initiated by maintaining an object data source (reference numeral 302) containing multiple data objects linked to one or more boards assigned to a project. These boards indicate a plurality of task statuses for multiple tasks assigned to one or more users who have credentials to access the boards.

Herein is an exemplary implementation of the correlation environment 200 and/or the SaaS platform 100 described with reference to any of the figures herein, for instance with reference to FIG. 2 or FIG. 3. The correlation environment 200 and/or the SaaS platform 100 may maintain an object data source using a distributed database architecture, such as Apache Cassandra or MongoDB, to ensure high availability and scalability. This database stores multiple data objects, each representing a task, user, or project element, linked to one or more boards within the project management platform. The boards are implemented as dynamic, real-time collaborative interfaces, utilizing WebSocket technology for instant updates across all connected clients. Task statuses are stored as enumerated values within the data objects, allowing for efficient querying and indexing.

In some embodiments, the generative AI model utilizes a transformer-based architecture, specifically a variant of the GPT (Generative Pre-trained Transformer) model. The model comprises an encoder-decoder structure with multi-head attention mechanisms. The encoder consists of N identical layers, each containing two sub-layers: a multi-head self-attention mechanism and a position-wise fully connected feed-forward network. The decoder may be also composed of N identical layers, incorporating an additional sub-layer that performs multi-head attention over the output of the encoder stack.

The model may be pre-trained on a diverse corpus of SaaS platform data, including but not limited to: project management boards, task descriptions, user interactions, and cross-platform workflows. The pre-training process utilizes a masked language modeling objective, where the model learns to predict randomly masked tokens in the input sequence.

The model may be fine-tuned for specific SaaS integration tasks using a dataset curated from historical cross-platform interactions, workflow patterns, and user behaviors. This fine-tuning process employs a combination of supervised learning on labelled data and reinforcement learning to optimize for task-specific objectives.

The deployment of the model utilizes a distributed inference architecture to ensure low-latency responses. This architecture may comprise:

1. A load balancer to distribute incoming requests.
2. Multiple inference servers, each hosting an instance of the fine-tuned model.
3. A caching layer to store frequently accessed results and reduce computation overhead.
4. A monitoring system to track model performance and trigger retraining when necessary.

Reference is now made again to FIG. 3. As shown at 303, correlation environment 200 continuously monitors and receives multiple data messages from a plurality of software services connected to a network (reference numeral 304). These software services manage multiple software processes that are executed independently from the one or more boards with regard to the project.

The correlation environment 200 may be designed to integrate with a diverse ecosystem of software services, encompassing collaborative platforms (e.g., Slack, Microsoft Teams), project management tools (e.g., Jira, Trello), communication systems (e.g., Email, VOIP), and productivity applications (e.g., Google Workspace, Microsoft Office) with the SaaS platform 100. This wide-ranging integration may be facilitated through a modular architecture with service-specific adapters, allowing for easy expansion to new platforms and services as they emerge in the market.

To facilitate communication with the external software services, the environment 200 can implement a robust API gateway using technologies such as Kong or AWS API Gateway, which handle authentication, rate limiting, and protocol translation, supporting both REST and GraphQL interfaces. The environment 200 receives data messages from these services through webhook endpoints, which are automatically scaled using a serverless architecture like AWS Lambda or Google Cloud Functions to handle varying loads.

As shown at 305, correlation environment 200 processes the received data messages, extracting relevant information. At least some of these data messages indicate a plurality of process statuses of at least some of the multiple software processes managed by the third-party applications.

As shown at 306 correlation environment 200 analyses the data from the received messages in conjunction with the data objects maintained in the object data source. This analysis may be performed to identify one or more deviations between the plurality of task statuses recorded in the environment 200's boards and the plurality of process statuses reported by the third-party software services.

The analysis of data messages and internal data objects may be performed using a combination of stream processing and batch processing techniques. Apache Kafka may be employed for real-time message ingestion and processing, while Apache Spark may be utilized for more complex, batch-oriented analyses. This hybrid approach allows the environment 200 to identify deviations quickly while still supporting deep, historical analysis when required.

Changes in the boards may be monitored using an event sourcing pattern, where each modification may be recorded as an immutable event in an event store. This approach not only provides a complete audit trail but also enables the environment 200 to replay events for analysis or to reconstruct the state of the board at any point in time. A separate service, implemented using a microservices architecture, may be responsible for processing these events and identifying changes relevant to external software services. Deviations might be as exemplified above and may be identified as explained above.

As shown at 307 when deviations are identified, the process proceeds to step 308. When no deviations are found, the environment 200 returns to step 303 to continue monitoring incoming data messages.

As shown at 308, based on the identified deviations, correlation environment 200 calculates instructions for at least some of the multiple software processes. These instructions are designed to address the deviations and bring the third-party processes back in line with the project status as reflected in the boards.

Examples of instructions that the correlation environment 200 might calculate to address the deviations mentioned earlier. For example, here are some examples based on the previously identified deviations:

For the Task Status Mismatch: Instruction: "Update task status in third-party project management tool from 'In Progress' to 'Completed' for Task ID: T1234. Verify completion criteria and sync task metadata."

For the Deadline Discrepancy: Instruction: "Adjust task deadline in integrated calendar application from June 20th to June 15th for Task ID: T5678. Update all associated milestones and notify team members of the revised timeline."

For the Resource Allocation Conflict: Instruction: "Reassign Task ID: T9012 from John Doe to available team member Jane Smith. Update resource allocation in HR management system to reflect John Doe's leave status from June 1st to June 7th. Trigger workflow to notify project manager of resource change."

For the Budget Variance: Instruction: "Reconcile budget discrepancy in connected accounting software. Increase recorded budget from $50,000 to $55,000 for Project ID: P3456. Flag for financial review and update all related financial forecasts and reports."

For the Scope Change: Instruction: "Revert feature status in requirements management tool from 'Under Review' to 'Approved' for Feature ID: F7890. Sync feature description and acceptance criteria between platforms. Notify product owner and development team of status confirmation."

These instructions are designed to be actionable by the respective third-party software processes, bringing them into alignment with the status reflected in the SaaS platform's boards. Each instruction includes specific actions to be taken, relevant identifiers (e.g., Task ID, Project ID), and may also include additional steps such as notifications or secondary updates to ensure comprehensive synchronization across the integrated systems.

The correlation environment 200 would transmit these instructions to the appropriate software services, potentially using APIs or other integration methods supported by each third-party service. The execution of these instructions would then be monitored to ensure the deviations are successfully resolved and the systems are brought back into alignment.

As shown at 309, correlation environment 200 transmits the calculated instructions to at least some of the plurality of software services. This transmission may occur through various channels, such as APIs, webhooks, or other integration methods supported by the third-party services. Instructions for external software processes may be calculated using business rules and/or machine learning models such as the generative AI model described above. These models, implemented using frameworks such as TensorFlow or PyTorch, are trained on historical data to predict the most effective actions based on the current context.

The transmission of instructions, notifications, and action requests to external software services may be managed by a message broker system, such as RabbitMQ or Apache Pulsar. To initiate actions within the user interfaces of external software services, the environment 200 may leverage each service's API or SDK. For services that support it, the environment 200 uses OAuth 2.0 for secure, delegated access. Custom middleware may be developed for each supported service to translate the environment 200's generic instruction format into service-specific API calls or user interface updates.

Optionally, the correlation environment 200 maintains a bidirectional mapping between tasks in its boards and corresponding processes or activities in external software services. This mapping may be stored in a graph database, such as Neo4j, which allows for efficient traversal and querying of complex relationships. The mapping may be continuously updated based on user actions and system events, ensuring it remains accurate over time.

Machine learning algorithms, particularly ensemble methods combining gradient boosting machines and neural networks, may be employed to predict the impact of changes. These models are trained on historical data including user interactions, task completions, and project outcomes. The training process may be automated and scheduled to run periodically, ensuring the models remain up-to-date with the latest patterns and trends.

As shown at 310 correlation environment 200 may monitor the impact of the transmitted instructions, waiting for feedback or confirmation from the third-party services. As shown at 311 when the deviations have been successfully addressed, the process may return to step 303 for continued monitoring. When issues persist, the environment 200 may return to step 308 to recalculate and retransmit instructions as necessary.

In some cases, the instructions calculation process 308 incorporates a dependency analysis mechanism. When calculating instructions, the environment 200 can be configured to evaluate the interdependencies between various software processes managed by different third-party applications. It can identify sub-processes that are contingent upon the status of tasks in other processes. Using a graph-based representation of these dependencies, the environment 200 determines the optimal sequence of sub-process executions. This approach ensures that instructions are generated not in isolation, but with a holistic view of the project's interconnected workflows, thereby maintaining consistency and efficiency across all integrated platforms.

The analysis of data messages and data objects can be performed using an advanced machine learning model. This model employs a hybrid architecture combining convolutional neural networks (CNNs) for feature extraction from structured data and long short-term memory (LSTM) networks for capturing temporal dependencies in task progressions. The model may be implemented using a distributed machine learning framework, allowing for scalable processing of large volumes of data across multiple nodes. Real-time inference may be facilitated through model deployment on specialized hardware accelerators, ensuring rapid analysis and decision-making.

The machine learning model may undergo a training process utilizing a rich dataset of historical project information. This dataset encompasses historical data objects linked to past project boards, including task statuses, user assignments, and project outcomes. Additionally, it incorporates historical data messages from the integrated software services, providing a comprehensive view of how external processes interacted with and influenced past projects. The training process employs transfer learning techniques, allowing the model to leverage knowledge gained from diverse projects and adapt it to new, domain-specific scenarios. Regularization methods such as dropout and L2 regularization are applied to prevent overfitting and ensure generalizability.

A generative AI agent may be used for transmitting instructions to the integrated software services. This agent may be equipped with credentials to access the environment 200's boards and possesses a deep understanding of the project context. Utilizing natural language processing and generation techniques, the agent formulates instructions that are contextually appropriate and aligned with the specific terminology and workflows of each target software service. The agent employs reinforcement learning to continuously improve its communication effectiveness based on the responses and outcomes observed from previous interactions.

To facilitate seamless interaction with third-party software services, the environment 200 may deploy generative AI agents that are registered as users within these services. These agents utilize advanced natural language understanding and generation capabilities to interpret and respond to communications within the context of each service. By operating as native users, the agents can access and interact with service-specific features and data, providing a bridge between the central system and the distributed ecosystem of tools used in the project. The generative AI agents registered in third-party software services may be configured with specific credentials and permissions tailored to their roles within those services. These permissions are managed through a centralized identity and access management system, ensuring that each agent has the necessary access to perform its functions while adhering to security and compliance requirements. The environment 200 employs role-based access control (RBAC) and attribute-based access control (ABAC) mechanisms to dynamically adjust agent permissions based on the evolving needs of the project and organizational policies.

The generative AI agent may be adapted for transmitting instructions incorporating a natural language generation (NLG) module. This module can be trained on a diverse corpus of service-specific documentation, API specifications, and historical interaction logs. Using this knowledge, the agent dynamically formulates instructions in formats and terminologies that are natively compatible with each receiving software service. The NLG process employs context-aware template generation and slot-filling techniques, ensuring that the generated instructions are not only syntactically correct but also semantically aligned with the target service's conventions and workflows.

The machine learning model may undergo periodic updates through a continuous learning pipeline. This pipeline ingests data on the outcomes of previously calculated instructions, including their effectiveness in resolving deviations and any subsequent adjustments made by users. The update process employs online learning techniques, allowing the model to adapt to changing project dynamics and emerging patterns in real-time. A version control system for machine learning models may be implemented, enabling easy rollback in case of performance degradation and facilitating A/B testing of model improvements.

To accommodate the diverse landscape of software service platforms, the environment 200 may implement an adaptive communication protocol framework. This framework dynamically selects and configures the appropriate communication protocols based on the specific requirements and capabilities of each integrated service. It supports a wide range of protocols including REST, GraphQL, gRPC, and WebSocket, as well as legacy protocols for older systems. The framework employs protocol buffers for efficient data serialization and includes built-in mechanisms for handling rate limiting, retries, and error recovery, ensuring robust and reliable communication across all integrated platforms.

Throughout this process, the environment 200 maintains a continuous feedback loop, ensuring that the project status reflected in its boards remains synchronized with the actual progress of tasks across various third-party applications. This approach allows for real-time coordination and prompt addressing of any discrepancies that may arise during the project lifecycle.

Optionally, this process may be executed in parallel to the process depicted in FIG. 2, executing a feedback loop wherein when a deviation between boards which indicate task statuses for multiple tasks assigned to users with credentials to access the boards documenting project data in the SaaS platform 100 and statues of third party applications may be detected, instructions for the third party applications are calculated and send to the third party applications, aiming to nullify or decrease the deviation.

In some embodiments, the AI agent can be configured to reside as an app on the user's browser. This configuration allows the AI agent to gain access to all the information shown to the user that may be relevant to the platform. By operating at the browser level, the AI agent can observe and analyze user interactions, screen content, and data flow in real-time, providing a more comprehensive understanding of the user's context and needs within the SaaS platform. Furthermore, the AI agent can be designed to utilize the mouse and keyboard, and provide instructions to the browser to apply commands controlling them, instead of or in addition to using API requests. This capability allows the AI agent to interact with the SaaS platform and third-party applications in a manner that closely mimics human user behavior. For example, the AI agent may:

1. Move the cursor and click on specific elements to navigate through the interface.
2. Input text into forms or fields using virtual keyboard commands.
3. Scroll through pages or drag-and-drop elements as needed.
4. Interact with dropdown menus, checkboxes, and other UI components.

This approach provides several advantages:

1. It allows the AI agent to operate in scenarios where API access is limited or unavailable.
2. It can interact with legacy systems or applications that don't have modern API interfaces.
3. It can perform actions that closely replicate human user workflows, potentially uncovering usability issues or inefficiencies in the process.

By combining browser-level access with the ability to control mouse and keyboard inputs, the AI agent can execute complex sequences of actions across multiple applications and interfaces, further enhancing its capability to detect, analyze, and resolve deviations in real-time.

The above embodiments provide advantages in the field of project management and cross-platform software integration, addressing critical challenges faced by modern organizations in coordinating complex, multi-faceted projects across diverse digital ecosystems. One significant benefit is its ability to maintain real-time synchronization between a centralized project management platform and multiple third-party software services. This synchronization substantially reduces the risk of data inconsistencies and miscommunications that often plague projects involving multiple tools and teams. By automatically identifying and reconciling deviations between task statuses and process statuses across different platforms, the environment 200 ensures that all stakeholders are working with the most up-to-date and accurate project information at all times.

The use of advanced machine learning models for data analysis and instruction calculation provides a level of intelligent decision-making that surpasses traditional rule-based systems. This AI-driven approach allows for more nuanced and context-aware management of complex project workflows, adapting to the unique characteristics and requirements of each project. The environment 200's ability to learn from historical data and continuously improve its performance over time ensures that it becomes increasingly effective and efficient in managing projects as it accumulates more operational experience.

Another key advantage of the invention may be its proactive approach to project management. By calculating and transmitting instructions to third-party software services based on identified deviations, the environment 200 can preemptively address potential issues before they escalate into significant problems. This proactive stance helps to minimize project delays, reduce resource wastage, and maintain overall project momentum.

The environment 200's use of generative AI agents for interacting with third-party software services represents a significant leap forward in inter-application communication. These agents, capable of formulating contextually appropriate instructions and adapting to the specific requirements of each software service, enable a level of seamless integration that was previously unattainable. This approach not only enhances the efficiency of cross-platform operations but also reduces the need for manual intervention in routine coordination tasks.

Furthermore, the invention's flexible and extensible architecture, capable of integrating with a wide range of software services, provides organizations with unprecedented versatility in their choice of project management tools. This flexibility allows businesses to leverage their existing software investments while still benefiting from centralized project coordination and oversight.

In one exemplary embodiment of the present invention, the system may be configured to initiate a cascade of operations across multiple integrated third-party applications in response to a status change within the SaaS platform. This functionality demonstrates the system's capability to orchestrate complex, cross-platform workflows while maintaining centralized control.

For instance, the system may be programmed to recognize a status change of a software development project from "Planning" to "In Development" within the SaaS platform as a trigger event. Upon detection of this trigger event, the system may execute the following sequence of operations:

1. The system may interface with a version control service, such as GitHub, via its API. It may programmatically initiate the creation of a new development branch specific to the project. Concurrently, it may configure branch protection rules according to predefined security protocols. The system may further instantiate a project board within the version control service, populated with tasks extracted from the SaaS platform's project data.
2. Simultaneously, the system may interact with a CI/CD service, exemplified by Jenkins. Through this interface, the system may automatically configure a new pipeline tailored to the project requirements. This configuration may include setting up automated build processes, implementing test protocols, and preparing staging environments for subsequent deployments.
3. The system may also engage with a team communication platform, such as Slack. It may programmatically generate a new channel dedicated to the development team. An automated message announcing the project's commencement may be dispatched through this channel. Additionally, the system may configure integrations to facilitate the relay of notifications from the version control and CI/CD services to this communication platform.
4. Furthermore, the system may interface with a documentation platform, exemplified by Confluence. It may automatically generate a template for technical specifications based on predefined standards. The system may create a designated space for sprint planning documents and configure access permissions for the development team members, as extracted from the SaaS platform's user data.

This exemplary embodiment illustrates the system's capacity to translate a single status change within the SaaS platform into a comprehensive series of actions across multiple third-party applications. This functionality serves to streamline project initiation processes, ensure consistency across diverse platforms, and significantly reduce the time required to transition from project planning to active development.

Figure 4:
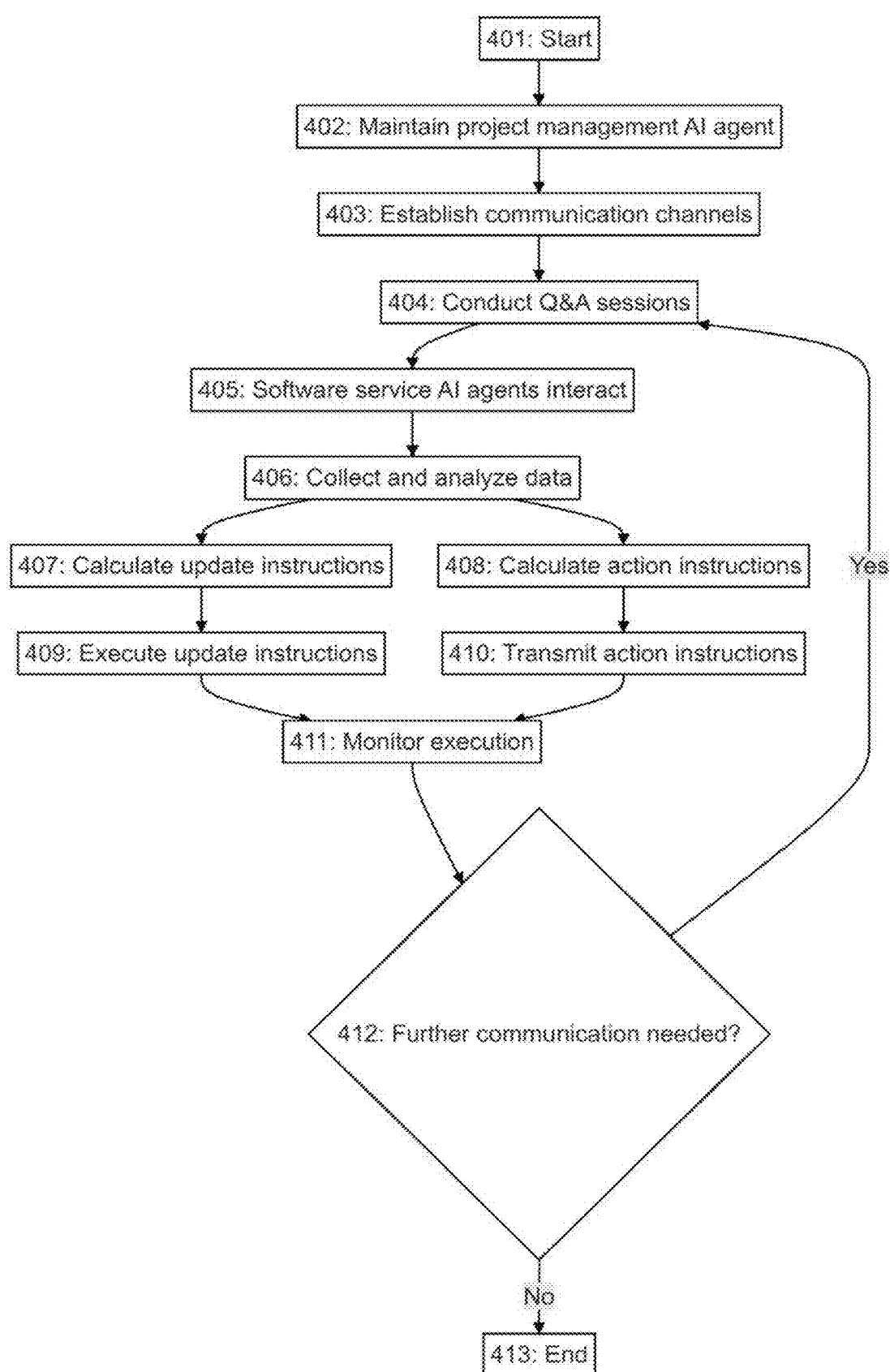
FIG. 4 is a flowchart depicting a process for managing communication between services and a project management software platform using AI agents, consistent with some embodiments of the present disclosure.

Reference is also made to FIG. 4 which is a flowchart depicting a process for managing communication between services (255) and a project management software platform (100) using AI agents according to some embodiments of the present invention. The flowchart is implemented using a SaaS platform, such as the environment 200 depicted in FIG. 1A, according to some embodiments of the present invention, for instance using correlation environment 200.

As shown at 401, the process begins with the initialization of the environment 200, including the project management software platform (100) and the connected services (255).

As shown at 402, a project management software platform AI agent is maintained. This agent is designed to interact with alphanumeric data stored in multiple data objects within the platform (100). The agent utilizes natural language processing and machine learning algorithms to understand and manipulate the data effectively.

As shown at 403 text-based communication channels are established between the project management software platform AI agent and multiple software service AI agents. These channels serve as the primary means of information exchange between the platform and the various connected services.

As shown at 404 question-and-answer sessions on the established text-based communication channels are established. These sessions involve the project management software platform AI agent and one or more of the multiple software service AI agents. Natural language processing (NLP) may be used for facilitating the question-and-answer sessions between the project management software platform AI agent and the software service AI agents. The environment 200 may employs NLP techniques, including contextual word embeddings and sentiment analysis, to ensure nuanced understanding and generation of responses. This allows for more natural, context-aware communication between the AI agents, enhancing the quality and efficiency of information exchange. When transmitting action instructions to software services, the project management software platform AI agent may employ a natural language generation (NLG) module. This module dynamically formulates instructions in formats and terminologies that may be natively compatible with each receiving software service. It utilizes a combination of template-based generation and neural text generation models, ensuring that the instructions may be not only syntactically correct but also semantically aligned with the target service's conventions and workflows.

The initiation of question-and-answer sessions may be governed by an intelligent trigger module. This module monitors both the project management boards and the software processes for predefined events or conditions that warrant communication. These triggers can be based on various factors such as task status changes, approaching deadlines, resource allocation conflicts, or anomalous patterns detected by the AI agents. The trigger system employs a combination of rule-based logic and machine learning-based predictive models to determine when to initiate sessions, ensuring timely and relevant communications while avoiding unnecessary interactions.

As shown at 405, during these sessions, the software service AI agents interact with their respective software services (255). These services manage multiple software processes and operate independently from the project management boards within platform (100).

As shown at 406, data generated from the question-and-answer sessions is collected and analyzed. This analysis involves natural language understanding and information extraction techniques to derive meaningful insights from the conversations.

As shown at 407, based on the analyzed data, update instructions for the project management boards within platform (100) are calculated. These instructions may be designed to reflect the latest information and status updates obtained from the software service AI agents.

As shown at 408, optionally simultaneously with step 407, or as an alternative depending on the analysis results, the environment 200 calculates action instructions for the software processes managed by the services (255). These instructions are formulated to align the external processes with the overall project goals and timelines.

As shown at 409 the calculated update instructions may be executed on the project management boards within platform (100). This may involve modifying task statuses, updating timelines, or adjusting resource allocations.

As shown at 410, the action instructions are transmitted over a network to the respective software services (255). This transmission is carried out securely, ensuring that each service receives only the instructions relevant to its processes.

Optionally, as shown at 411 the execution of both the update instructions and the action instructions are monitored, allowing collecting feedback on their implementation and effectiveness. Based on the feedback and ongoing project needs, the environment 200 determines if further communication is required. If so, the process returns to step 404 to initiate new question-and-answer sessions. If not, the process concludes. This process ensures continuous, AI-driven communication and synchronization between the project management software platform (100) and the various connected services (255), enabling efficient and coordinated project management across multiple software environments.

The process depicted in FIG. 4 can be expanded to encompass the concept of AI agents communicating directly to create dynamic, live integrations between applications. This approach represents a significant advancement over traditional, static API integrations. Optionally, the question-and-answer sessions is a direct AI-to-AI communication channel between the project management software platform AI agent and a selected software service AI agent. This channel may be established using a secure, low-latency protocol optimized for AI agent interactions. The AI agents may engage in a dynamic dialogue to understand each other's capabilities, data structures, and operational parameters. This dialogue utilizes advanced natural language processing and semantic understanding algorithms to facilitate mutual comprehension between potentially disparate systems. Based on the initial dialogue, the AI agents may collaboratively design a temporary, context-specific API structure. This structure is not predefined or role-based, but rather dynamically generated to suit the immediate integration needs identified by both AI agents. The AI agents may implement the dynamically generated API structure in real-time, establishing a live, two-way synchronization channel between their respective platforms. This implementation involves on-the-fly code generation and deployment within secure sandboxes in each system. As the integration operates, both AI agents may continuously monitor its performance and effectiveness. They analyze data flow patterns, latency, and the relevance of exchanged information to the current project context. The AI agents may engage in periodic reassessment dialogues, evaluating the current integration structure against evolving project needs and system states. These dialogues may be triggered by significant events, detected inefficiencies, or regular intervals. Based on the reassessment, the AI agents may collaboratively refine and upgrade the integration structure. This may involve modifying data exchange formats, adjusting synchronization frequencies, or completely redesigning aspects of the API to better serve current requirements.

Optionally, the project management software platform AI agent employs a sophisticated machine learning model to interact with alphanumeric data and conduct question-and-answer sessions. This model, built on a deep neural network architecture, combines natural language processing capabilities with domain-specific knowledge of project management concepts. It utilizes attention mechanisms and transformer architectures to effectively parse and generate contextually relevant responses, ensuring meaningful interactions with both the stored data and the software service AI agents.

Optionally, this machine learning model undergoes extensive training using a rich dataset comprising historical project information. This dataset includes historical data objects linked to past project boards, encompassing task statuses, user assignments, and project outcomes. Additionally, it incorporates logs of past question-and-answer sessions between the platform AI agent and various software service AI agents, providing insights into the nature and resolution of historical software process queries. The training process employs transfer learning techniques, allowing the model to leverage knowledge gained from diverse projects and adapt it to new, domain-specific scenarios.

Optionally, the correlation environment 200 is designed to integrate with a wide array of software services commonly used in professional environments. These include collaborative platforms (e.g., Slack, Microsoft Teams), project management tools (e.g., Jira, Trello), communication systems (e.g., Email, VOIP), and productivity applications (e.g., Google Workspace, Microsoft Office). This comprehensive integration is facilitated through a modular architecture with service-specific adapters, allowing for easy expansion to new platforms and services as they emerge in the market. To ensure secure and authorized access, the software service AI agents may be registered as users within their respective software services 255, 100, complete with specific credentials and permissions. These agents utilize advanced authentication protocols, such as OAuth 2.0, to maintain secure sessions. Their permissions may be managed through a centralized identity and access management system, employing role-based access control (RBAC) and attribute-based access control (ABAC) mechanisms to dynamically adjust agent permissions based on the evolving needs of the project and organizational policies.

The calculation of update instructions and action instructions may be performed using a specialized machine learning model. This model employs advanced analytics techniques, including time series analysis and anomaly detection algorithms, to identify patterns and discrepancies between project management board data and software process data. It utilizes ensemble methods, combining multiple algorithms such as random forests and gradient boosting machines, to ensure robust and accurate instruction generation.

The correlation environment 200 may maintain a comprehensive log of all question-and-answer sessions, calculated instructions, and their outcomes. This log is implemented using a blockchain-inspired append-only data structure, ensuring the immutability and traceability of all recorded events. Each log entry is timestamped and cryptographically signed, providing a tamper-evident record of system actions. This logged data serves dual purposes: it provides a detailed audit trail for compliance and review, and it forms a valuable dataset for continuous improvement of the AI models through reinforcement learning techniques.

The project management software platform AI agent may undergo periodic updates through a continuous learning pipeline. This pipeline ingests data on the outcomes of previously calculated instructions and executed actions, including their effectiveness in resolving issues and any subsequent adjustments made by users. The update process employs online learning techniques, allowing the agent to adapt to changing project dynamics and emerging patterns in real-time. A version control system for AI models is implemented, enabling easy rollback in case of performance degradation and facilitating A/B testing of improvements.

The process depicted in FIG. 4 replaces static, predefined APIs with dynamic, AI-driven communication channels. The ability of AI agents to establish, maintain, and continuously optimize integrations in real-time provides unprecedented flexibility and efficiency. This approach drastically reduces the time and resources typically required for traditional API development and maintenance, allowing systems to adapt swiftly to changing project requirements and technological landscapes. Moreover, by employing AI agents to conduct ongoing question-and-answer sessions, the environment 200 ensures a high level of data synchronization across diverse platforms. This real-time, intelligent synchronization significantly reduces data inconsistencies and latencies that often plague multi-platform projects. The result is a more coherent and up-to-date project ecosystem, minimizing errors and improving decision-making capabilities. Also, the ability to analyze patterns and discrepancies between project management board data and software process data allows for more intelligent workload distribution. By identifying bottlenecks or underutilized resources across different platforms, the AI agent can suggest or automatically implement optimizations, leading to improved resource allocation and project efficiency. For example, an AI agent of a management platform such as Monday.com interacts with a co-pilot style AI agent writing code. This interaction could involve the Monday.com AI agent communicating project requirements, deadlines, and specific coding tasks to the co-pilot AI. The co-pilot AI, integrated with an IDE or code repository, could then generate code snippets, suggest optimizations, or even complete entire modules based on the project specifications provided. As development progresses, the co-pilot AI could report back to the Monday.com agent about completion status, potential roadblocks, or areas where additional clarification is needed. This bi-directional communication allows for real-time updates to project timelines and resource allocation within Monday.com. If the co-pilot AI identifies a particularly challenging coding task, it could prompt the Monday.com agent to allocate additional time or resources to that specific part of the project. Moreover, this integration could extend to code review processes. The co-pilot AI could analyze code quality and adherence to project standards, reporting its findings back to the Monday.com agent. This could then trigger automated updates to the project status, creation of code review tasks, or notifications to relevant team members, all without manual intervention.

Reference is also made to FIG. 5 which is a flowchart depicting a process for using generative artificial intelligence for intent-based interaction within a project management system according to some embodiments of the present invention. The flowchart is implemented using a SaaS platform, such as the system depicted in FIG. 1A, according to some embodiments of the present invention, for instance using correlation environment 200. As used herein an intent based interaction is a method of human-computer interaction where the system receives a user's input describing a goal to be achieved without specifying exactly and entirely how the process to achieve the goal should be implemented, and attempts to understand and act upon the user's intentions rather than just their literal commands.

As shown at 501, the process begins with the initialization of, including the loading of, the generative artificial intelligence (AI) model.

As shown at 502, a generative AI model that has been trained on multiple interactions of various users with alphanumeric data is maintained. This data is stored in a plurality of items representing the alphanumeric data across different boards within the environment 200. Optionally, the generative AI model's training process includes exposure to a curated dataset of board organizations and data management strategies identified as best practices. These best practices may be codified into the model using reinforcement learning techniques, allowing the AI to recognize and promote optimal board structures and data handling methods.

As shown at 503, the training data for the AI model focuses on the types of actions performed on the data, such as creating, editing, moving, or deleting items, without including the actual content of the data. This approach ensures privacy and allows the model to learn general interaction patterns.

As shown at 504, a target board for analysis is identified. This could be triggered by various events such as user access, scheduled reviews, or system-detected anomalies.

As shown at 505, the generative AI model performs an in-depth analysis of the logical relations between the items in the target board. This analysis considers factors such as item placement, connections, dependencies, and metadata. The analysis may include a deep examination of user inputs provided to edit or update data within the target board. This involves parsing user interaction logs, analyzing the frequency and nature of edits, and identifying patterns in data manipulation across different users and roles. Natural language processing techniques may be applied to understand the context and intent behind user inputs, allowing the environment 200 to infer user goals and preferences.

Optionally, the environment 200 conducts an analysis of user interaction logs using machine learning algorithms specialized in pattern recognition. These algorithms identify recurring sequences of actions that indicate repetitive tasks. The environment 200 quantifies the frequency and complexity of these tasks to assess their potential for automation.

Optionally, the AI model incorporates a set of predefined heuristics and learned patterns to detect instances of suboptimal use of platform elements within the target board. This includes identifying underutilized features, inefficient data structures, or redundant processes.

Optionally, the analysis of logical relations employs graph theory algorithms to map out item dependencies within the board. The environment 200 constructs a directed acyclic graph (DAG) representing task dependencies and uses topological sorting to optimize workflows, ensuring efficient task sequencing and resource allocation.

As shown at 506, based on the analysis, the AI model calculates one or more actions to be performed on the target board. These actions may be designed to improve the board's structure, efficiency, or usability.

As shown at 507, the calculated actions may include modifications to the board structure, such as reorganizing items, creating new groupings, or adjusting hierarchies. They may also involve metadata changes like updating tags, labels, or status indicators.

Optionally, if the AI model determines that there is insufficient information to perform certain actions, it deploys an AI agent specifically designed for user interaction. This agent autonomously reaches out to relevant users through the platform's messaging system. It uses natural language generation to formulate context-aware queries, seeking the missing information necessary to complete the planned actions.

Optionally, AI agent employs advanced workflow analysis algorithms to identify bottlenecks or mismatches in the project workflow. It correlates task dependencies, completion rates, and user responsibilities to pinpoint the source of delays or inefficiencies. Once identified, the agent initiates targeted communication with the relevant users, presenting the issue and soliciting input for resolution.

As shown at 508, the proposed actions may be validated against predefined rules and constraints to ensure they align with organizational policies and best practices. As shown at 509, without requiring specific instructions from a user, the environment 200 may proceed to perform the identified actions on the target board.

As shown at 510, as the actions may be being executed, the environment 200 logs each modification, creating a detailed record of the changes made by the AI. As shown at 511, the environment 200 may monitor the impact of the performed actions, collecting data on user interactions with the modified board.

As shown at 512, this feedback data is then used to update and refine the generative AI model, improving its decision-making capabilities for future interactions. Optionally, based on the identified patterns of repetitive tasks, the environment 200 generates automated workflow suggestions. These suggestions may be presented to the user through an interactive interface that allows for customization and fine-tuning. The environment 200 uses predictive modelling to estimate the time and effort savings for each suggested automation.

Optionally, the generative AI model undergoes periodic retraining using a federated learning approach (e.g., a machine learning technique that trains an algorithm across multiple decentralized edge devices or servers holding local data samples, without exchanging them). This allows the model to incorporate new user interactions and feedback from multiple instances of the environment 200 while maintaining data privacy. The updated model is deployed using a canary release strategy to ensure stability and performance improvements As shown at 513, the process concludes with the environment 200 generating a summary report of the actions taken and optionally, their initial impact, which can be reviewed by system administrators or relevant stakeholders. Optionally, an interactive chat interface where users can discuss and inquire about the AI agent's outputs is provided by the environment 200. This interface can be powered by an explainable AI module that provides transparency into the reasoning behind each recommendation or action. It references the specific platform context, including board structure, data relationships, and historical patterns that influenced the AI's decision-making process.

Optionally, for detected suboptimal use cases, the environment 200 generates tailored recommendations for more efficient use of platform elements. These recommendations may be prioritized based on their potential impact and ease of implementation. The environment 200 uses data visualization techniques to clearly communicate the benefits of each recommendation to the user.

Optionally, the environment 200 implements a real-time monitoring module that tracks user interactions with the target board. This module uses stream processing techniques to analyze user actions as they occur. Based on this real-time data, the AI generates proactive suggestions for improving board utilization, which are presented to users through non-intrusive notifications. After performing the automated actions, the environment 200 may generate a detailed natural language explanation of the changes made and their expected impact. This explanation is created using advanced natural language generation techniques, translating complex AI decisions into clear, human-readable text that contextualizes the actions within the board's specific use case.

In one exemplary embodiment, the longitudinal analysis module may be applied to optimize the structure and functionality of a customer support board within the SaaS platform. The board may initially comprise the following columns:

1. A text column (Column A) containing the verbatim content of client support tickets.
2. A status column (Column B) where a user manually selects a status based on their interpretation of the sentiment expressed in the ticket text.
3. Another status column (Column C) where a user manually selects a status based on their assessment of the urgency derived from the ticket text.

The longitudinal analysis module may track the following metrics over time:

1. The average time taken for users to populate Columns B and C for each ticket.
2. The consistency of status selections across different users for similar ticket content.
3. The correlation between initial status selections and final resolution outcomes.

Through its analysis, the AI agent may recognize patterns indicating inefficiencies and inconsistencies in the manual status selection process. Concurrently, the AI agent may identify that an AI-powered column feature capable of automated sentiment analysis and urgency detection is available within the account's feature set or can be readily integrated.

Based on these insights, the AI agent may generate a recommendation to the user, proposing the implementation of two AI-powered smart columns to replace the manual status columns. The recommendation may include:

1. A detailed analysis of the potential time savings, projecting the reduction in manual input time based on historical data.
2. A comparison of consistency metrics between manual selections and AI-powered classifications, demonstrating the potential for improved standardization.
3. A proposed implementation plan, including steps for data migration and user training.

The AI agent may further suggest A/B testing methodology, where a subset of tickets is processed through both the manual and AI-powered systems in parallel, allowing for direct comparison of efficiency and accuracy.

Upon implementation of the AI-powered columns, the longitudinal analysis module continues to monitor performance metrics, including:

1. The speed of ticket classification using the AI-powered system.
2. The correlation between AI-generated classifications and final resolution outcomes.
3. User feedback and override frequency for AI-generated classifications.

These ongoing analyses enable the system to continuously refine the AI models underlying the smart columns, potentially leading to the development of custom classification algorithms tailored to the specific linguistic patterns and urgency criteria relevant to the organization's support ticket ecosystem.

This exemplary application of the longitudinal analysis module demonstrates the system's capacity for ongoing optimization of board structures and workflows. By leveraging historical data, current user behaviors, and available AI capabilities, the system can proactively suggest and implement improvements that enhance efficiency, consistency, and overall effectiveness of the SaaS platform's utilization.

The process described in FIG. 5 provides an ability to analyze user interaction logs and identify patterns of repetitive tasks represents a significant advancement in workflow optimization. Namely a process of identifying and implementing improvements in a sequence of industrial, administrative, or other processes. By employing sophisticated machine learning algorithms for pattern recognition, the system can detect nuanced, complex patterns that might be imperceptible to human observers. This capability allows for the automation of not just simple, repetitive tasks, but also more complex sequences of actions, leading to substantial improvements in productivity and efficiency. The implementation of a federated learning approach for model updating may provide a mechanism for continuous improvement while maintaining data privacy. This technique allows the AI model to learn from a wide range of user interactions across multiple system instances without centralizing sensitive data. The release strategy for model deployment ensures that improvements may be introduced safely, minimizing the risk of system-wide disruptions. The incorporation of stream processing techniques for real-time monitoring of user interactions enables the system to provide immediate, context-aware suggestions. This real-time capability transforms the system from a passive tool into an active collaborator, capable of identifying and addressing inefficiencies as they occur. The proactive nature of these suggestions can significantly reduce the time lag between problem identification and resolution.

Reference to FIG. 6 is a flowchart depicting a process for AI-driven cross-departmental account health monitoring and notification within a SaaS platform according to some embodiments of the present invention. The flowchart is implemented using a SaaS platform, such as the environment 200 depicted in FIG. 1A, according to some embodiments of the present invention, for instance using correlation environment 200. As shown at 601 and 602, the initialization of the environment 200, including loading the generative AI model. The environment 200 maintains a generative AI model that has been trained on diverse datasets encompassing organizational structures, departmental interactions, and work management platform data from multiple accounts. This training utilizes advanced machine learning techniques such as transfer learning and multi-task learning to capture complex interdepartmental dynamics.

Optionally, the AI model's training process is augmented with predictive modelling capabilities. This involves the use of advanced time series forecasting techniques, such as prophet or ARIMA models, combined with machine learning algorithms for pattern recognition. This enhancement allows the model to predict future deviations based on historical data and current trends, enabling proactive notification and prevention of potential issues.

As shown at 603, the environment 200 accesses a target account and analyses the SaaS platform data associated with it. This analysis employs natural language processing and entity recognition algorithms to identify and categorize different departments within the account.

Optionally, the environment 200 introduces an interdepartmental analysis module that constructs a graph representation of departmental dependencies and workflows. Graph analysis algorithms may be applied to identify potential bottlenecks or inefficiencies in cross-departmental processes. The AI model then generates optimization recommendations using a combination of heuristic algorithms and machine learning techniques, aimed at improving interdepartmental collaborations As shown at 604, for each identified department, the environment 200 analyses work management platform data. This step involves deep learning models, such as LSTM networks, to interpret actions in the context of their respective divisions. The environment 200 looks for deviations from regular workflows, utilizing anomaly detection algorithms and time series analysis.

Optionally, the environment 200 incorporates a sprint analysis module that uses time series forecasting and trend analysis to examine task completion patterns across multiple sprints. Machine learning algorithms, such as gradient boosting machines, may be employed to identify recurring postponements or delays in task completion. The AI model then uses these insights, combined with resource allocation data, to deduce potential staffing issues in specific departments. When staffing issues may be identified, the system generates targeted notifications with AI-driven recommendations for addressing these issues, routing them to relevant departments such as Human Resources.

As shown at 605, upon detecting a deviation in a first department, the environment 200 activates the AI model to identify work patterns or underlying causes for the deviation. This involves causal inference techniques and pattern recognition algorithms to establish relationships between observed behaviors and potential root causes.

Optionally, the deviation identification process is enhanced with a prioritization mechanism. This mechanism employs a multi-criteria decision-making algorithm that considers factors such as financial impact, resource utilization, and alignment with business objectives. The AI model uses this prioritization to ensure that the most critical deviations may be addressed first, optimizing overall account health management.

Optionally, the environment 200 employs a specialized generative AI model to conduct a detailed analysis of resource utilization patterns before and during the identified deviation. This model uses transformer architecture with attention mechanisms to process time-series data on resource allocation, employee workloads, and task completion rates. The generative AI applies causal inference techniques to establish relationships between resource utilization patterns and the observed deviation.

The model may categorize the probable cause of the deviation into two main categories: over-utilization or under-utilization of resources. For over-utilization, it identifies indicators such as consistently high workloads, increased overtime, or patterns of employee turnover. For under-utilization, it looks for signs of idle resources, prolonged task completion times, or repetitive bottlenecks in workflows. The generative AI may then synthesize its findings into a coherent narrative, explaining the likely chain of events that led to the deviation. This narrative is incorporated into the notification generated in Step 607, providing the selected department(s) with a clear, context-rich understanding of the issue.

Furthermore, the generative AI produces tailored recommendations to address the identified cause. For over-utilization scenarios, it might suggest strategies for workload redistribution, hiring plans, or employee retention programs. For under-utilization, it could recommend process optimizations, additional training programs, or the adoption of new tools to enhance productivity.

These AI-generated insights and recommendations may then be fed back into the main AI model to inform the selection of the most appropriate department(s) to address the issue, ensuring a comprehensive, cause-driven approach to resolving the deviation.

As shown at 606, the AI model then assesses the capability and relevance of other departments to address the identified issue. This assessment uses a combination of knowledge graph analysis and similarity scoring to determine which department(s) may be best positioned to handle the problem.

As shown at 607, the environment 200 generates a detailed notification about the identified deviation. This notification includes information about the nature of the deviation, its potential impact on the organization, and recommended actions to address it. Natural language generation techniques may be employed to create clear, context-appropriate messages.

Optionally, the notification generation process is enhanced with a recommendation engine that leverages the AI model's understanding of departmental capabilities and resources. This engine uses a combination of rule-based systems and neural networks to generate tailored, actionable recommendations for remedying the identified deviation. These recommendations may be customized based on the selected department's historical performance, available resources, and current workload.

Optionally, the environment 200 implements a user interface for notification review and approval. This interface uses role-based access control to ensure only authorized personnel can access it. It provides visualization tools for easy comprehension of AI-generated notifications and allows for modifications. An approval workflow is implemented, using digital signatures and audit logging for accountability.

As shown at 608, the environment 200 automatically routes the generated notification to the selected department (s). This routing process utilizes the organization's communication infrastructure, such as email systems or internal messaging platforms, ensuring the notification reaches the appropriate personnel.

Optionally, the environment 200 automatically implements an integration layer that connects with existing communication channels and work management tools used by the account. This layer uses APIs and webhooks to seamlessly deliver notifications through platforms like Slack, Microsoft Teams, or email systems. It also integrates with project management tools to track resolution progress, using data synchronization techniques to ensure consistency across platforms. Data synchronization may be any process of maintaining data consistency across multiple platforms or applications, ensuring that the same data is available and up-to-date in all systems.

As shown at 609, the environment 200 may log the notification and tracks its receipt and any subsequent actions taken. This logging process feeds back into the AI model, providing data for future refinement of the notification and routing processes.

As shown at 610, the AI model may be updated based on the outcomes of the notification and any actions taken. This update process uses reinforcement learning techniques to improve the model's decision-making capabilities over time.

Optionally, the AI model update process is expanded to include a cross-account learning module. This module aggregates anonymized data on notification outcomes and remedial actions across multiple accounts. It employs federated learning techniques to update the global AI model while preserving account-specific privacy. This approach significantly enhances the model's ability to identify deviations, select appropriate departments, and suggest effective solutions across diverse organizational contexts.

As shown at 611, the environment 200 continues to monitor the account, looking for any further deviations or improvements resulting from the notification. This ongoing monitoring creates a feedback loop that allows for continuous optimization of the account health monitoring process. Optionally, the environment 200 implements a resolution tracking module that monitors the progress of addressing the identified issue. This module employs event-driven architecture to capture real-time updates on issue resolution. It analyzes the effectiveness of the selected department using key performance indicators (KPIs) and custom metrics. The results of this analysis may be fed into the AI model using online learning techniques, allowing for continuous improvement in department selection and notification routing.

Optionally, implementation of online learning techniques and the cross-account learning module represents a major advancement in the system's ability to learn and improve. By leveraging federated learning, the system can aggregate insights across multiple accounts without compromising data privacy. This results in a more robust, generalizable AI model that continuously enhances its performance in identifying deviations, selecting appropriate departments, and suggesting effective solutions. The integration of advanced time series forecasting and predictive modelling capabilities enables the system to anticipate potential issues before they occur. This proactive approach to account health management can significantly reduce the impact of deviations on overall business operations, allowing organizations to address problems in their nascent stages.

The incorporation of sprint analysis modules and inter-departmental analysis tools (leverages sophisticated data processing techniques such as time series analysis, graph theory, and machine learning algorithms. This allows for deeper, more nuanced insights into organizational dynamics, workflow efficiencies, and resource allocation, leading to more informed decision-making.

In one exemplary embodiment, the system may be configured to identify and analyze deviations from established workflows within the Research and Development (R&D) department of an organization. The system may implement data collection module that continuously collect data from various sources, including:

a) Sprint planning and execution data from the project management platform.

b) Time tracking data from the organization's time management system.

c) Resource allocation data from the human resources management system d) Historical project completion data from the organization's data warehouse.

Optionally, the system further includes a time series analysis component that may analyze the collected data over multiple sprint iterations, focusing on:

a) Task completion rates.

b) Frequency and duration of task postponements.

c) Patterns in resource utilization.

Optionally, the system may construct and analyze dependency graphs representing:

a) Task dependencies within sprints.

b) Inter-project dependencies.

c) Resource allocation across multiple projects.

Optionally, the system further is utilizing supervised and unsupervised learning algorithms to:

a) Identify recurring patterns in task postponements.

b) Classify causes of delays based on historical data.

c) Predict potential bottlenecks in upcoming sprints.

In operation, the system may detect a pattern of task postponements in the R&D department over several sprint iterations. The time series analysis component may flag this as a significant deviation from the expected workflow, triggering a deeper analysis. The graph theory-based dependency analysis may reveal that the postponed tasks may not be isolated incidents but form a connected subgraph within the larger project dependency network. This subgraph may correspond to a specific area of technological expertise. The machine learning component, trained on historical project data, may classify this pattern of postponements. It may rule out factors such as employee performance issues or task complexity, instead identifying resource constraints as the primary cause. Based on this analysis, the system may generate a detailed report including:

1. A quantitative analysis of the impact of postponements on overall project timelines.

2. A visualization of the affected task dependency network.

3. A comparative analysis of resource allocation in successful vs. delayed projects.

The system may then automatically notify the Human Resources department, providing:

1. A summary of the identified resource constraint.

2. A specific list of required skills derived from the analysis of postponed tasks.

3. A proposed timeline for resource acquisition based on project criticality.

4. Potential impacts on ongoing and upcoming projects if the resource gap is not addressed.

Furthermore, the system may suggest interim measures, such as:

1. Temporary reallocation of resources from lower-priority projects.

2. Identification of potential upskilling opportunities for existing team members.

3. Evaluation of outsourcing or contractor engagement for specific task subsets.

This exemplary application demonstrates the system's capacity to leverage complex analytical techniques for identifying subtle, systemic issues within organizational workflows. By correlating data across multiple dimensions and departments, the system can provide actionable insights that go beyond surface-level project management, addressing root causes of efficiency bottlenecks and enabling proactive, data-driven decision-making in resource allocation and skill acquisition.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally include a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a touch-sensitive layer such as a touchscreen, or keyboard and a pointing device (e.g., a mouse or a trackball), by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above-described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It should be appreciated that the above-described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above-described modules/units can be combined as one module or unit, and each of the above-described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

Various terms used in the specification and claims may be defined or summarized differently when discussed in connection with differing disclosed embodiments. It is to be understood that the definitions, summaries and explanations of terminology in each instance apply to all instances, even when not repeated, unless the transitive definition, explanation or summary would result in inoperability of an embodiment.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A non-transitory computer-readable medium containing instructions that when executed by at least one processor cause the at least one processor to perform operations for optimizing interactions with a dynamically adaptive dashboard interface on a host platform, the operations comprising:

outputting for presentation a graphical user interface including a dashboard with a plurality of graphical elements;

tracking user interactions with the dashboard;

determining, using an artificial intelligence (AI) agent, a workflow that provides an improvement to the user interactions, wherein the AI agent has permissioned access to the host platform and is configured to obtain one or more of historical user data, historical dashboard data, and organization data;

outputting for presentation on the graphical user interface a graphical depiction of the workflow;

receiving, via the graphical user interface, a user input to execute at least a portion of the workflow; and executing, using the AI agent and in response to receiving the user input, the at least the portion of the workflow causing at least one of the plurality of graphical elements in the dashboard to change based on the improvement, wherein the operations further comprise outputting for presentation, via the graphical user interface, a recommendation providing details on a detected inefficiency in the user interactions, a proposed optimization using available host platform features, and a natural language explanation of an expected impact when the proposed optimization is implemented, wherein the executed at least the portion of the workflow includes a modification to a structure of the dashboard or a modification to metadata of the dashboard.

2. The non-transitory computer-readable medium of claim 1, wherein the workflow is determined based on the one or more of the historical user data, historical dashboard data, and organization data obtained by the AI agent.

3. The non-transitory computer-readable medium of claim 1, wherein the graphical depiction of the workflow is output for display.

4. The non-transitory computer-readable medium of claim 1, wherein the operations further comprise determining a user intent based on the user interactions and the historical user data, and wherein the determining the workflow that provides the improvement to the user interactions is further based on the determined user intent.

5. The non-transitory computer-readable medium of claim 1, wherein the operations further comprise outputting for presentation, via the graphical user interface, a recommendation providing details on a detected inefficiency in the user interactions, a proposed optimization using available host platform features, an estimated reduction in time or effort spent if the proposed optimization is implemented, or step-by-step guidance for implementing the determined workflow.

6. The non-transitory computer-readable medium of claim 1, wherein the AI agent is hosted by the host platform.

7. The non-transitory computer-readable medium of claim 1, wherein the AI agent is associated with a user.

8. The non-transitory computer-readable medium of claim 1, wherein the historical user data, historical dashboard data, and organization data used to train the AI agent are selected based on permissions.

9. The non-transitory computer-readable medium of claim 8, wherein, in determining the workflow, the AI agent accesses a plurality of databases within a designated environment.

10. The non-transitory computer-readable medium of claim 1, wherein the executing the at least the portion of the workflow includes executing a first step of the workflow using the AI agent.

11. The non-transitory computer-readable medium of claim 1, wherein the AI agent is further trained using host platform contextual information including data types and structural relationships between databases in the host platform, and wherein the determining of the workflow is further based on the host platform contextual information.

12. The non-transitory computer-readable medium of claim 1, wherein the executed at least the portion of the workflow includes a modification to a structure of the dashboard or a modification to metadata of the dashboard.

13. The non-transitory computer-readable medium of claim 12, wherein the modification to the structure of the dashboard includes one or more of reorganizing items, creating new groupings, and adjusting hierarchies.

14. The non-transitory computer-readable medium of claim 1, wherein the operations further comprise outputting for presentation on the graphical user interface a notification including a visual indicator of tasks or processes affected by executing the workflow.

15. A method for optimizing interactions with a dynamically adaptive dashboard interface on a host platform, the operations comprising:

outputting for presentation a graphical user interface including a dashboard with a plurality of graphical elements;

tracking user interactions with the dashboard;

determining, using an artificial intelligence (AI) agent, a workflow that provides an improvement to the user interactions, wherein the AI agent has permissioned access to the host platform and is configured to obtain one or more of historical user data, historical dashboard data, and organization data;

outputting for presentation on the graphical user interface a graphical depiction of the workflow;

receiving, via the graphical user interface, a user input to execute at least a portion of the workflow; and executing, using the AI agent, an in response to receiving the user input, the at least the portion of the workflow causing at least one of the plurality of graphical elements in the dashboard to change based on the improvement wherein the operations further comprise outputting for presentation, via the graphical user interface, a recommendation providing details on a detected inefficiency in the user interactions, a proposed optimization using available host platform features, and a natural language explanation of an expected impact when the proposed optimization is implemented, wherein the executed at least the portion of the workflow includes a modification to a structure of the dashboard or a modification to metadata of the dashboard.

16. A system for optimizing interactions with a dynamically adaptive dashboard interface on a host platform, the system comprising at least one processor configured to:

output for presentation a graphical user interface including a dashboard with a plurality of graphical elements;

track user interactions with the dashboard;

determine, using an artificial intelligence (AI) agent, a workflow that provides an improvement to the user interactions, wherein the AI agent has permissioned access to the host platform and is configured to obtain one or more of historical user data, historical dashboard data, and organization data;

output for presentation on the graphical user interface a graphical depiction of the workflow;

receive, via the graphical user interface, a user input to execute at least a portion of the workflow; and execute, using the AI agent, and in response to receiving the user input, the at least the portion of the workflow causing at least one of the plurality of graphical elements in the dashboard to change based on the improvement wherein the operations further comprise outputting for presentation, via the graphical user interface, a recommendation providing details on a detected inefficiency in the user interactions, a proposed optimization using available host platform features, and a natural language explanation of an expected impact when the proposed optimization is implemented, wherein the executed at least the portion of the workflow includes a modification to a structure of the dashboard or a modification to metadata of the dashboard.

* * * * *